(12) United States Patent
Reynders

(10) Patent No.: US 10,791,446 B2
(45) Date of Patent: Sep. 29, 2020

(54) SYSTEM AND METHOD FOR AN INTERNET OF THINGS (IOT) GAS PUMP OR CHARGING STATION IMPLEMENTATION

(71) Applicant: AFERO, INC., Los Altos, CA (US)

(72) Inventor: Tim Reynders, Cupertino, CA (US)

(73) Assignee: Afero, Inc., Los Altos, CA (US)

( * ) Notice: Subject to any disclaimer, the term of this patent is extended or adjusted under 35 U.S.C. 154(b) by 711 days.

(21) Appl. No.: 14/967,754

(22) Filed: Dec. 14, 2015

(65) Prior Publication Data
US 2017/0171178 A1 Jun. 15, 2017

(51) Int. Cl.
| | | |
|---|---|---|
| *H04W 4/80* | (2018.01) | |
| *H04W 12/06* | (2009.01) | |
| *H04L 9/14* | (2006.01) | |
| *G06Q 20/20* | (2012.01) | |
| *G06Q 20/18* | (2012.01) | |
| *G06Q 20/40* | (2012.01) | |
| *G06Q 50/06* | (2012.01) | |
| *G06Q 20/32* | (2012.01) | |
| *H04W 4/38* | (2018.01) | |

(Continued)

(52) U.S. Cl.
CPC .......... *H04W 4/80* (2018.02); *G06Q 20/145* (2013.01); *G06Q 20/18* (2013.01); *G06Q 20/202* (2013.01); *G06Q 20/3278* (2013.01); *G06Q 20/4014* (2013.01); *G06Q 50/06* (2013.01); *G07F 13/025* (2013.01); *G07F 15/005* (2013.01); *H04L 9/14* (2013.01); *H04L 9/3247* (2013.01); *H04W 4/38* (2018.02); *H04W 4/70* (2018.02); *H04W 12/06* (2013.01); *H04L 2209/805* (2013.01); *H04L 2209/84* (2013.01); *H04W 12/00512* (2019.01); *Y02T 90/12* (2013.01); *Y02T 90/128* (2013.01)

(58) Field of Classification Search
CPC ........ H04L 63/08; G06Q 50/06; G06Q 20/18; G06Q 20/202
See application file for complete search history.

(56) References Cited

U.S. PATENT DOCUMENTS

| | | | | |
|---|---|---|---|---|
| 6,078,888 A | * | 6/2000 | Johnson, Jr. | ......... G06Q 20/027 380/270 |
| 6,237,647 B1 | * | 5/2001 | Pong | ..................... B67D 7/0401 141/231 |

(Continued)

*Primary Examiner* — Paul Danneman
(74) *Attorney, Agent, or Firm* — Nicholson De Vos; Webster & Elliott LLP

(57) ABSTRACT

A system and method are described for an Internet of Things (IoT) gas pump or charging station implementation. For example, one embodiment of a system comprises: an automotive IoT device to be integrated within a vehicle of a user; an IoT service comprising IoT device authentication and management logic to authenticate the identity of the automotive IoT device integrated within the vehicle; an Internet of Things (IoT) hub to be communicatively coupled to a gas pump or charging station, the IoT hub to establish a communication channel with the IoT service, the IoT hub further comprising a local wireless communication interface to establish a local wireless communication channel with the automotive IoT device, the automotive IoT device to establish a secure communication channel with the IoT service through the IoT hub; the IoT service to authenticate the automotive IoT device and responsively transmit a command to the IoT hub authorizing use of the gas pump or charging station.

12 Claims, 49 Drawing Sheets

(51) Int. Cl.
  *H04L 9/32* (2006.01)
  *H04W 4/70* (2018.01)
  *G07F 15/00* (2006.01)
  *G07F 13/02* (2006.01)
  *G06Q 20/14* (2012.01)
  *H04W 12/00* (2009.01)

(56) References Cited

U.S. PATENT DOCUMENTS

| | | | | |
|---|---|---|---|---|
| 7,483,534 B2 * | 1/2009 | Ibrahim | | G06F 7/725 380/28 |
| 8,892,474 B1 * | 11/2014 | Inskeep | | G06Q 20/3674 705/44 |
| 9,717,012 B2 * | 7/2017 | Zakaria | | H04M 1/72519 |
| 9,729,528 B2 * | 8/2017 | Zakaria | | H04L 63/061 |
| 9,838,390 B2 * | 12/2017 | Zakaria | | H04W 4/70 |
| 9,843,929 B2 * | 12/2017 | Zimmerman | | H04W 4/70 |
| 9,858,213 B2 * | 1/2018 | Britt | | G06F 21/64 |
| 9,917,824 B2 * | 3/2018 | Britt | | H04L 63/08 |
| 10,015,766 B2 * | 7/2018 | Britt | | H04L 9/0656 |
| 2005/0192832 A1 * | 9/2005 | Call | | G06Q 10/00 235/381 |
| 2009/0108015 A1 * | 4/2009 | Kreamer | | G06Q 20/105 221/8 |
| 2010/0097464 A1 * | 4/2010 | Volpe | | G08B 13/1966 348/143 |
| 2011/0035049 A1 * | 2/2011 | Barrett | | B67D 7/346 700/232 |
| 2012/0172802 A1 * | 7/2012 | Blomquist | | G06F 19/3456 604/151 |
| 2012/0191600 A1 * | 7/2012 | Boot | | B60L 11/1848 705/40 |
| 2012/0277920 A1 * | 11/2012 | Koch | | G06F 17/3087 700/286 |
| 2012/0329430 A1 * | 12/2012 | Chatani | | H04L 12/12 455/411 |
| 2013/0103514 A1 * | 4/2013 | Fisher | | H04W 4/21 705/18 |
| 2013/0232019 A1 * | 9/2013 | Frieden | | G06Q 20/3278 705/17 |
| 2014/0006188 A1 * | 1/2014 | Grigg | | G06Q 20/3276 705/17 |
| 2014/0047345 A1 * | 2/2014 | Fyke | | G06F 3/048 715/738 |
| 2014/0067680 A1 * | 3/2014 | Turner | | G06Q 20/40 705/44 |
| 2014/0074605 A1 * | 3/2014 | Sanchez | | G06Q 20/40 705/14.53 |
| 2014/0304126 A1 * | 10/2014 | Kim | | G06Q 10/087 705/28 |
| 2015/0032558 A1 * | 1/2015 | Bonk | | G06Q 20/202 705/21 |
| 2015/0113592 A1 * | 4/2015 | Curtis | | H04L 63/0823 726/2 |
| 2015/0120474 A1 * | 4/2015 | Webb | | B67D 7/04 705/18 |
| 2015/0120477 A1 * | 4/2015 | Stevenson | | G01F 23/14 705/22 |
| 2015/0121470 A1 * | 4/2015 | Rongo | | H04W 4/70 726/4 |
| 2015/0134761 A1 * | 5/2015 | Sharma | | H04L 67/26 709/207 |
| 2015/0142141 A1 * | 5/2015 | Okabayashi | | G08C 17/02 700/83 |
| 2015/0153982 A1 * | 6/2015 | Berarducci | | H04N 1/00 358/1.15 |
| 2015/0161590 A1 * | 6/2015 | Genovez | | G06Q 20/3278 705/44 |
| 2015/0205991 A1 * | 7/2015 | Park | | H04W 4/005 340/10.3 |
| 2015/0242969 A1 * | 8/2015 | Pallas | | G06Q 50/06 705/39 |
| 2015/0278810 A1 * | 10/2015 | Ramatchandirane | | G06Q 20/30 705/16 |
| 2015/0310185 A1 * | 10/2015 | Shah | | G06F 19/3462 340/10.6 |
| 2016/0006729 A1 * | 1/2016 | Yang | | H04L 63/0428 713/156 |
| 2016/0050553 A1 * | 2/2016 | Kang | | G06F 21/305 455/41.2 |
| 2016/0080890 A1 * | 3/2016 | Shao | | H04W 4/70 701/36 |
| 2016/0085960 A1 * | 3/2016 | Priev | | G06F 21/44 726/7 |
| 2016/0086163 A1 * | 3/2016 | Hosny | | G06Q 20/202 705/21 |
| 2016/0105305 A1 * | 4/2016 | Pignataro | | H04L 67/32 709/223 |
| 2016/0105371 A1 * | 4/2016 | Choi | | H04L 47/70 370/230 |
| 2016/0174266 A1 * | 6/2016 | Goel | | H04W 4/70 455/509 |
| 2016/0182459 A1 * | 6/2016 | Britt | | H04L 67/12 713/171 |
| 2016/0285979 A1 * | 9/2016 | Wang | | H04L 67/16 |
| 2016/0292938 A1 * | 10/2016 | Zakaria | | G07C 9/00571 |
| 2016/0295364 A1 * | 10/2016 | Zakaria | | H04W 4/023 |
| 2016/0337127 A1 * | 11/2016 | Schultz | | H04W 4/70 |
| 2016/0353305 A1 * | 12/2016 | Zakaria | | H04M 1/72519 |
| 2016/0364223 A1 * | 12/2016 | Vandikas | | H04W 4/50 |
| 2016/0381030 A1 * | 12/2016 | Chillappa | | H04L 63/102 726/11 |
| 2017/0006003 A1 * | 1/2017 | Zakaria | | H04L 63/061 |
| 2017/0019873 A1 * | 1/2017 | Britt | | H04L 9/0656 |
| 2017/0034284 A1 * | 2/2017 | Smith | | H04L 67/141 |
| 2017/0055146 A1 * | 2/2017 | Ko | | H04W 12/02 |
| 2017/0083988 A1 * | 3/2017 | Butsch | | G06Q 50/06 |
| 2017/0124534 A1 * | 5/2017 | Savolainen | | G09C 1/00 |
| 2017/0134378 A1 * | 5/2017 | Corcoran | | H04W 12/003 |
| 2017/0142023 A1 * | 5/2017 | Yadav | | H04L 47/70 |
| 2017/0148115 A1 * | 5/2017 | Spanos | | G06Q 50/06 |
| 2017/0155703 A1 * | 6/2017 | Hao | | H04L 67/12 |
| 2017/0171181 A1 * | 6/2017 | Britt | | H04L 63/08 |
| 2017/0265127 A1 * | 9/2017 | Kim | | H04W 48/18 |
| 2017/0272940 A1 * | 9/2017 | Ghosh | | H04L 63/02 |
| 2017/0338959 A1 * | 11/2017 | Hong | | H04W 4/80 |
| 2017/0359338 A1 * | 12/2017 | Tschofenig | | G06F 21/34 |
| 2018/0007140 A1 * | 1/2018 | Brickell | | H04L 67/125 |
| 2018/0183587 A1 * | 6/2018 | Won | | G06F 21/44 |
| 2018/0232734 A1 * | 8/2018 | Smets | | G06Q 20/32 |

* cited by examiner

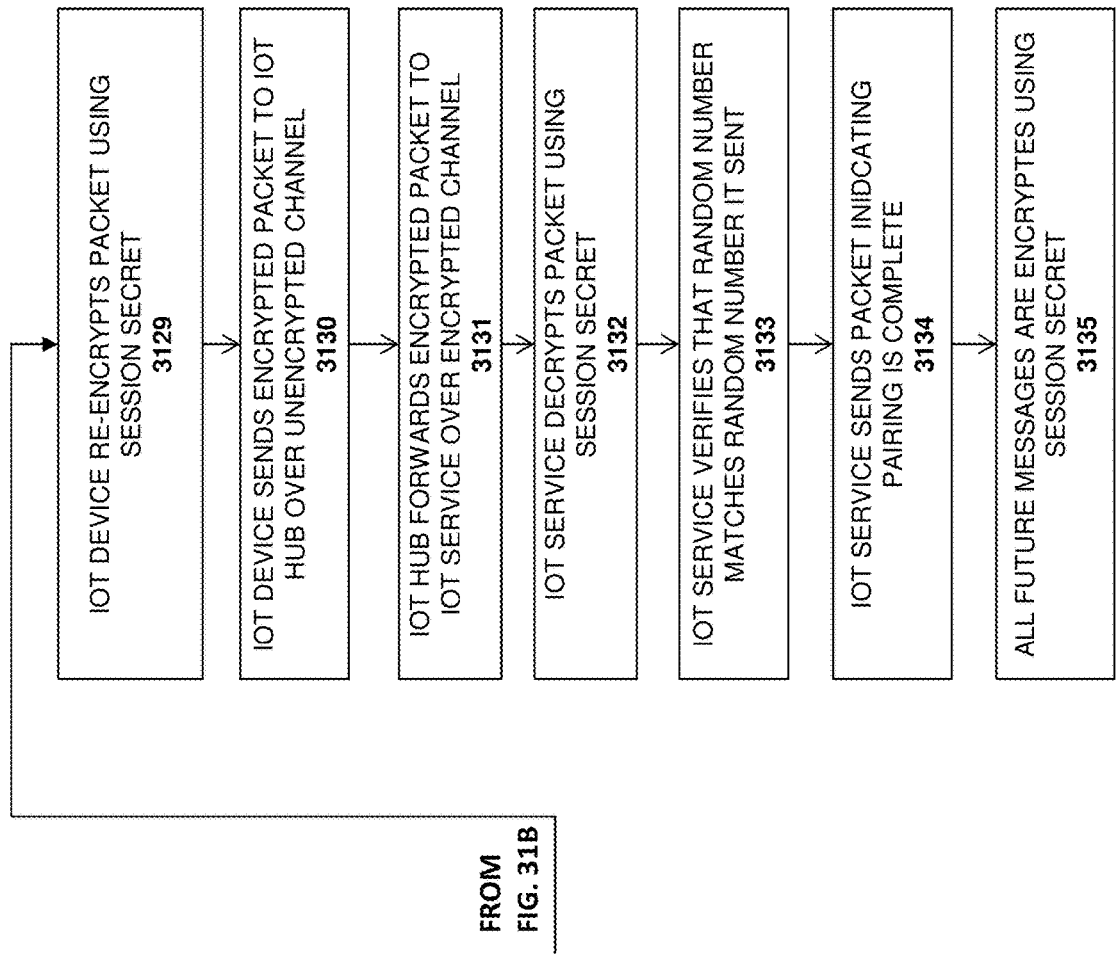

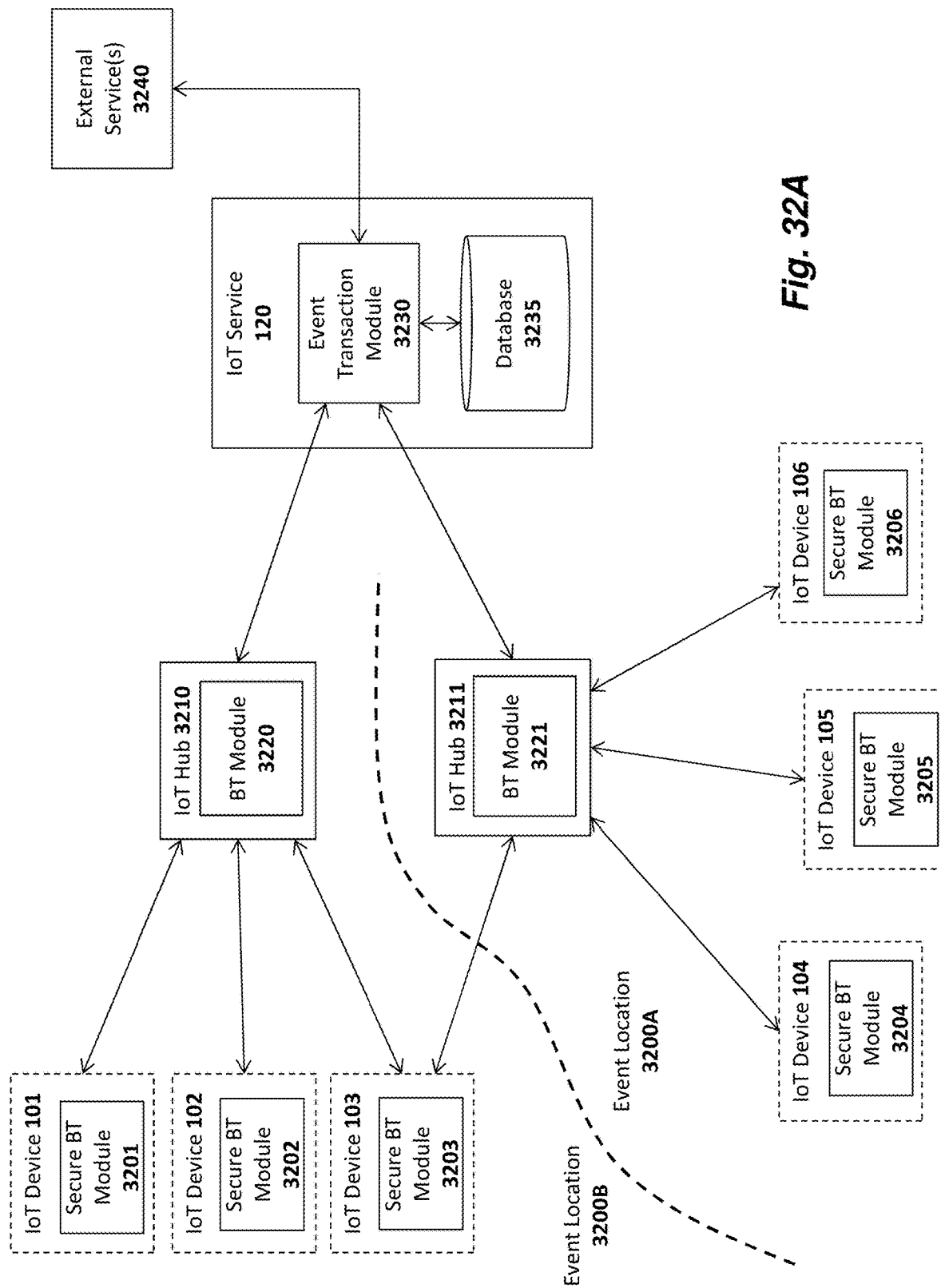

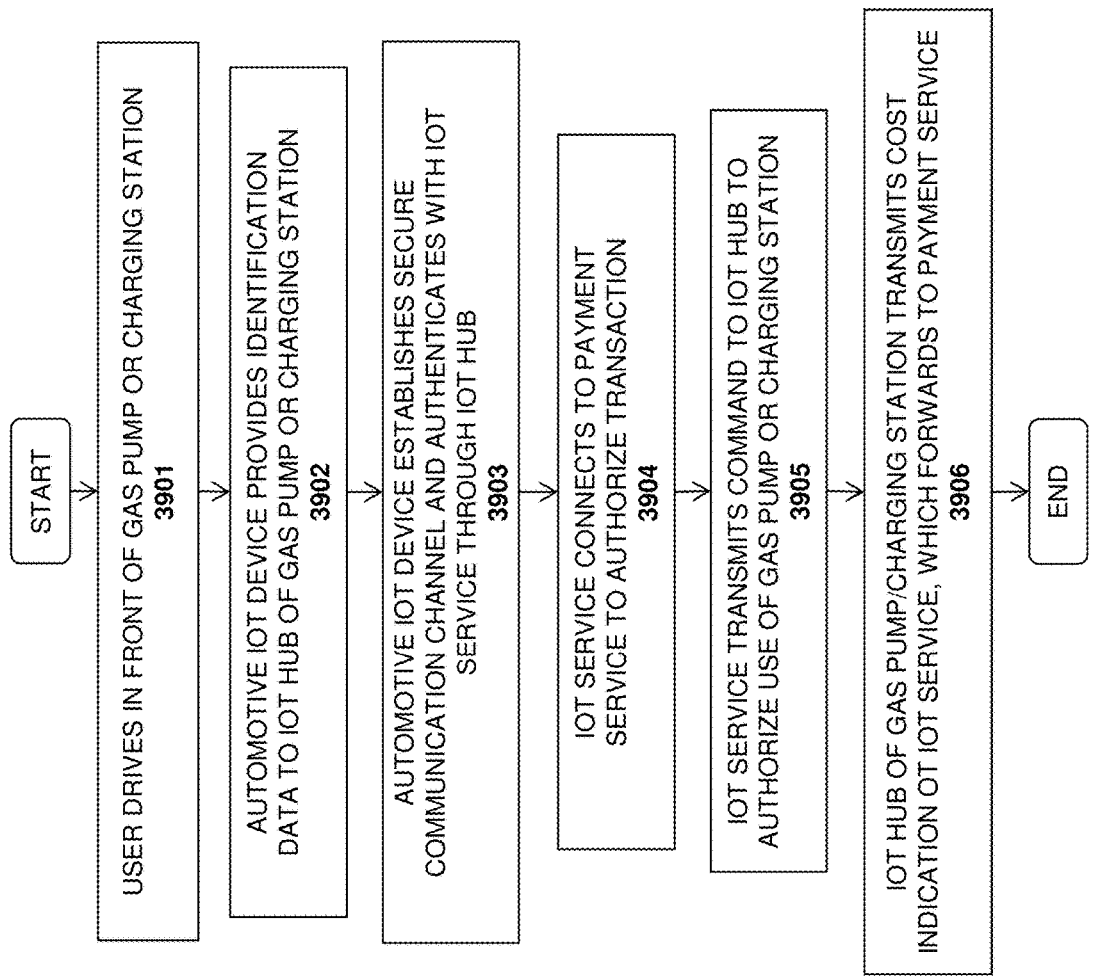

SYSTEM AND METHOD FOR AN INTERNET OF THINGS (IOT) GAS PUMP OR CHARGING STATION IMPLEMENTATION

BACKGROUND

Field of the Invention

This invention relates generally to the field of computer systems. More particularly, the invention relates to a system and method for an Internet of Things (IoT) gas pump or charging station implementation.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Another obstacle to IoT adoption is the difficulty associated with connecting and powering IoT devices. Connecting appliances such as refrigerators, garage door openers, environmental sensors, home security sensors/controllers, etc, for example, requires an electrical source to power each connected IoT device, and such an electrical source is often not conveniently located.

Another problem which exists is that the wireless technologies used to interconnect IoT devices such as Bluetooth LE are generally short range technologies. Thus, if the data collection hub for an IoT implementation is outside the range of an IoT device, the IoT device will not be able to transmit data to the IoT hub (and vice versa). Consequently, techniques are needed which would allow an IoT device to provide data to an IoT hub (or other IoT device) which is out of range.

BRIEF DESCRIPTION OF THE DRAWINGS

A better understanding of the present invention can be obtained from the following detailed description in conjunction with the following drawings, in which:

FIGS. 31A-C illustrate a detailed method for pairing devices in accordance with one embodiment of the invention;

FIGS. 32A-C illustrate different embodiments of the invention for implementing a reverse beacon;

FIG. 39 illustrates a method in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
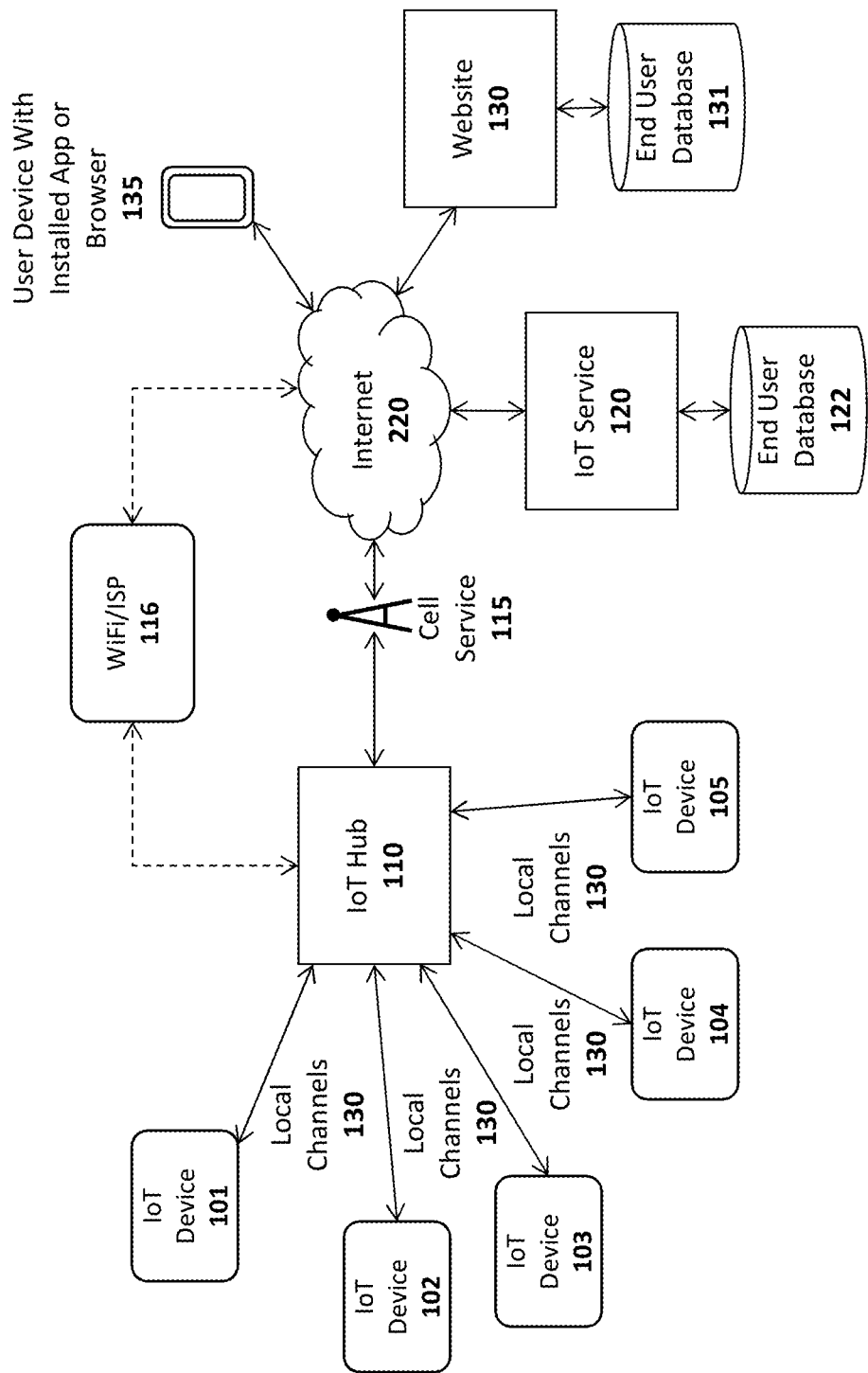
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
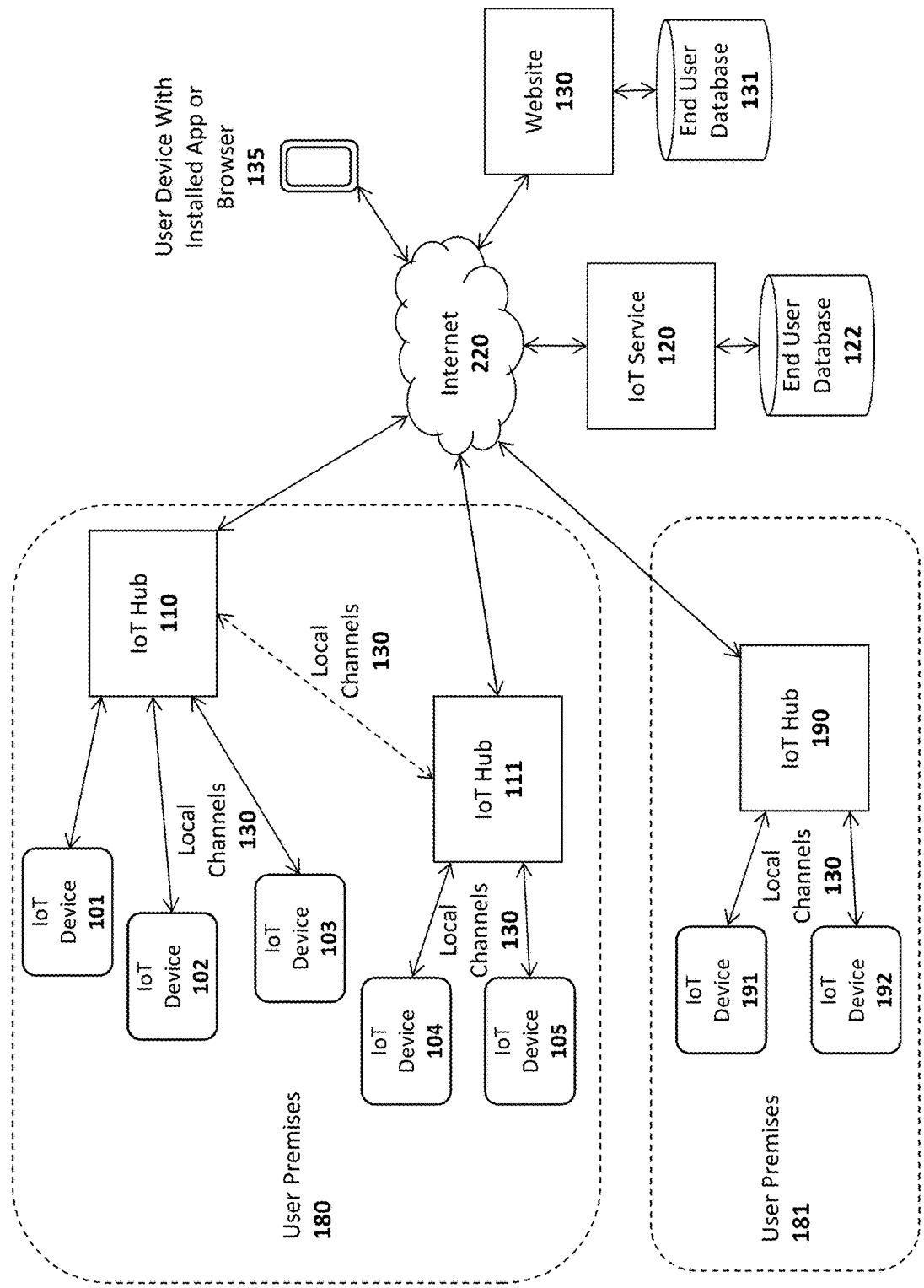

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
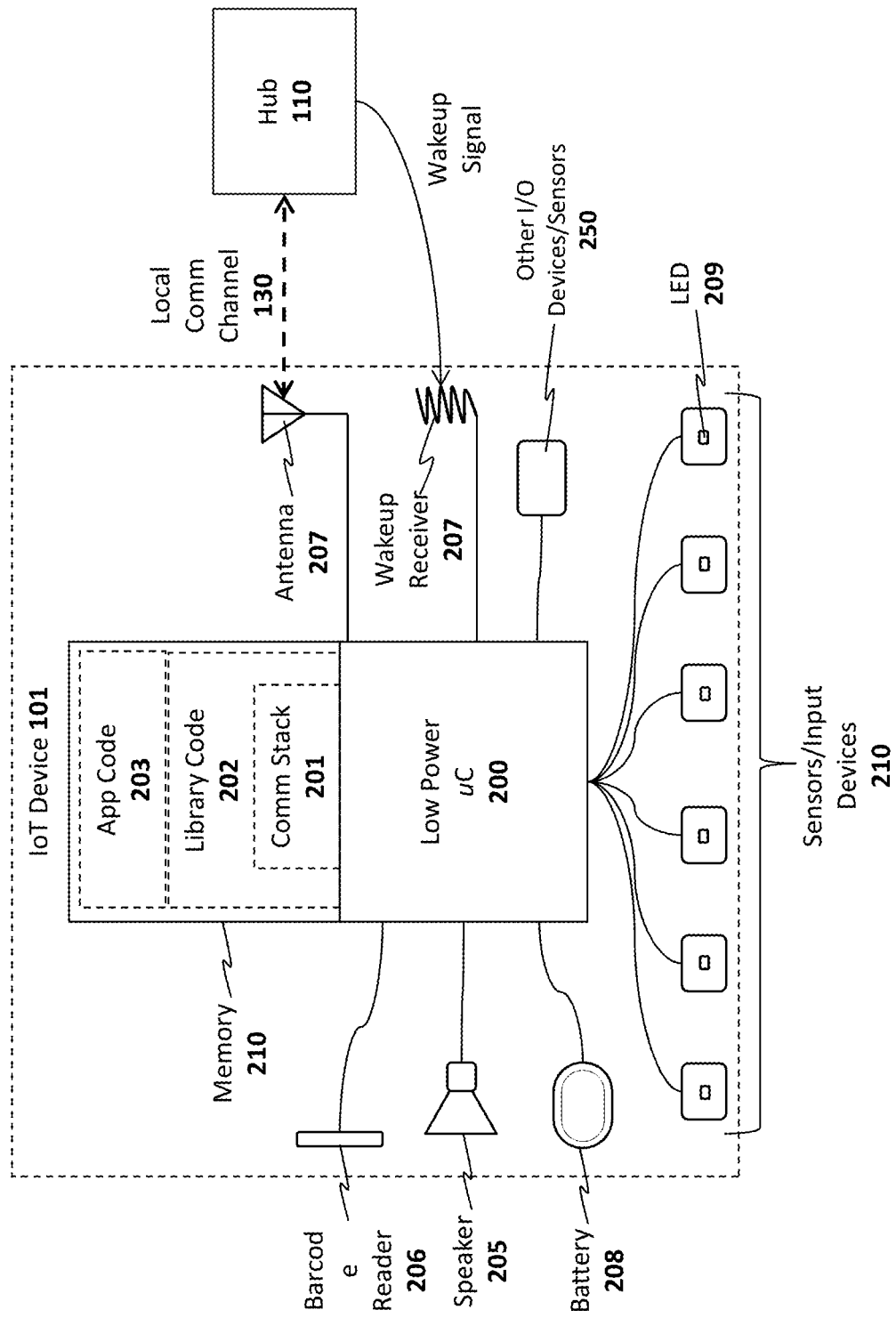
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
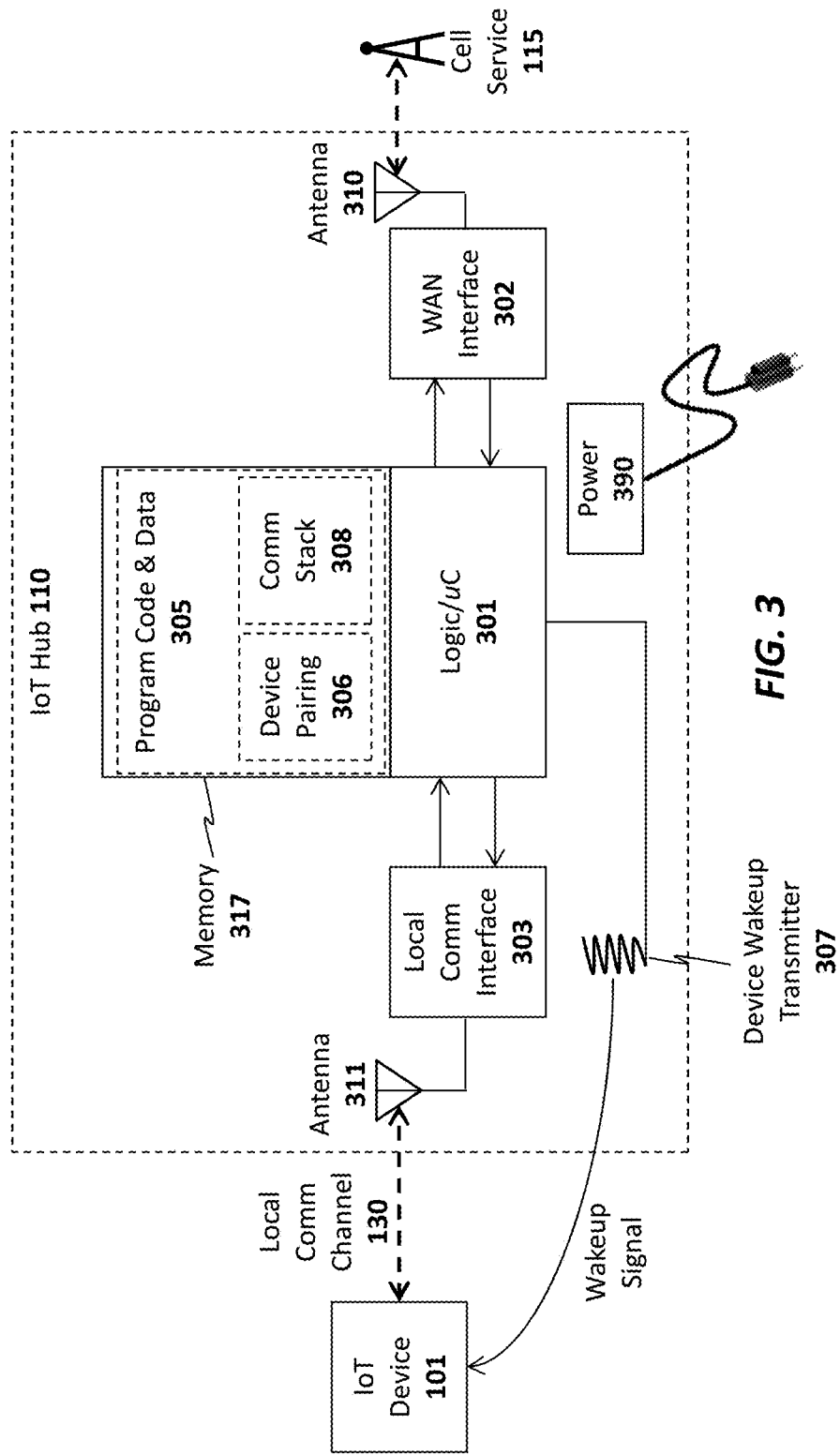
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
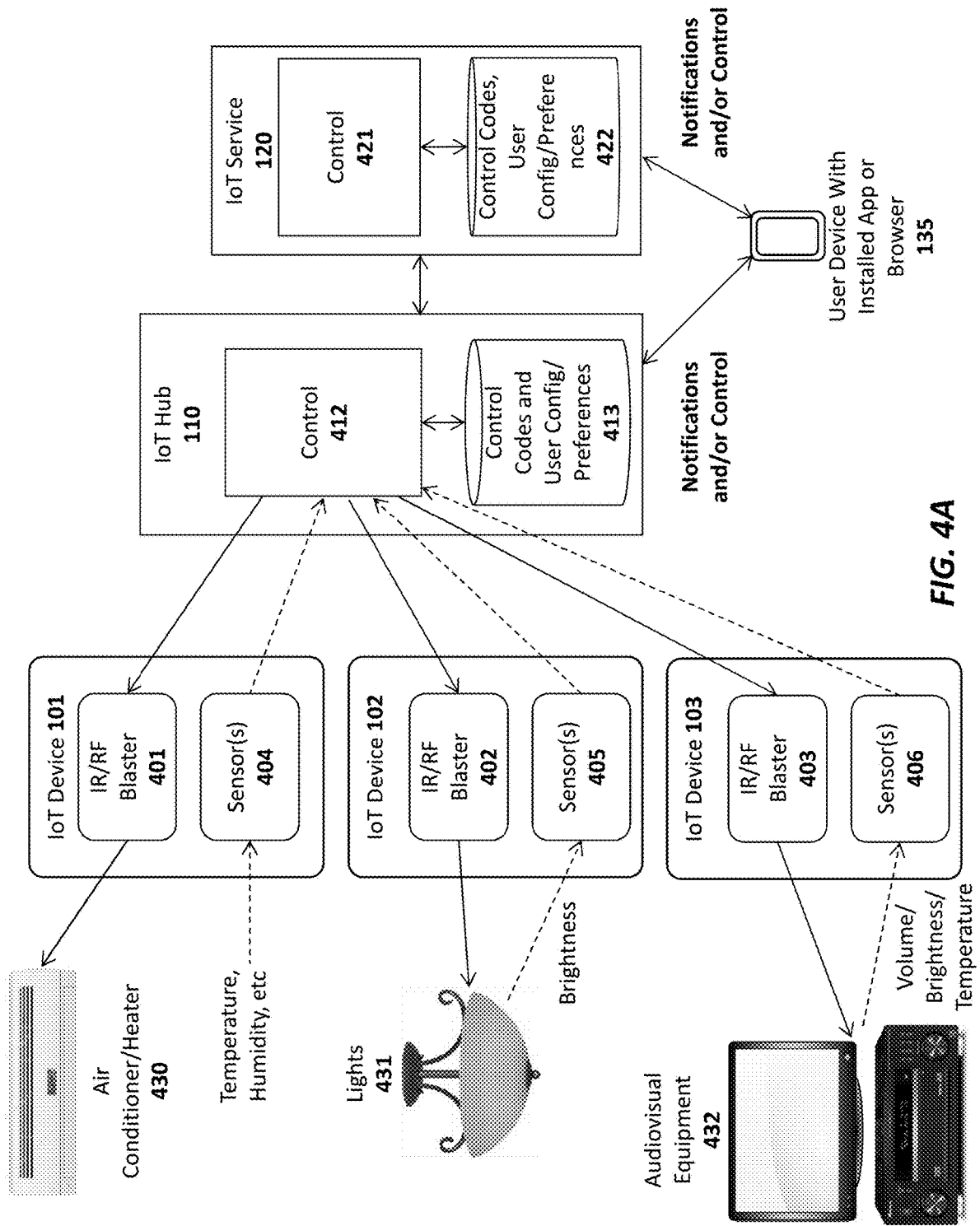
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
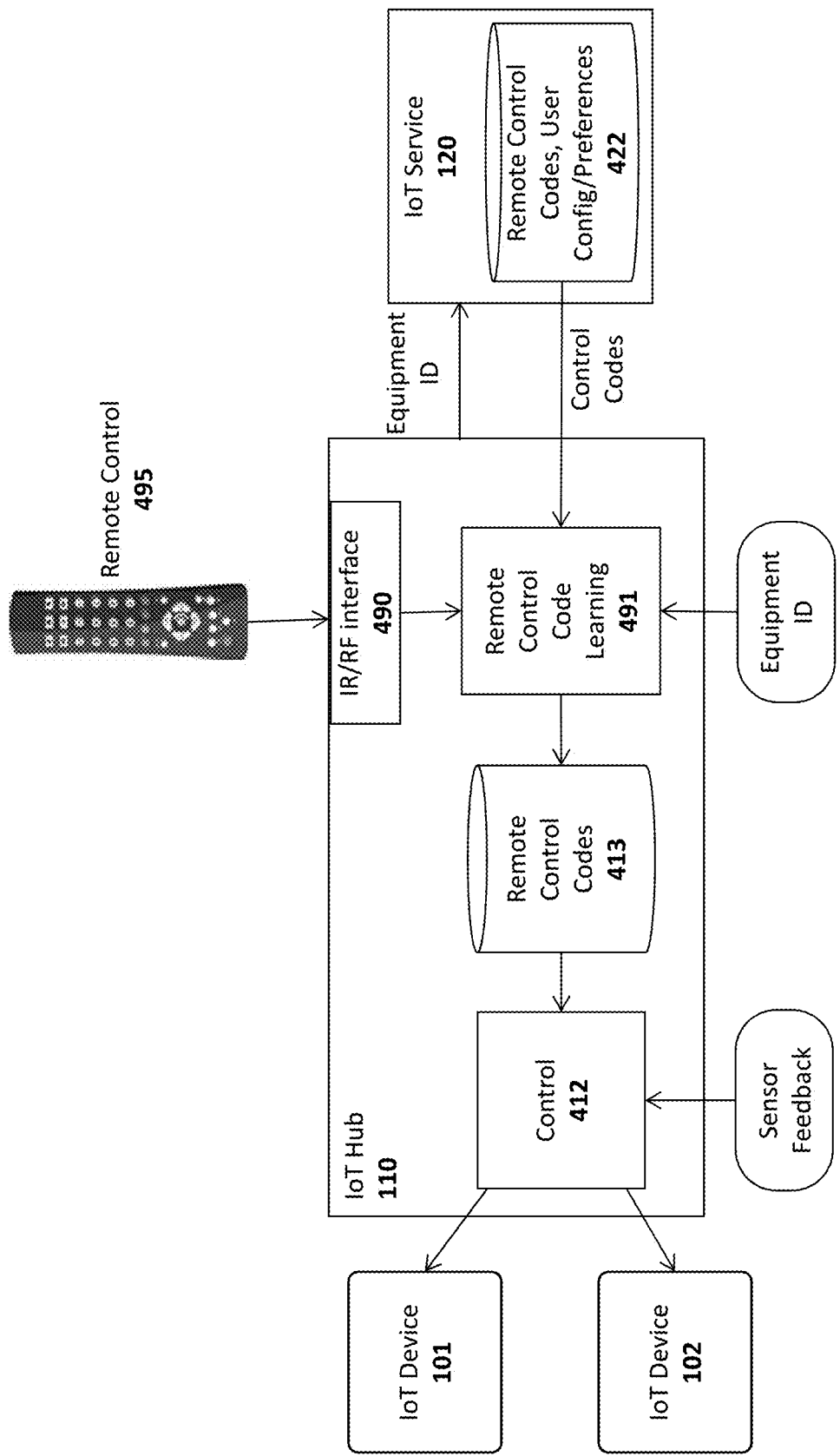

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
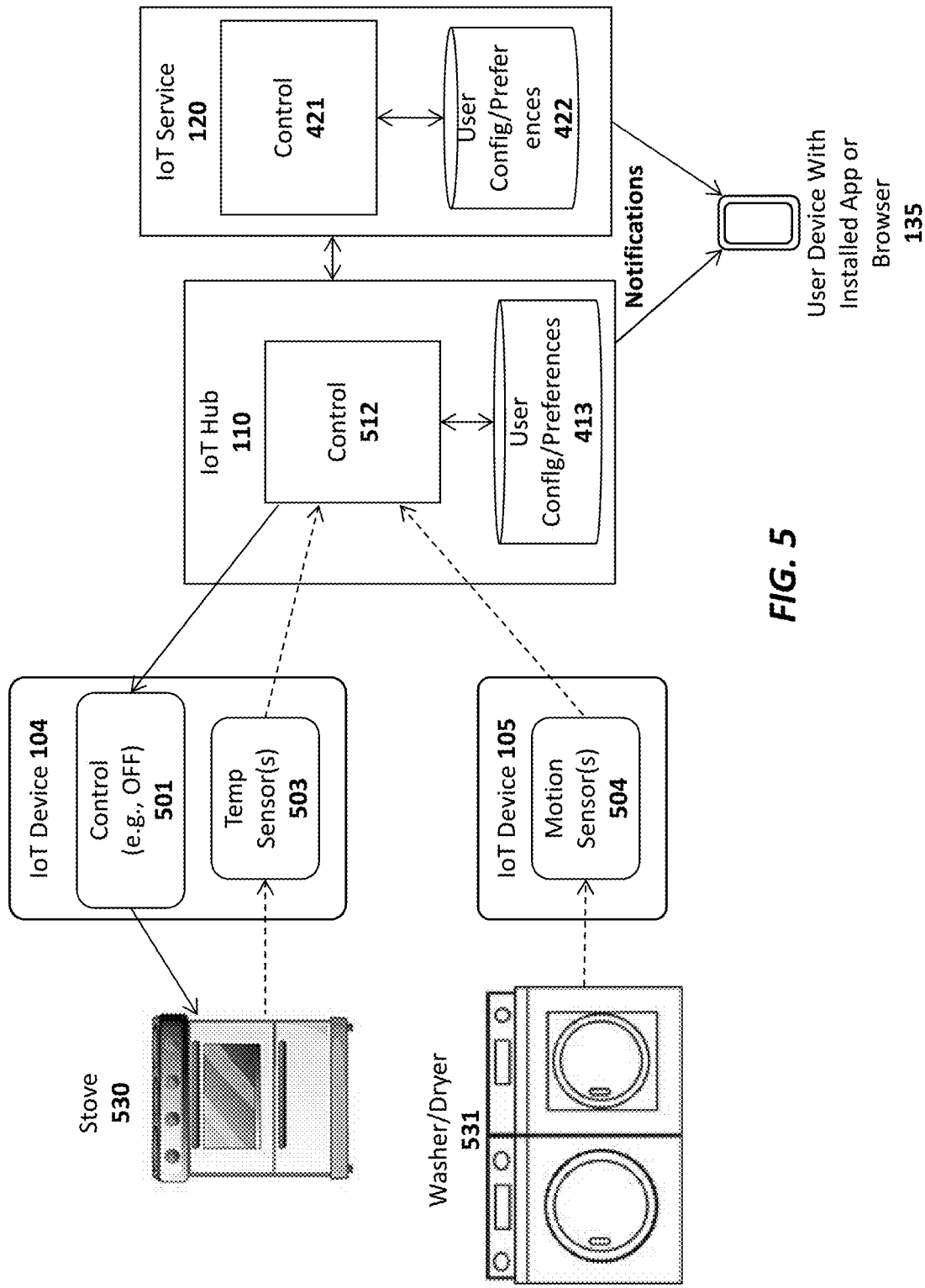
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Accurately Sensing User Location in an IoT System

Current wireless "smart" locks and garage door openers allow an end user to control a lock and/or garage door via a mobile device. To operate these systems, the user must open an app on the mobile device and select an open/unlock or close/lock option. In response, a wireless signal is sent to a receiver on or coupled to the wireless lock or garage door which implements the desired operation. While the discussion below focuses on wireless "locks", the term "lock" is used broadly herein to refer to standard door locks, wireless garage door openers, and any other device for limiting access to a building or other location.

Figure 6:
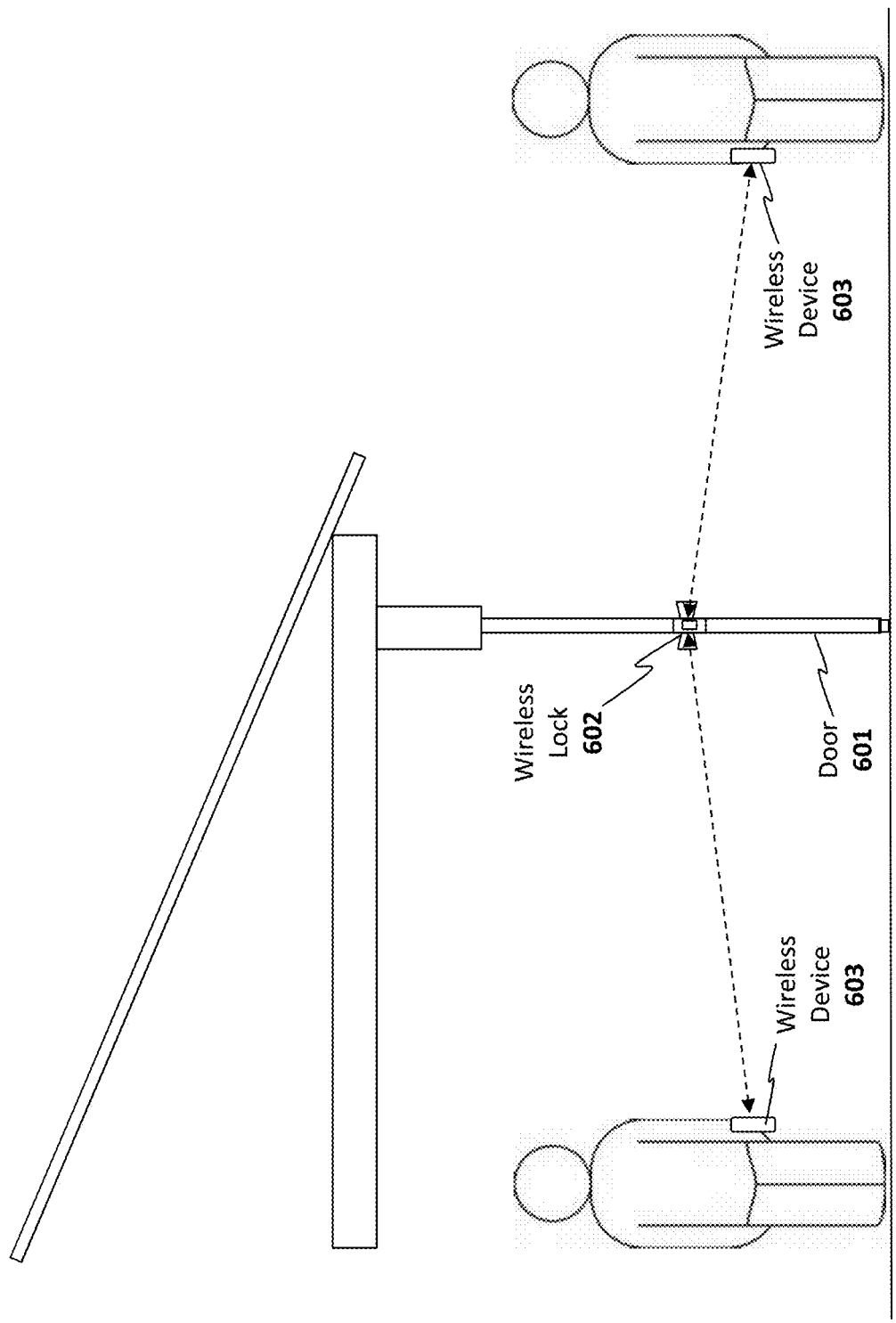
FIG. 6 illustrates problems with identifying a user in current wireless lock systems.

Some wireless locks attempt to determine when the user is outside the door and responsively trigger the open/unlock function. FIG. 6, for example, illustrates an example in which a wireless lock 602 is triggered in response to a user with a wireless device 603 approaching from the outside of the door 601, based on the signal strength of the signal from the wireless device 603. For example, the wireless lock 602 may measure the received signal strength indicator (RSSI) from the wireless device 603 and, when it reaches a threshold (e.g., −60 dbm), will unlock the door 601.

One obvious problem with these techniques is that the RSSI measurement is non-directional. For example, the user may move around the home with the wireless device 603 and pass by the wireless lock 602 or garage door opener, thereby causing it to trigger. For this reason, the use of wireless locks which operate based on user proximity detection has been limited.

Figure 7:
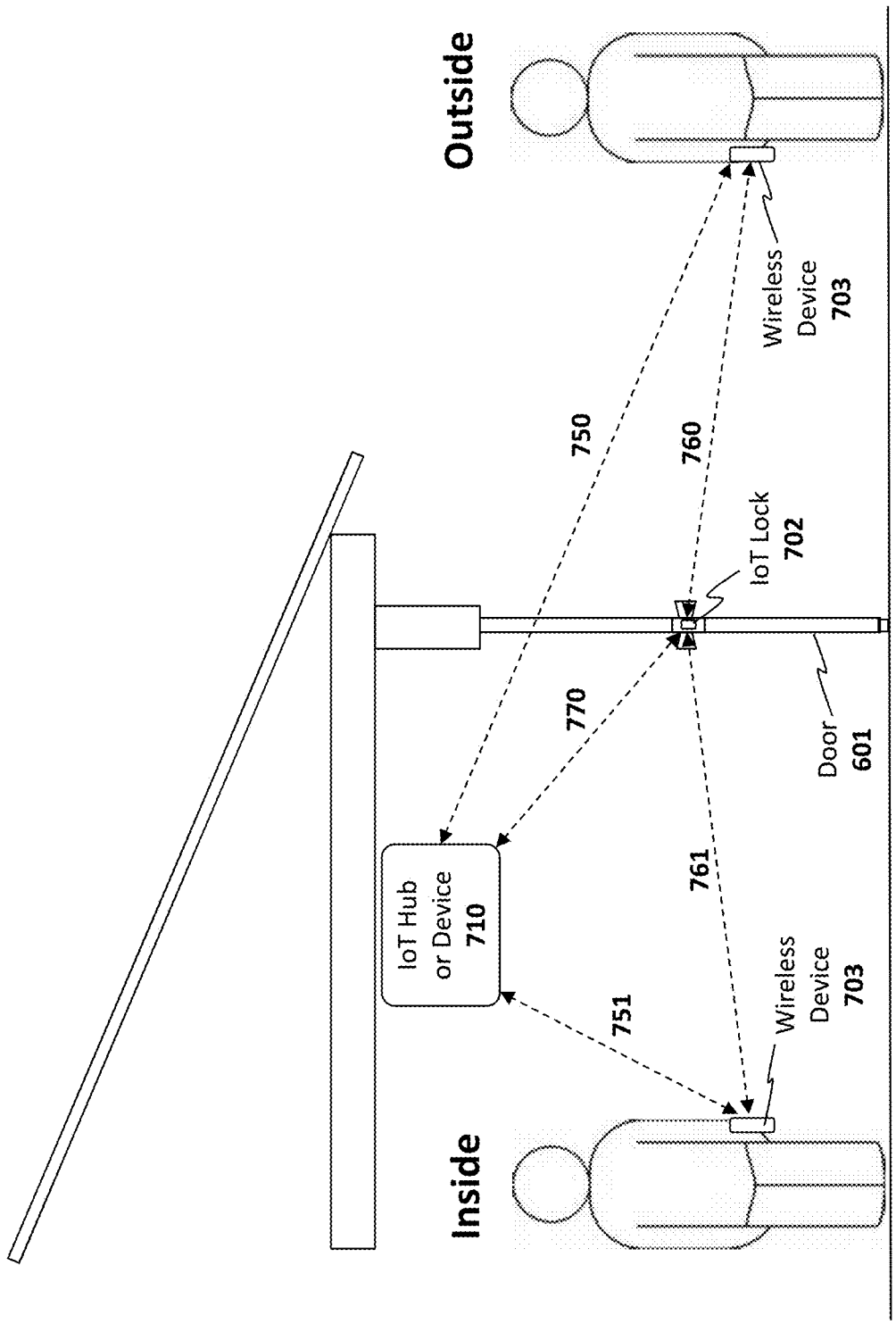
FIG. 7 illustrates a system in which IoT devices and/or IoT hubs are employed to accurately detect the location of a user of a wireless lock system.

FIG. 7 illustrates one embodiment of the invention which an IoT hub and/or IoT device 710 is used to determine the location of the user with greater accuracy. In particular, this embodiment of the invention measures signal strength between the wireless device 703 and the IoT lock device 702 and also measures signal strength between the wireless device 703 and one or more IoT devices/hubs 710 to differentiate between cases where the user is outside the home and inside the home. For example, if the user is a particular distance from the IoT lock 702 inside or outside the home, then the signal strength 761 from the position inside the home and signal strength 760 outside the home may be roughly the same. In prior systems, such as illustrated in FIG. 6, there was no way to differentiate between these two cases. However, in the embodiment shown in FIG. 7, the differences in signal strength measurements 750 and 751, measured between the IoT hub/device 710 and the wireless device 703 when the user is outside the home and inside the home, respectively, are used to determine the location of the user. For example, when the wireless device 703 is at the outside location, the signal strength 750 may be measurably different than the signal strength 751 when the wireless device 703 is at the inside location. While in most cases the signal strength 751 inside the home should be stronger, there may be instances where the signal strength 751 is actually weaker. The important point is that the signal strength may be used to differentiate the two positions.

The signal strength values 760-761, 750-751 may be evaluated at the IoT hub/device 710 or at the IoT lock 702 (if it has the intelligence to perform this evaluation). The remainder of this discussion will assume that the signal strength evaluation is performed by an IoT hub 710, which may then transmit a lock or unlock command (or no command if already locked/unlocked) to the IoT lock 702 over a wireless communication channel 770 (e.g., BTLE) based on the results of the evaluation. It should be noted, however, that the same basic evaluation and result may be performed directly by the IoT lock 702 if it is configured with the logic to perform the evaluation (e.g., where the signal strength values are provided to the IoT lock 702).

Figure 8:
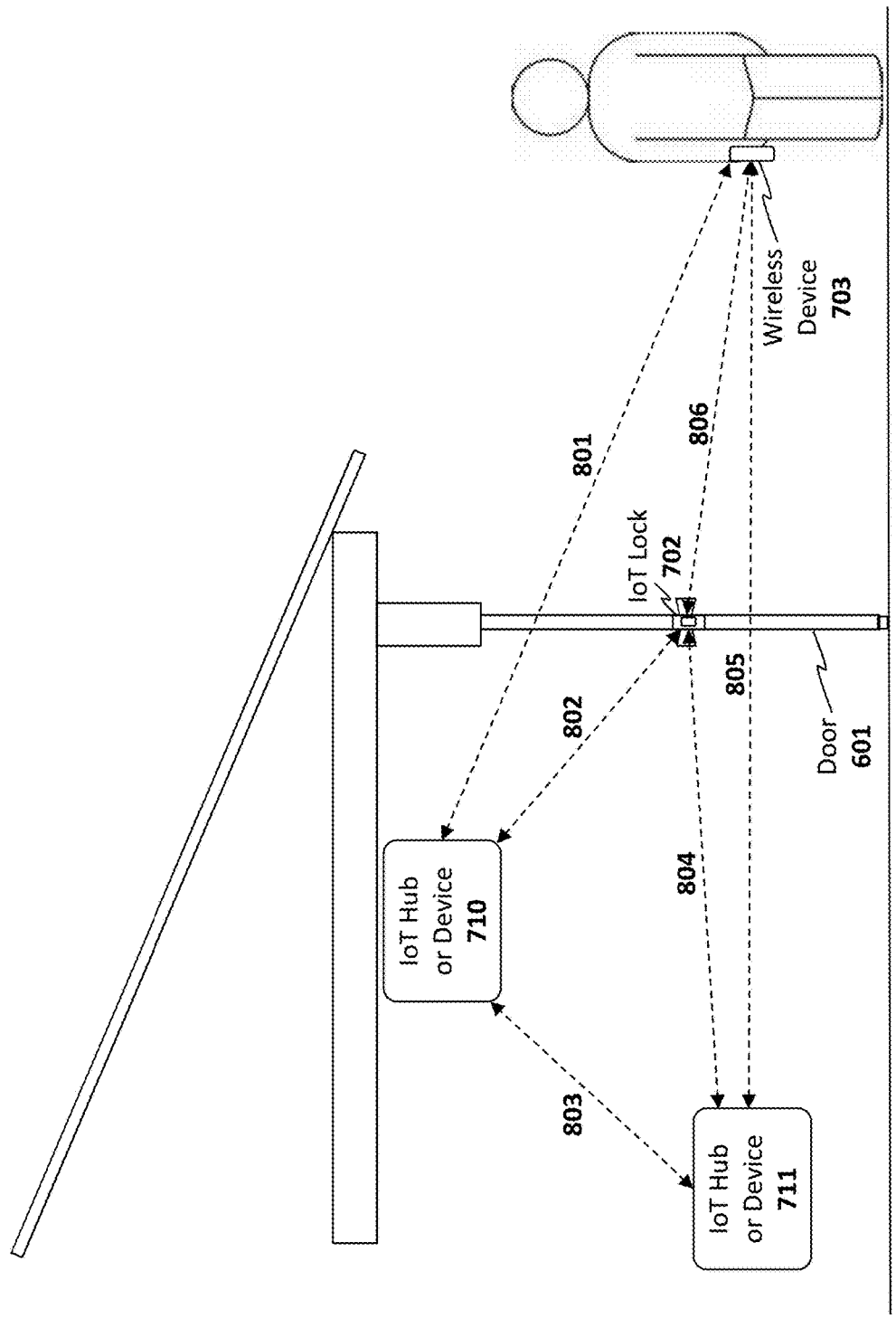
FIG. 8 illustrates another embodiment in which IoT devices and/or IoT hubs are employed to accurately detect the location of a user of a wireless lock system.

FIG. 8 illustrates another embodiment which is capable of providing greater accuracy, because it utilizes the signal strength values from two IoT hubs/devices 710-711. In this embodiment, the signal strength 805 is measured between the wireless device 703 and (1) IoT hub/device 711; (2) IoT hub/device 710; and (3) IoT lock 702. The wireless device is shown in a single position in FIG. 8 for simplicity.

In one embodiment, all of the collected signal strength values are provided to one of the IoT hub devices 710-711, which then evaluate the values to determine the location of the user (e.g., inside or outside). If it is determined that the user is outside, then the IoT hub/device 710 may send a command to the IoT lock 702 to unlock the door. Alternatively, if the IoT lock 702 has the logic to perform the evaluation, the IoT hubs/devices 710-711 may transmit the signal strength values to the IoT lock 702 which evaluates the signal strength values to determine the location of the user.

Figure 9:
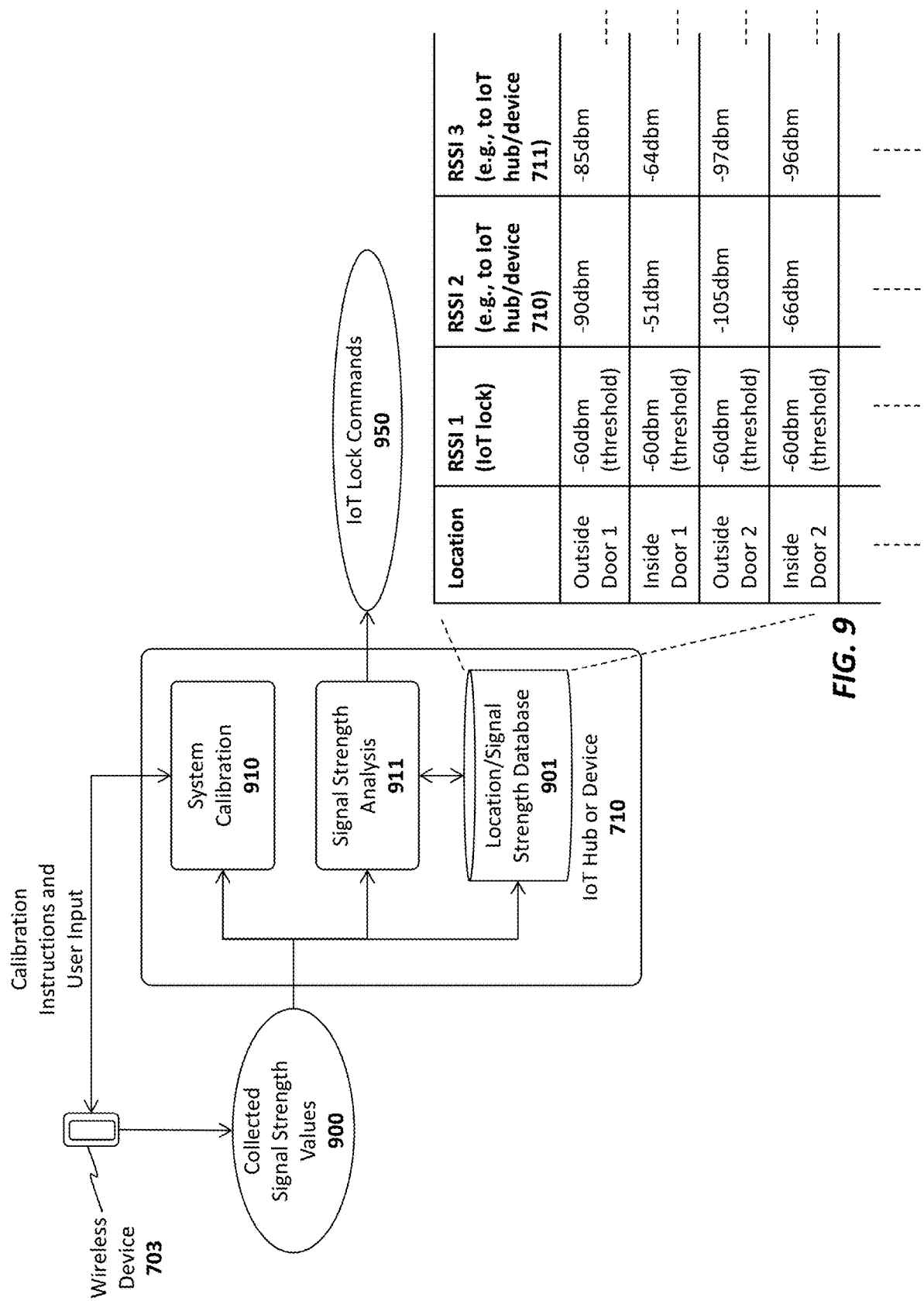
FIG. 9 illustrates one embodiment for calibrating a location detection system and detecting a location of a user based on signal strength values.

As illustrated in FIG. 9, in one embodiment, a calibration module 910 on the IoT hub 710 communicates with an app or browser-based code on the wireless device 703 to calibrate the signal strength measurements. During calibration, the system calibration module 910 and/or calibration app may instruct the user to stand in certain locations outside the door and inside the door (e.g., outside 6 ft outside door 1, 6 ft inside door 1, 6 ft outside door 2, etc). The user may indicate that he/she is in the desired position by selecting a graphic on the user interface. The system calibration app and/or system calibration module 910 will then associate the collected signal strength values 900 with each location within a location database 901 on the IoT hub/device 710.

Once the signal strength values for different known locations of the user are collected and stored in the database 901, a signal strength analysis module 911 uses these values to determine whether to send IoT lock commands 950 to lock/unlock the door based on the detected signal strength values. In the embodiment shown in FIG. 9, four exemplary locations are shown for two different doors: outside door 1, inside door 1, outside door 2, and inside door 2. The RSSI1 value is associated with the wireless lock and is set to a threshold value of −60 dbm. Thus, in one embodiment, the signal strength analysis module 911 will not perform its evaluation to determine the location of the user unless the RSSI1 value is at least −60 dmb. The RSSI2 and RSSI3 values are signal strength values measured between the user's wireless device and two different IoT hubs/devices.

Assuming that the RSSI1 threshold is reached, the signal strength analysis module 911 compares the current signal strength values 900 measured between the IoT hubs/devices and the user's wireless device with the RSSI2/RSSI3 values from the location database 901. If the current RSSI values are within a specified range of the values specified in the database for RSSI2 (e.g., for IoT hub/device 710) and RSSI3 (e.g. for IoT hub/device 711), then the wireless device is determined to be at or near the associated location. For example, because the RSSI2 value associated with the "outside door 1" location is −90 dbm (e.g., based on the measurement made during calibration), if the currently measured signal strength for RSSI2 is between −93 dbm and −87 dbm then the RSSI2 comparison may be verified (assuming a specified range of ±3 dbm). Similarly, because the RSSI3 value associated with the "outside door 1" location is −85 dbm (e.g., based on the measurement made during calibration), if the currently measured signal strength for RSSI3 is between −88 dbm and −82 dbm then the RSSI3 comparison may be verified. Thus, if the user is within the −60 dbm value for the IoT lock and within the above-specified ranges for RSSI2 and RSSI3, the signal strength analysis module 911 will send a command 950 to open the lock. By comparing the different RSSI values in this manner, the system avoids undesirable "unlock" events when the user passes within −60 dbm of the IoT lock from inside the home, because the RSSI measurements for RSSI2 and RSSI3 are used to differentiate the inside and outside cases.

In one embodiment, the signal strength analysis module 911 relies on RSSI values which provide the greatest amount of differentiation between the inside and outside cases. For example, there may be some instances where the RSSI values for the inside and outside cases are equivalent or very close (e.g., such as the RSSI3 values of −96 dbm and −97 dbm for inside door 2 and outside door 2, respectively). In such a case, the signal strength analysis module will use the other RSSI value to differentiate the two cases. In addition, in one embodiment, the signal strength analysis module 911 may dynamically adjust the RSSI ranges used for the comparison when the recorded RSSI values are close (e.g., making the ranges smaller when the measured RSSI values are closer). Thus, while ±3 dbm is used as a comparison range for the example above, various different ranges may be set for the comparison based on the how close the RSSI measurements are.

In one embodiment, the system calibration module 910 system continues to train the system by measuring dbm values each time the user enters through a door. For example, in response to the user successfully entering the home following the initial calibration, the system calibration module 910 may store additional RSSI values for RSSI2 and RSSI3. In this manner, a range of RSSI values may be stored for each case in the location/signal strength database 901 to further differentiate between the inside and outside cases. The end result is a far more accurate wireless lock system than currently available.

Figure 10:
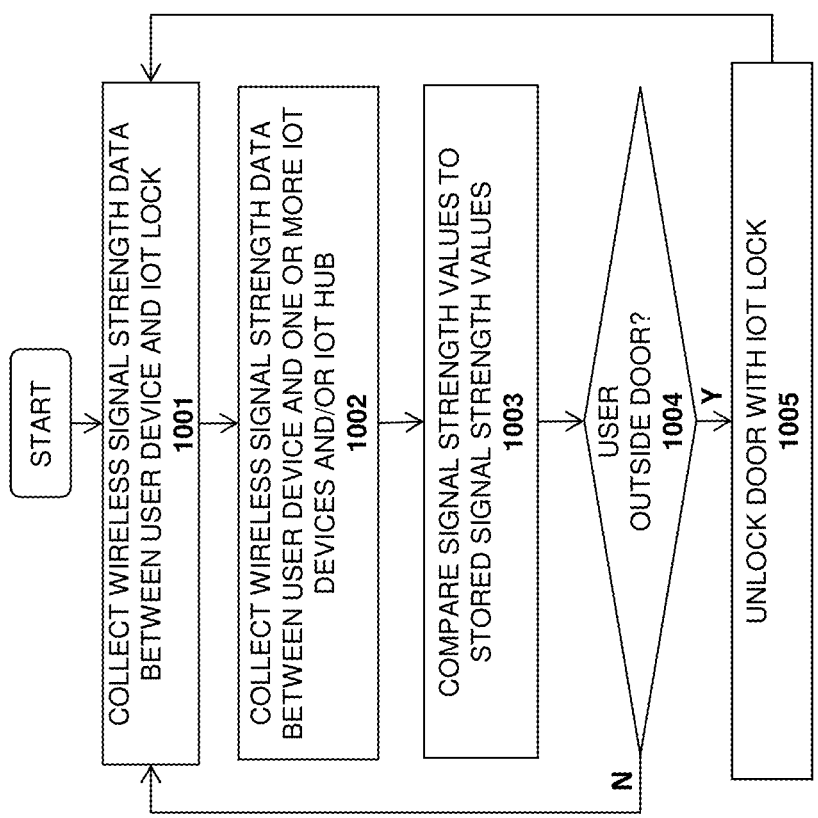
FIG. 10 illustrates a method for implementing a wireless lock system using IoT devices and/or IoT hubs.

A method in accordance with one embodiment of the invention is illustrated in FIG. 10. The method may be implemented within the context of the system architectures described above, but is not limited to any specific system architecture.

At 1001, the wireless signals strength between a user device and an IoT lock is measured. At 1002, if the signal strength is above a specified threshold (i.e., indicating that the user is near the door), then at 1002, the wireless signal strength between the user device and one or more IoT hubs/devices is measured. At 1003, the collected wireless signal strength values are compared with previously collected and stored signal strength values to determine the location of the user. For example, if the RSSI values are within a specified range of RSSI values when the user was previously outside of the door, then it may be determined that the user is presently outside of the door. At 1004, based on the evaluation, a determination is made as to whether the user is outside of the door. If so, then at 1005, the door is automatically unlocked using the IoT lock.

Figure 11:
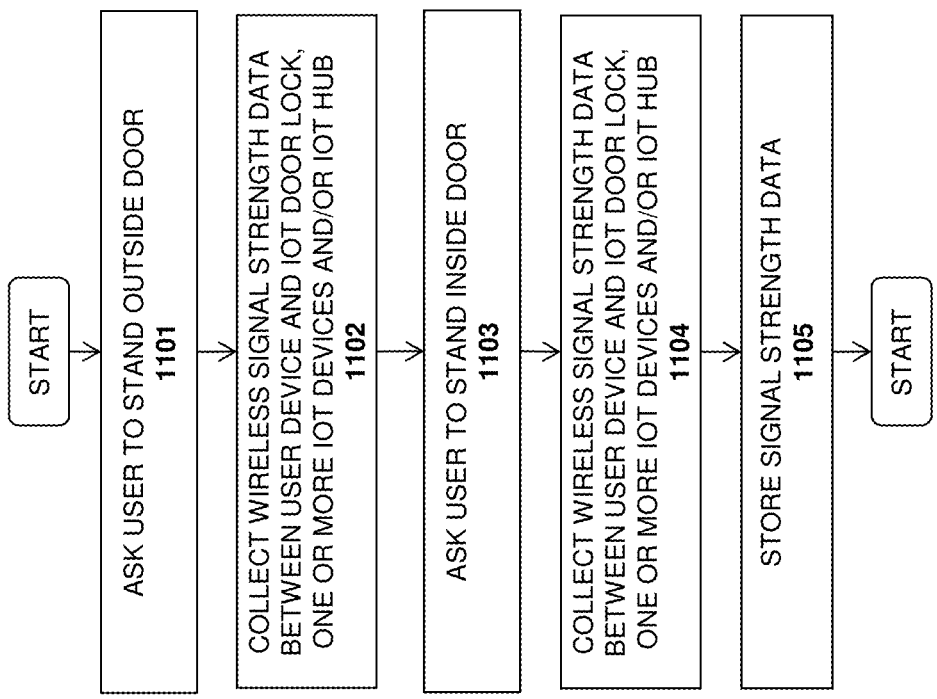
FIG. 11 illustrates one embodiment of a method for calibrating a wireless lock system.

A method for calibrating the IoT lock system is illustrated in FIG. 11. At 1101, the user is asked to stand outside of the door and at 1102, the wireless signal strength data is collected between the user device and one or more IoT devices/hubs. As mentioned, the request may be sent to the user via a user app installed on the user's wireless device. At 1103, the user is asked to stand inside of the door and at 1104, the wireless signal strength data is collected between the user device and the IoT devices/hubs. At 1105, the signal strength data is stored in a database so that it may be used to compare signal strength values as described herein to determine the user's current location.

Note that while a user's home is used herein as an exemplary embodiment, the embodiments of the invention are not limited to a consumer application. For example, these same techniques may be employed to provide access to businesses or other types of buildings.

In one embodiment, similar techniques as described above are used to track the user throughout the user's home. For example, by tracking the RSSI measurements between the user's wireless device and various IoT devices/hubs in the user's home, a "map" of different user locations may be compiled. This map may then be used to provide services to the end user, such as directing audio to speakers in the room in which the user is presently located.

Figure 12:
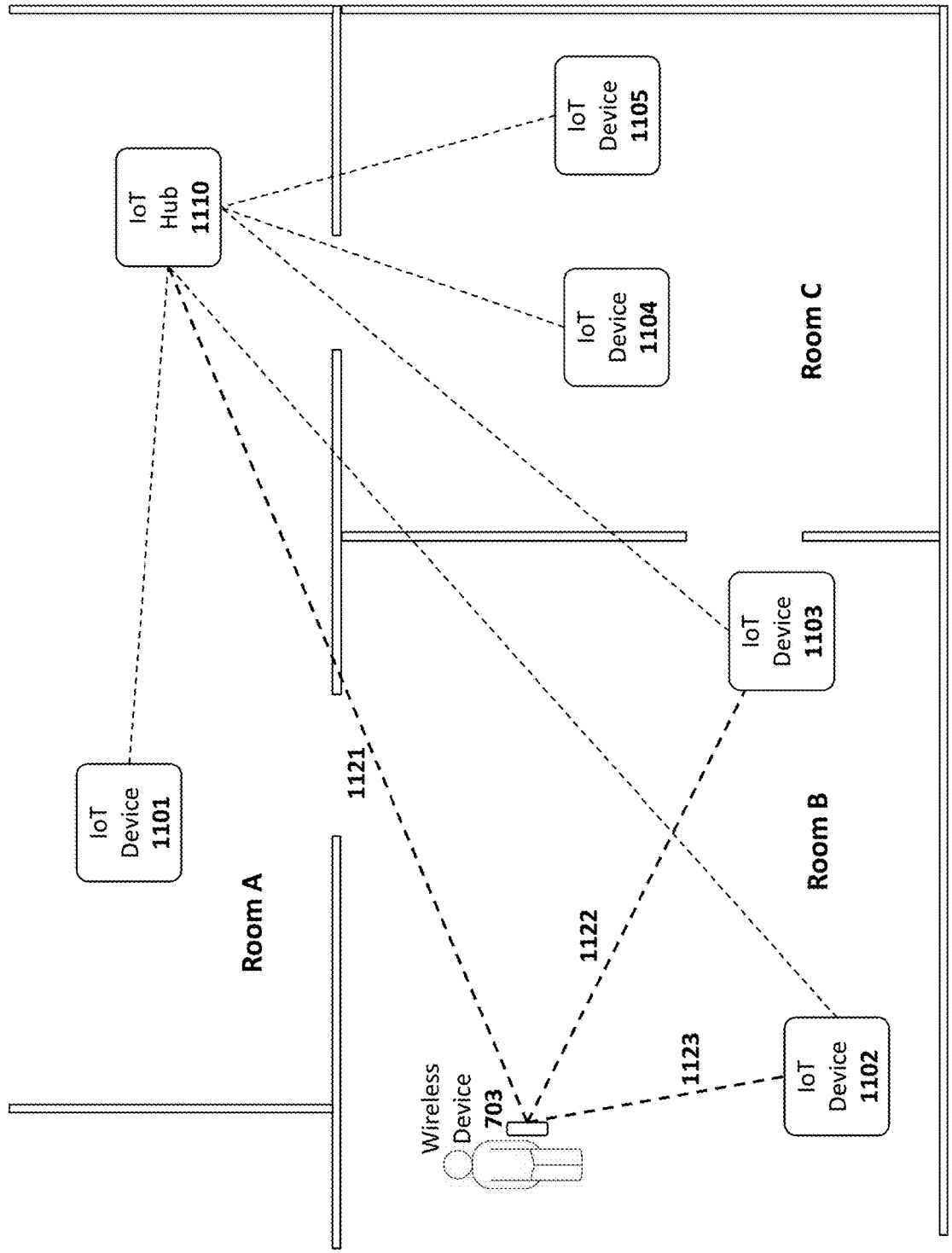
FIG. 12 illustrates one embodiment of the invention for determining the location of a user with signal strength values.

FIG. 12 provides an overview of an exemplary system in which RSSI values measured between the wireless device 703 and a plurality of IoT devices 1101-1105 and IoT hub 1110 are used to determine whether the user is in Rooms A, B, or C. In particular, based on the RSSI values 1121-1123 measured between the wireless device 703 and the IoT hub 1110, IoT device 1103, and IoT device 1102, the IoT hub 1110 may determine that the user is presently in Room B, as illustrated. Similarly, when the user moves into Room C, RSSI measurements between the wireless device 703 and IoT devices 1104-1105 and IoT hub 1110 may then be used to determine that the user is in Room C. While only 3 RSSI measurements 1121-1123 are shown in FIG. 12, RSSI measurements may be made between any IoT device or IoT hub within range of the wireless device 703 to provide greater accuracy.

In one embodiment, the IoT hub 1110 may employ triangulation techniques based on RSSI values between itself and the various IoT devices 1101-1105 and the wireless device 703 to triangulate the location of the user. For example, the RSSI triangle formed between IoT device 1102, the IoT hub 1110 and the wireless device 703 may be used to determine the present location of the wireless device 703, based on the RSSI values for each edge of the triangle.

Figure 13:
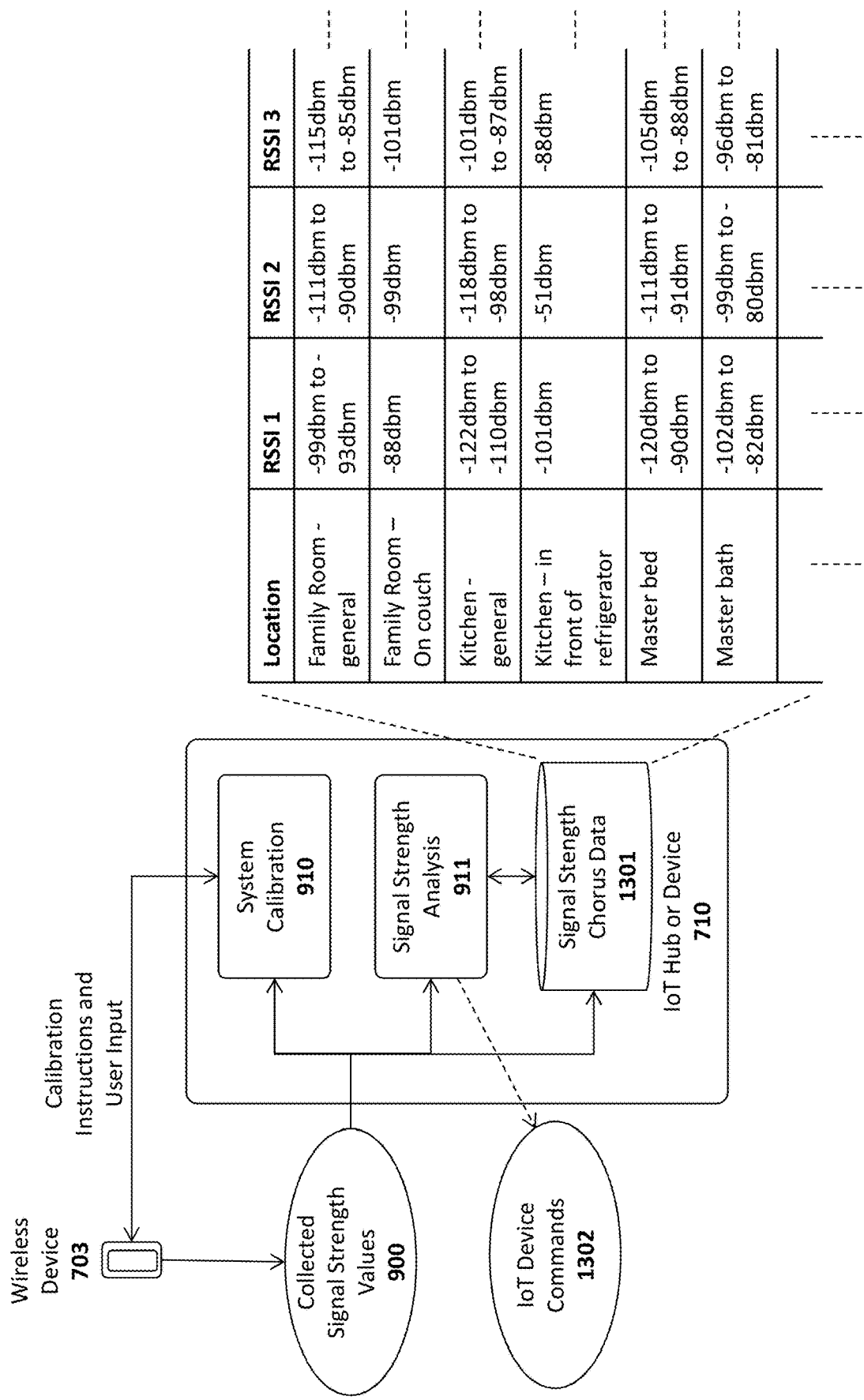
FIG. 13 illustrates another embodiment for calibrating a location detection system and detecting a location of a user based on signal strength values.

In one embodiment, similar calibration techniques to those described above may be used to collect signal strength values in each room. FIG. 13 illustrates the system calibration module 910 which, as in the embodiments described above, communicates with an app or browser-based code on the wireless device 703 to calibrate the signal strength measurements. During calibration, the system calibration module 910 and/or calibration app may instruct the user to stand in different rooms and in certain locations within each room, depending on the applications for which the IoT system is being used. As described above, the user may indicate that he/she is in the desired position by selecting a graphic on the user interface. The system calibration app and/or system calibration module 910 will then associate the collected signal strength values 900 with each location within a location database 1301 on the IoT hub/device 710.

Once the signal strength values for different known locations of the user are collected and stored in the database 1301, a signal strength analysis module 911 uses these values to control the various IoT devices 1101-1105 around the user's home. For example, if the IoT devices 1101-1105 comprise speakers or amplifiers for a home audio system, the signal strength analysis module 911 may transmit IoT device commands 1302 to control the rooms in which the audio is being played back (e.g., turning on speakers in the room in which the user is present and turning off speakers in other rooms). Similarly, if the IoT devices 1101-1105 comprise lighting control units, then the signal strength analysis module 911 may transmit IoT device commands 1302 to turn on lights in the room in which the user is present and turn off lights in the other rooms. Of course, the underlying principles of the invention are not limited to any specific end-user applications.

As mentioned, one embodiment of the system calibration module 910 will collect RSSI data for different points within a room based on the application. In FIG. 13, RSSI ranges are collected for each room by instructing the user to stand in different positions within the room. For example, for the user's Family Room, RSSI ranges of −99 dbm to −93 dbm, −111 dbm to −90 dbm and −115 dbm to −85 dbm are collected for RSSI1, RSSI2, and RSSI3, respectively (i.e., collected from three different IoT devices/hubs). When the current position of the wireless device 703 falls within each of these ranges, the signal strength analysis module 911 will determine that the user is in the Family Room and potentially send IoT device commands 1302 to perform a specified set of functions (e.g., turn on lights, audio, etc). In addition, for specific points within the room, specific RSSI values may be collected. For example, in FIG. 13, values of −88 dbm, −99 dbm, and −101 dbm have been collected when the user is sitting on the sofa in the family room. As in the embodiments described above, the signal strength analysis module 911 may determine that the user is on the couch if the RSSI values are within a specified range of the stored RSSI values (e.g., within while ±3 dbm). In addition, as in prior embodiments, the system calibration module 910 may continue to collect data for the different locations to ensure that the RSSI values remain current. For example, if the user rearranges the Family Room, the position of the couch may move. In this case, the system calibration module 910 may ask the user if the user is currently sitting the couch (e.g., given the similarity of the RSSI values from those stored in the database), and update the signal strength database 1301 with the new values.

In one embodiment, the user's interaction with various types of IoT devices may be used to determine the location of the user. For example, if the user's refrigerator is equipped with an IoT device, then the system may take RSSI measurements upon detecting that the user has opened the refrigerator door. Similarly, if the lighting system comprises an IoT system, when the user adjusts the lights in different rooms of the home or business, the system may automatically take RSSI measurements. By way of another example, when the user interacts with various appliances (e.g., washers, dryers, dishwasher), audiovisual equipment (e.g., televisions, audio equipment, etc), or HVAC systems (e.g., adjusting the thermostat), the system may capture RSSI measurements and associate the measurements with these locations.

While a single user is described in the embodiments set forth above, the embodiments of the invention may be implemented for multiple users. For example, the system calibration module 910 may collect signal strength values for both User A and User B to be stored in the signal strength database 1301. The signal strength analysis module 911 may then identify the current location of Users A and B based on comparisons of signal strength measurements and send IoT commands 1302 to control IoT devices around the home of Users A and B (e.g., keeping on lights/speakers in the rooms in which Users A and B are present).

The wireless device 703 employed in the embodiments of the invention described herein may be a smartphone, tablet, wearable device (e.g., a smartwatch, token on a neckless or bracelet), or any other form of wireless device 703 capable of detecting RSSI values. In one embodiment, the wireless device 703 communicates with the IoT devices 1101-1105 and IoT hub 1110 via a short range, low power wireless communication protocol such as Bluetooth LE (BTLE). In addition, in one embodiment, the wireless device 703 communicates with the IoT hub 1110 via a longer range wireless protocol such as Wifi. Thus, in this embodiment, the RSSI values may be gathered by the wireless device 703 and communicated back to the IoT hub 1110 using the longer range protocol. In addition, each of the individual IoT devices 1101-1105 may collect the RSSI values and communicate these values back to the IoT hub 1110 via the short range wireless protocol. The underlying principles of the invention are not limited to any specific protocol or technique used to collect the RSSI values.

One embodiment of the invention uses the techniques described herein to locate an ideal position for a wireless extender to extend the range of the IoT hub 1110 using the short range wireless protocol. For example, in one embodiment, upon purchasing a new extender the system calibration module 910 will send instructions for the user to move into each of the rooms of the user's home with the wireless extender device (e.g., by sending instructions to the app on the wireless device 703). A connection wizard may also be executed on the wireless device 703 to step the user through the process. Following the instructions sent by the system calibration module 910 or from the wizard, the user will walk into each room and press a button on the wireless device 703. The IoT hub 1110 will then measure signal strength between itself and the extender and also the signal strength between the extender and all of the other IoT devices in the system. The system calibration module 910 or wireless device wizard may then provide the user will a prioritized list of the best locations to place the wireless extender (i.e., selecting those locations with the highest signal strength between the wireless extender and the IoT hub 1110 and/or between the wireless extender and the IoT devices 1101-1105).

The embodiments of the invention described above provide for fine-tuned location awareness within an IoT system not found in current IoT systems. In addition, to improve location accuracy, in one embodiment the GPS system on the wireless device 703 may communicate precise GPS data to be used to provide an accurate map of the user's home which will include GPS data as well as RSSI data for each location.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 14-19 and associated text). Alternatively, the keys may be secured in a subscriber identify module (SIM) as discussed below.

Figure 14:
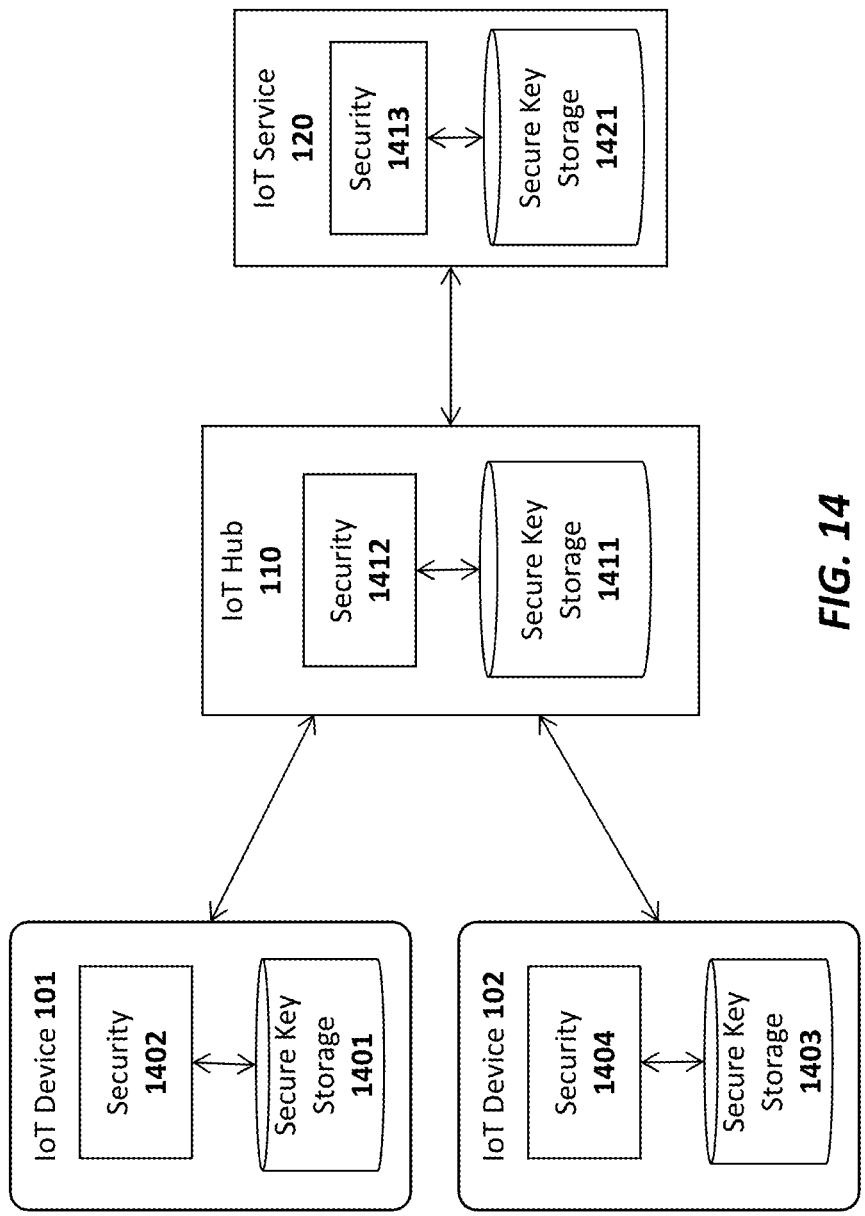
FIG. 14 illustrates embodiments of the invention which implements improved security techniques such as encryption and digital signatures.

FIG. 14 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1401, 1403, respectively, for security storing each device's private key. Security logic 1402, 1304 then utilizes the securely stored private keys to perform the encryption/decryption operations described herein. Similarly, the IoT hub 110 includes a secure storage 1411 for storing the IoT hub private key and the public keys of the IoT devices 101-102 and the IoT service 120; as well as security logic 1412 for using the keys to perform encryption/decryption operations. Finally, the IoT service 120 may include a secure storage 1421 for security storing its own private key, the public keys of various IoT devices and IoT hubs, and a security logic 1413 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1411.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1413 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1412 in the IoT hub is trusted, the service 120 could negotiate a session key with the hub security module 1312 and then the security module 1412 would negotiate a session key with each device 120. Messages from the service 120 would then be decrypted and verified in the hub security module 1412 before being re-encrypted for transmission to the device 101.

In one embodiment, to prevent a compromise on the hub security module 1412 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1402 on the IoT device 101 uses the public key of the IoT hub 110 to encrypt data packets sent to the IoT hub 110. The security logic 1412 on the IoT hub 110 may then decrypt the data packets using the IoT hub's private key. Similarly, the security logic 1402 on the IoT device 101 and/or the security logic 1412 on the IoT hub 110 may encrypt data packets sent to the IoT service 120 using the public key of the IoT service 120 (which may then be decrypted by the security logic 1413 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 15:
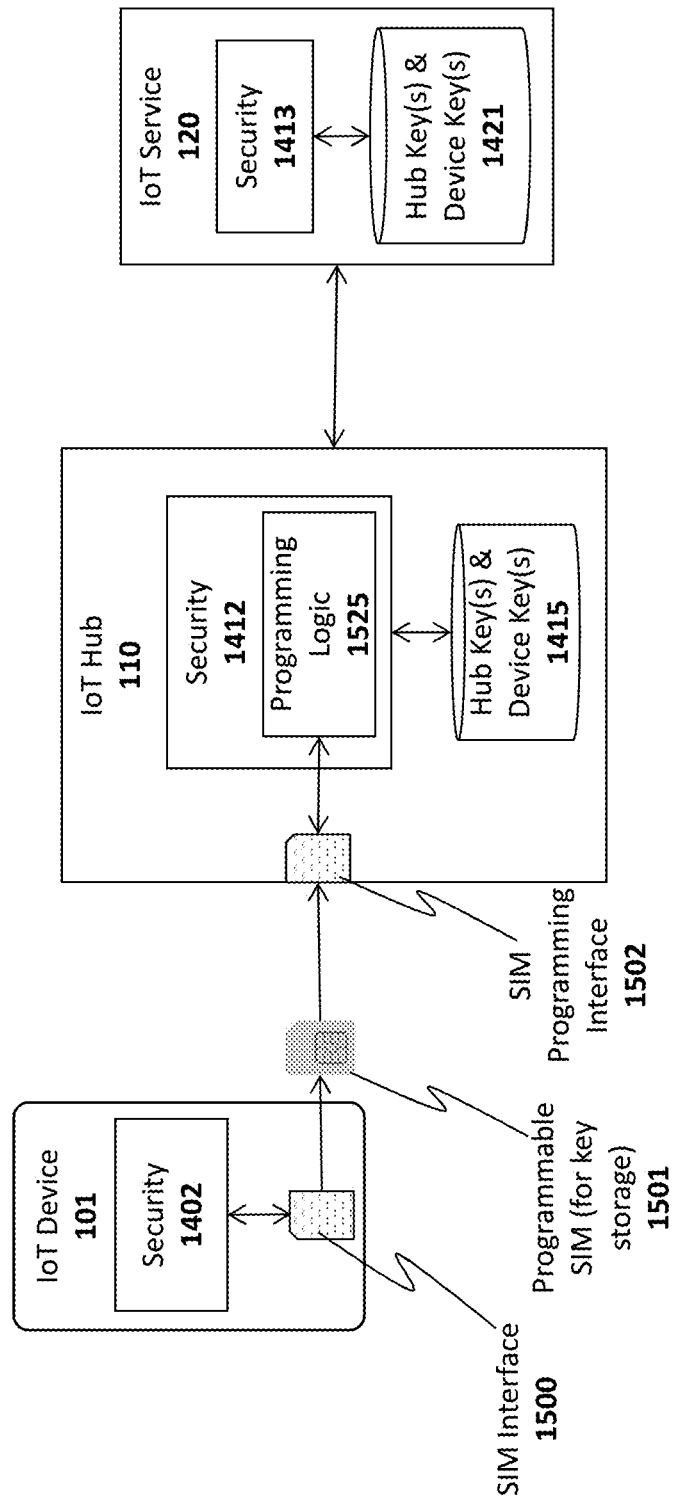
FIG. 15 illustrates one embodiment of an architecture in which a subscriber identity module (SIM) is used to store keys on IoT devices.

As illustrated in FIG. 15, in one embodiment, the secure key storage on each IoT device 101 is implemented using a programmable subscriber identity module (SIM) 1501. In this embodiment, the IoT device 101 may initially be provided to the end user with an un-programmed SIM card 1501 seated within a SIM interface 1500 on the IoT device 101. In order to program the SIM with a set of one or more encryption keys, the user takes the programmable SIM card 1501 out of the SIM interface 500 and inserts it into a SIM programming interface 1502 on the IoT hub 110. Programming logic 1525 on the IoT hub then securely programs the SIM card 1501 to register/pair the IoT device 101 with the IoT hub 110 and IoT service 120. In one embodiment, a public/private key pair may be randomly generated by the programming logic 1525 and the public key of the pair may then be stored in the IoT hub's secure storage device 411 while the private key may be stored within the programmable SIM 1501. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1501 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 15 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1502 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 16A:
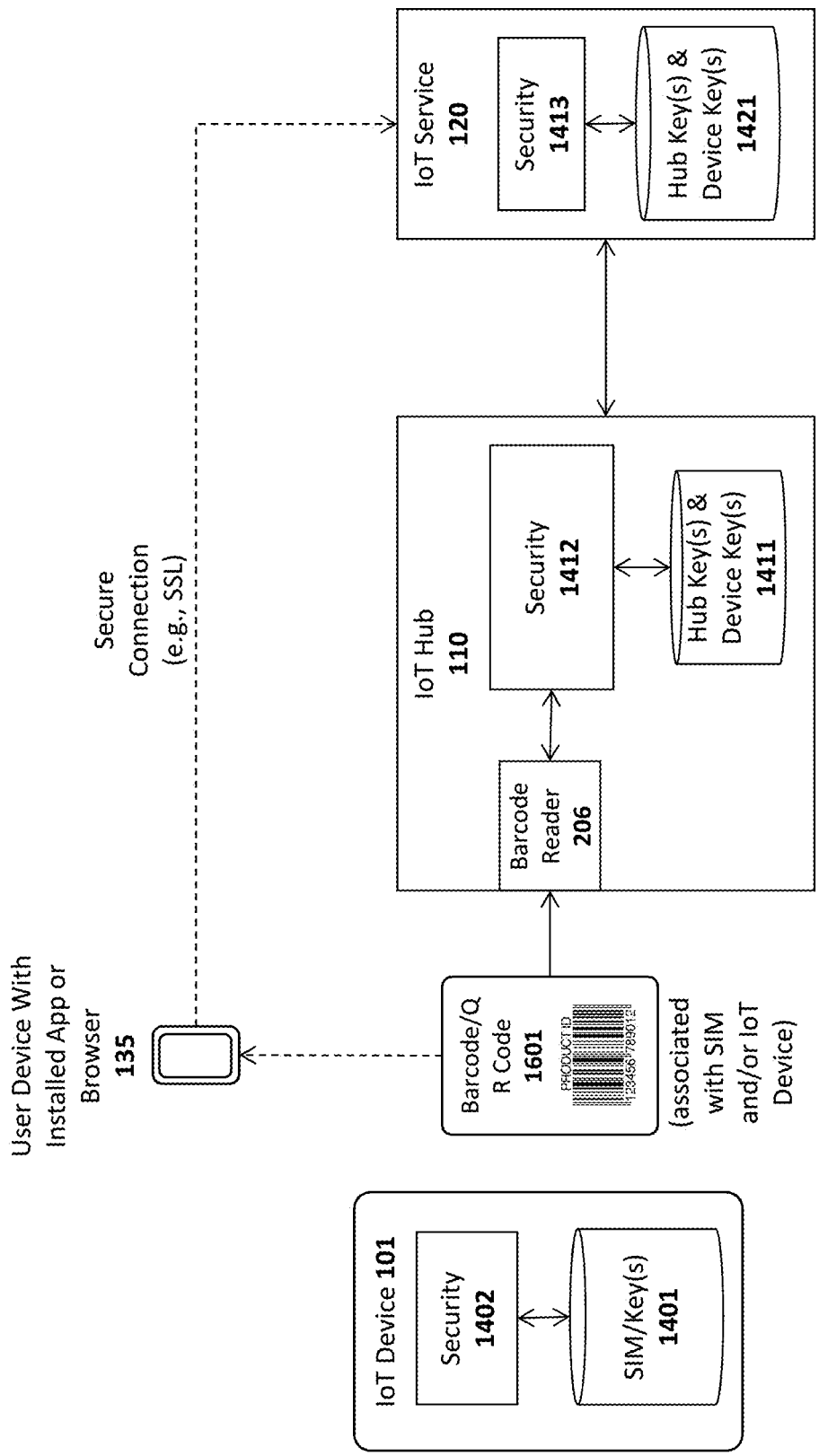
FIG. 16A illustrates one embodiment in which IoT devices are registered using barcodes or QR codes.

For example, as illustrated in FIG. 16A each IoT device 101 or SIM 401 may be packaged with a barcode or QR code 1501 uniquely identifying the IoT device 101 and/or SIM 1501. In one embodiment, the barcode or QR code 1601 comprises an encoded representation of the public key for the IoT device 101 or SIM 1001. Alternatively, the barcode or QR code 1601 may be used by the IoT hub 110 and/or IoT service 120 to identify or generate the public key (e.g., used as a pointer to the public key which is already stored in secure storage). The barcode or QR code 601 may be printed on a separate card (as shown in FIG. 16A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1601 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 16B:
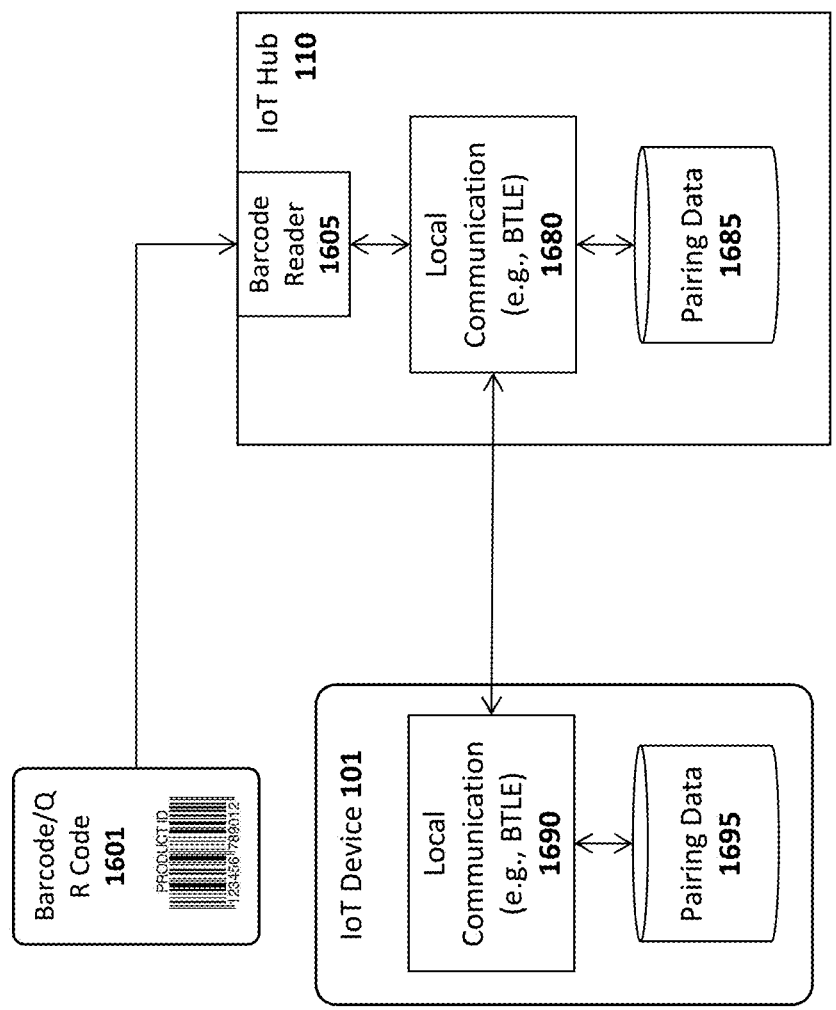
FIG. 16B illustrates one embodiment in which pairing is performed using barcodes or QR codes.

FIG. 16B illustrates one embodiment in which the barcode reader 206 on the IoT hub 110 captures the barcode/QR code 1601 associated with the IoT device 101. As mentioned, the barcode/QR code 1601 may be printed directly on the IoT device 101 or may be printed on a separate card provided with the IoT device 101. In either case, the barcode reader 206 reads the pairing code from the barcode/QR code 1601 and provides the pairing code to the local communication module 1680. In one embodiment, the local communication module 1680 is a Bluetooth LE chip and associated software, although the underlying principles of the invention are not limited to any particular protocol standard. Once the pairing code is received, it is stored in a secure storage containing pairing data 1685 and the IoT device 101 and IoT hub 110 are automatically paired. Each time the IoT hub is paired with a new IoT device in this manner, the pairing data for that pairing is stored within the secure storage 685. In one embodiment, once the local communication module 1680 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1695 may include the pre-programmed pairing code identified in the barcode/QR code 1601. The pairing data 1695 may also include pairing data received from the local communication module 1680 on the IoT hub 110 required for establishing a secure local communication channel (e.g., an additional key to encrypt communication with the IoT hub 110).

Thus, the barcode/QR code 1601 may be used to perform local pairing in a far more secure manner than current wireless pairing protocols because the pairing code is not transmitted over the air. In addition, in one embodiment, the same barcode/QR code 1601 used for pairing may be used to identify encryption keys to build a secure connection from the IoT device 101 to the IoT hub 110 and from the IoT hub 110 to the IoT service 120.

Figure 17:
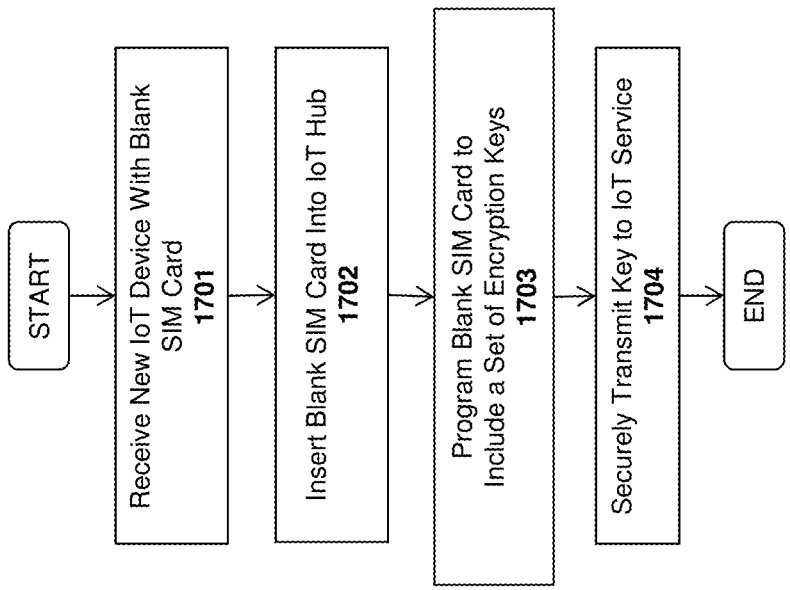
FIG. 17 illustrates one embodiment of a method for programming a SIM using an IoT hub.

A method for programming a SIM card in accordance with one embodiment of the invention is illustrated in FIG. 17. The method may be implemented within the system architecture described above, but is not limited to any particular system architecture.

At 1701, a user receives a new IoT device with a blank SIM card and, at 1602, the user inserts the blank SIM card into an IoT hub. At 1703, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1704, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 17.

Figure 18:
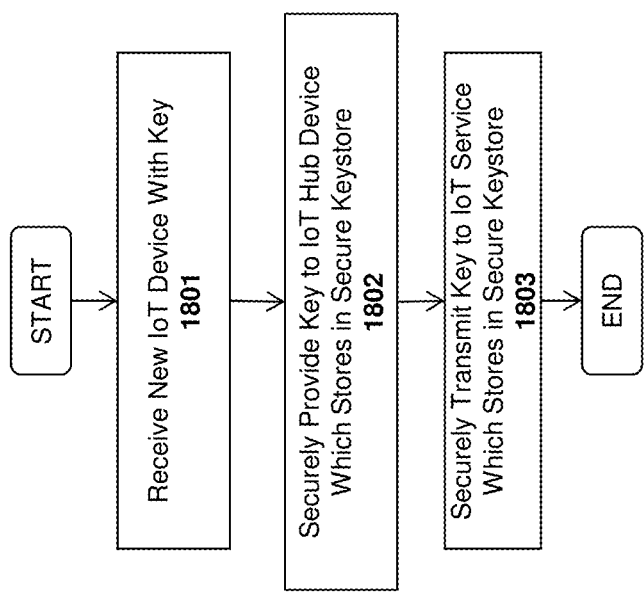
FIG. 18 illustrates one embodiment of a method for registering an IoT device with an IoT hub and IoT service.

A method for integrating a new IoT device into a network is illustrated in FIG. 18. The method may be implemented within the system architecture described above, but is not limited to any particular system architecture.

At 1801, a user receives a new IoT device to which an encryption key has been pre-assigned. At 1802, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1803, the key is securely transmitted to the IoT service which stores the key in its own secure keystore. It may then use the key to encrypt communication with the IoT device.

One again, the exchange may be implemented using a certificate/signed key. Within the hub 110 it is particularly important to prevent modification/addition/removal of the stored keys.

Figure 19:
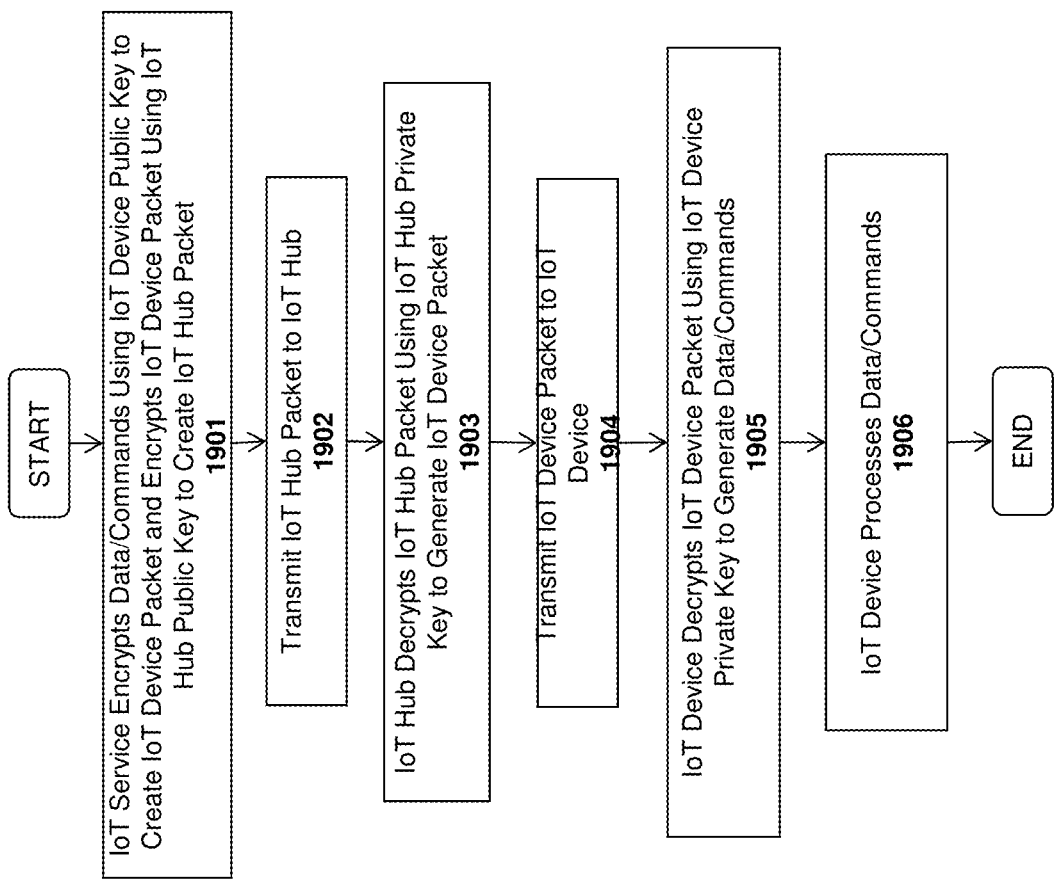
FIG. 19 illustrates one embodiment of a method for encrypting data to be transmitted to an IoT device.

A method for securely communicating commands/data to an IoT device using public/private keys is illustrated in FIG. 19. The method may be implemented within the system architecture described above, but is not limited to any particular system architecture.

At 1901, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1902, the IoT service transmits the IoT hub packet to the IoT hub. At 1903, the IoT hub decrypts the IoT hub packet using the IoT hub's private key to generate the IoT device packet. At 1904 it then transmits the IoT device packet to the IoT device which, at 1905, decrypts the IoT device packet using the IoT device private key to generate the data/commands. At 1906, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 20:
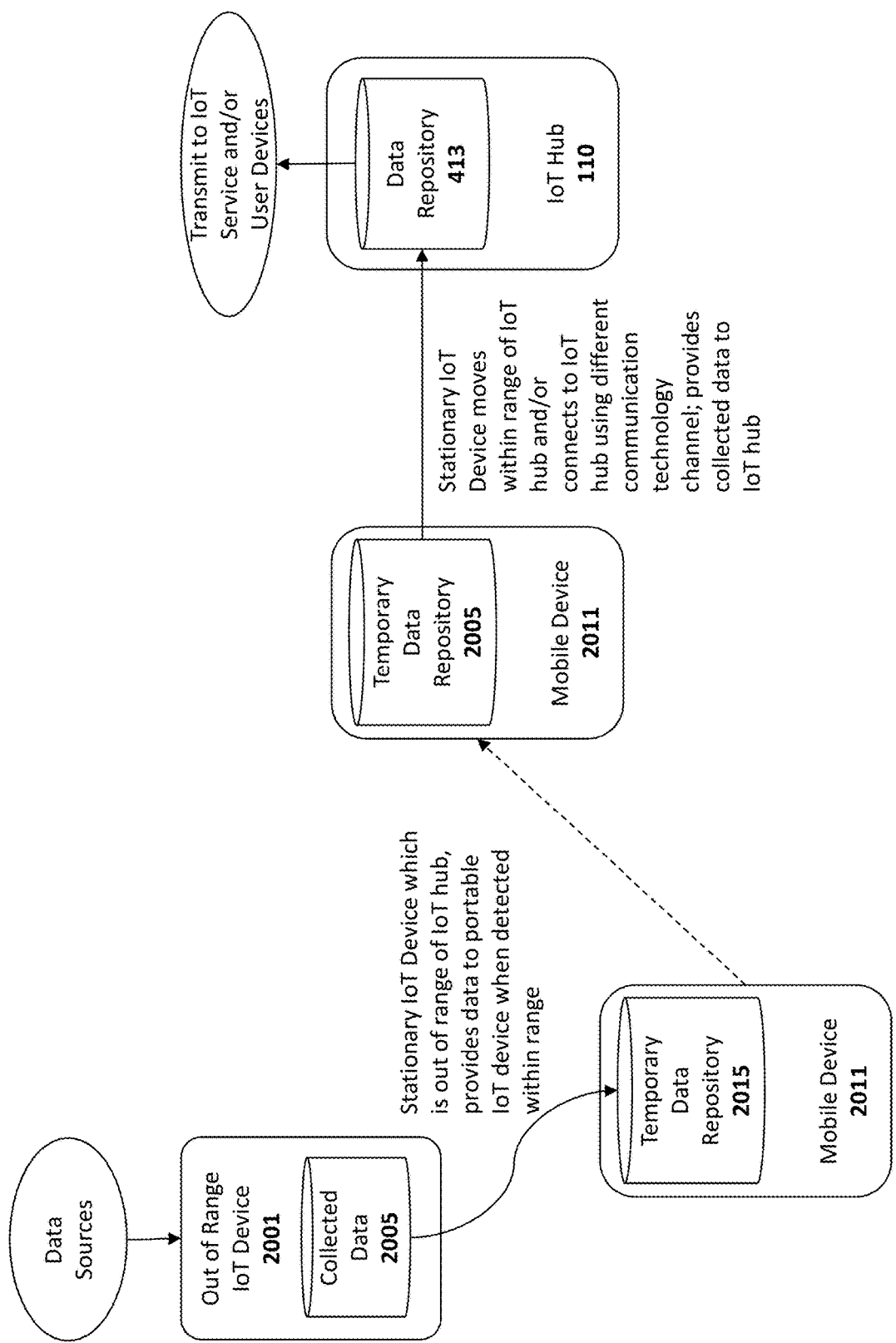
FIG. 20 illustrates one embodiment of a system in which an intermediary mobile device collects data from a stationary IoT device and provides the data to an IoT hub.

As illustrated in FIG. 20 one embodiment includes an IoT hub 110, an IoT device 2001 which is out of range of the IoT hub 110 and a mobile device 2011. The out of range IoT device 2001 may include any form of IoT device capable of collecting and communicating data. For example, the IoT device 2001 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 2011 illustrated in FIG. 20 may be any form of mobile device capable of communicating and storing data. For example, in one embodiment, the mobile device 2011 is a smartphone with an app installed thereon to facilitate the techniques described herein. In another embodiment, the mobile device 2011 comprises a wearable device such as a communication token affixed to a neckless or bracelet, a smartwatch or a fitness device. The wearable token may be particularly useful for elderly users or other users who do not own a smartphone device.

In operation, the out of range IoT device 2001 may periodically or continually check for connectivity with a mobile device 2011. Upon establishing a connection (e.g., as the result of the user moving within the vicinity of the refrigerator) any collected data 2005 on the IoT device 2001 is automatically transmitted to a temporary data repository 2015 on the mobile device 2011. In one embodiment, the IoT device 2001 and mobile device 2011 establish a local wireless communication channel using a low power wireless standard such as BTLE. In such a case, the mobile device 2011 may initially be paired with the IoT device 2001 using known pairing techniques.

One the data has been transferred to the temporary data repository, the mobile device 2011 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 2011 may use a different type of communication channel to provide the data to the IoT hub 110 (potentially a higher power communication channel such as WiFi).

Figure 21:
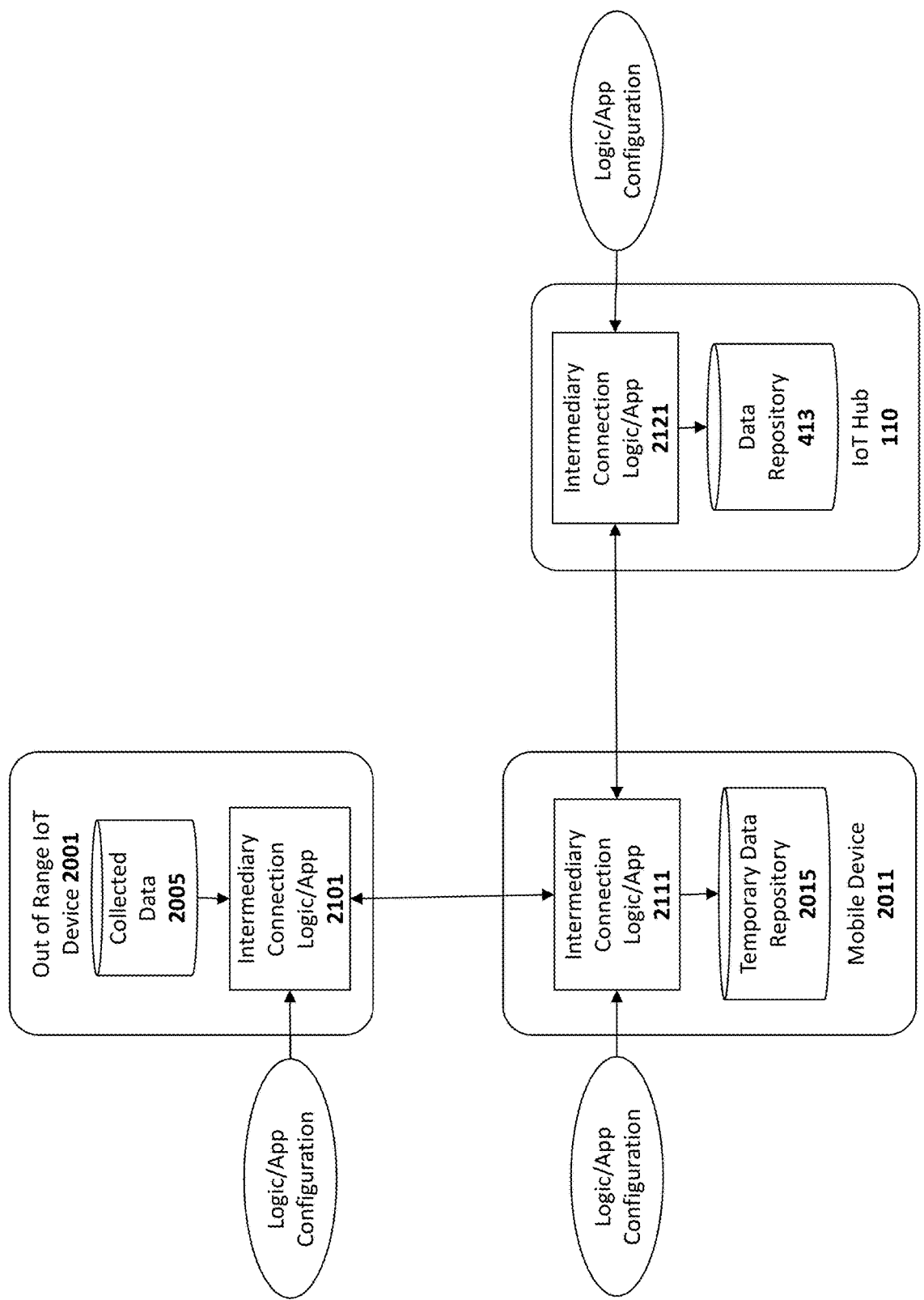
FIG. 21 illustrates intermediary connection logic implemented in one embodiment of the invention.

The out of range IoT device 2001, the mobile device 2011, and the IoT hub may all be configured with program code and/or logic to implement the techniques described herein. As illustrated in FIG. 21, for example, the IoT device 2001 may be configured with intermediary connection logic and/or application, the mobile device 2011 may be configured with an intermediary connection logic/application, and the IoT hub 110 may be configured with an intermediary connection logic/application 2121 to perform the operations described herein. The intermediary connection logic/application on each device may be implemented in hardware, software, or any combination thereof. In one embodiment, the intermediary connection logic/application 2101 of the IoT device 2001 searches and establishes a connection with the intermediary connection logic/application 2111 on the mobile device (which may be implemented as a device app) to transfer the data to the temporary data repository 2015. The intermediary connection logic/application 2101 on the mobile device 2011 then forwards the data to the intermediary connection logic/application on the IoT hub, which stores the data in the central data repository 413.

As illustrated in FIG. 21, the intermediary connection logic/applications 2101, 2111, 2121, on each device may be configured based on the application at hand. For example, for a refrigerator, the connection logic/application 2101 may only need to transmit a few packets on a periodic basis. For other applications (e.g., temperature sensors), the connection logic/application 2101 may need to transmit more frequent updates.

Rather than a mobile device 2011, in one embodiment, the IoT device 2001 may be configured to establish a wireless connection with one or more intermediary IoT devices, which are located within range of the IoT hub 110. In this embodiment, any IoT devices 2001 out of range of the IoT hub may be linked to the hub by forming a "chain" using other IoT devices.

In addition, while only a single mobile device 2011 is illustrated in FIGS. 20-21 for simplicity, in one embodiment, multiple such mobile devices of different users may be configured to communicate with the IoT device 2001. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 2011 connects with the IoT device 2001, the identity of the user may be included with the collected data 2005. In this manner, the IoT system may be used to track the behavior of different users within the home. For example, if used within a refrigerator, the collected data 2005 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 2011 may be a very small token worn by the elderly user to collect the information in different rooms of the user's home. Each time the user opens the refrigerator, for example, this data will be included with the collected data 2005 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 2005 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 22:
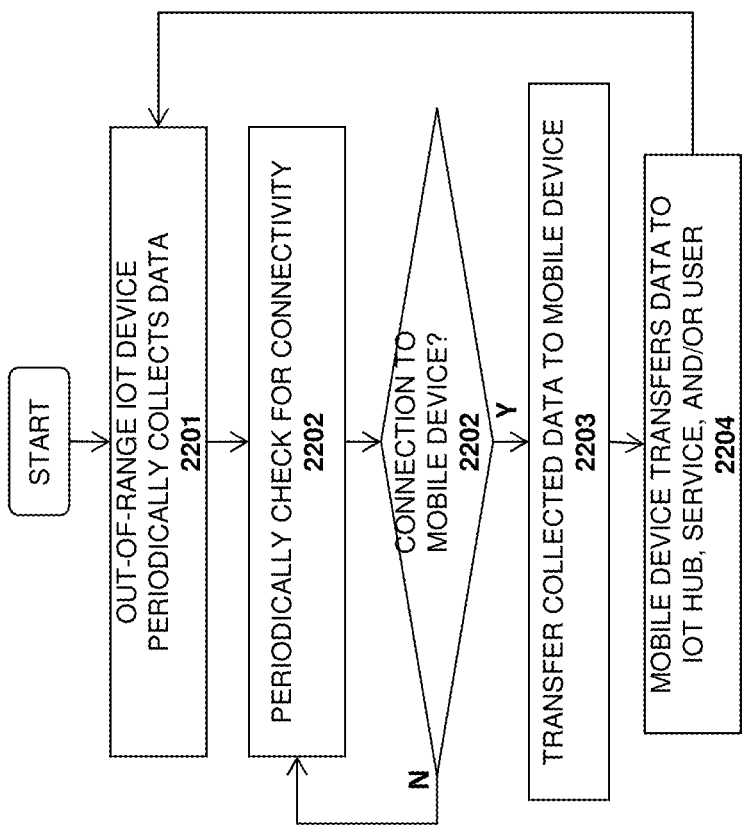
FIG. 22 illustrates a method in accordance with one embodiment of the invention.

A method in accordance with one embodiment of the invention is illustrated in FIG. 22. The method may be implemented within the context of the architectures described above, but is not limited to any particular architecture.

At 2201, an IoT device which is out of range of the IoT hub periodically collects data (e.g., opening of the refrigerator door, food items used, etc). At 2202 the IoT device periodically or continually checks for connectivity with a mobile device (e.g., using standard local wireless techniques for establishing a connection such as those specified by the BTLE standard). If the connection to the mobile device is established, determined at 2202, then at 2203, the collected data is transferred to the mobile device at 2203. At 2204, the mobile device transfers the data to the IoT hub, an external service and/or a user. As mentioned, the mobile device may transmit the data immediately if it is already connected (e.g., via a WiFi link).

Figure 23A:
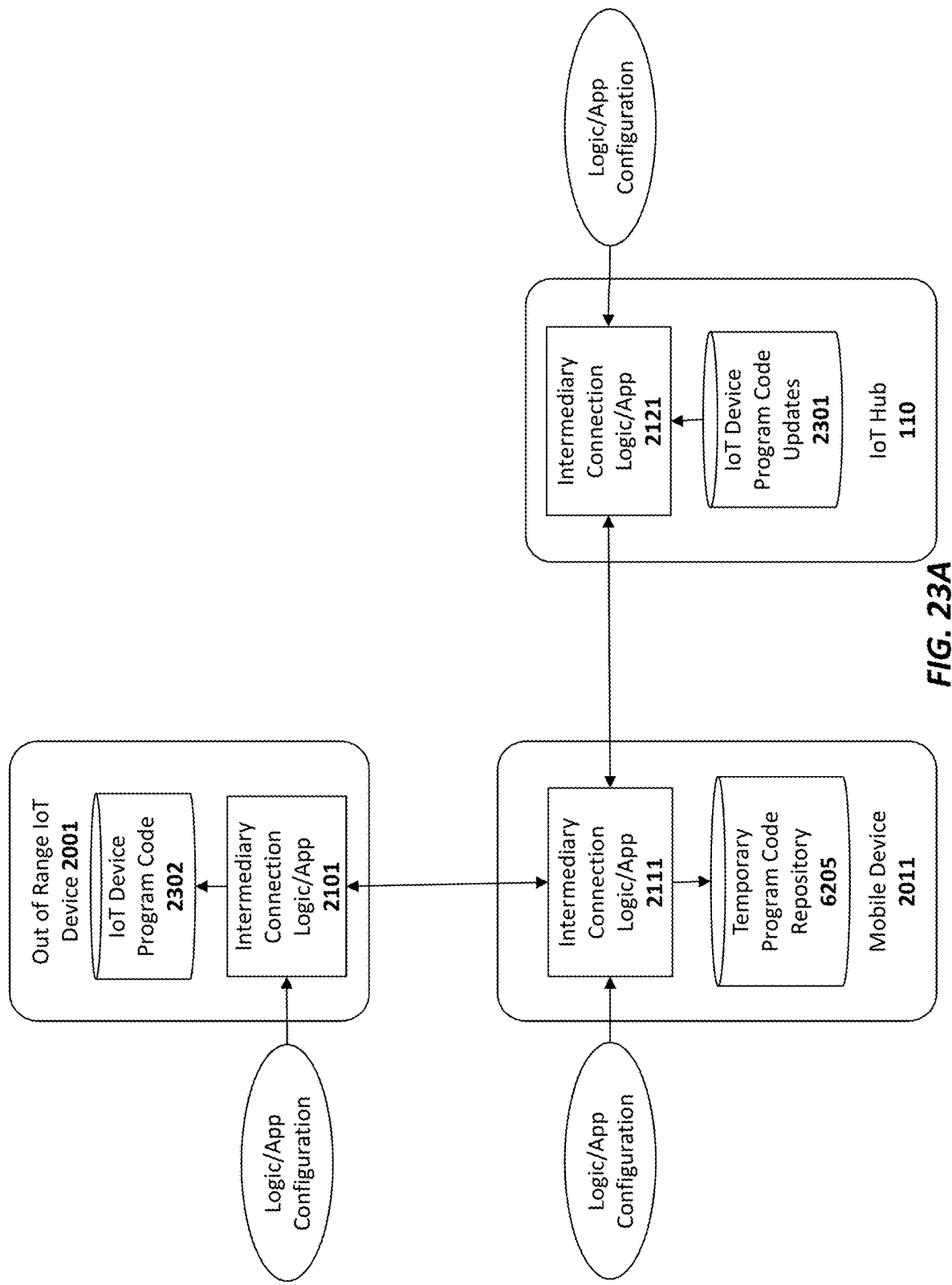
FIG. 23A illustrates an embodiment in which program code and data updates are provided to the IoT device.

In addition to collecting data from IoT devices, in one embodiment, the techniques described herein may be used to update or otherwise provide data to IoT devices. One example is shown in FIG. 23A, which shows an IoT hub 110 with program code updates 2301 that need to be installed on an IoT device 2001 (or a group of such IoT devices). The program code updates may include system updates, patches, configuration data and any other data needed for the IoT device to operate as desired by the user. In one embodiment, the user may specify configuration options for the IoT device 2001 via a mobile device or computer which are then stored on the IoT hub 110 and provided to the IoT device using the techniques described herein. Specifically, in one embodiment, the intermediary connection logic/application 2121 on the IoT hub 110 communicates with the intermediary connection logic/application 2111 on the mobile device 2011 to store the program code updates within a temporary storage 2015. When the mobile device 2011 enters the range of the IoT device 2001, the intermediary connection logic/application 2111 on the mobile device 2011 connects with the intermediary/connection logic/application 2101 on the IoT device 2001 to provide the program code updates to the device. In one embodiment, the IoT device 2001 may then enter into an automated update process to install the new program code updates and/or data.

Figure 23B:
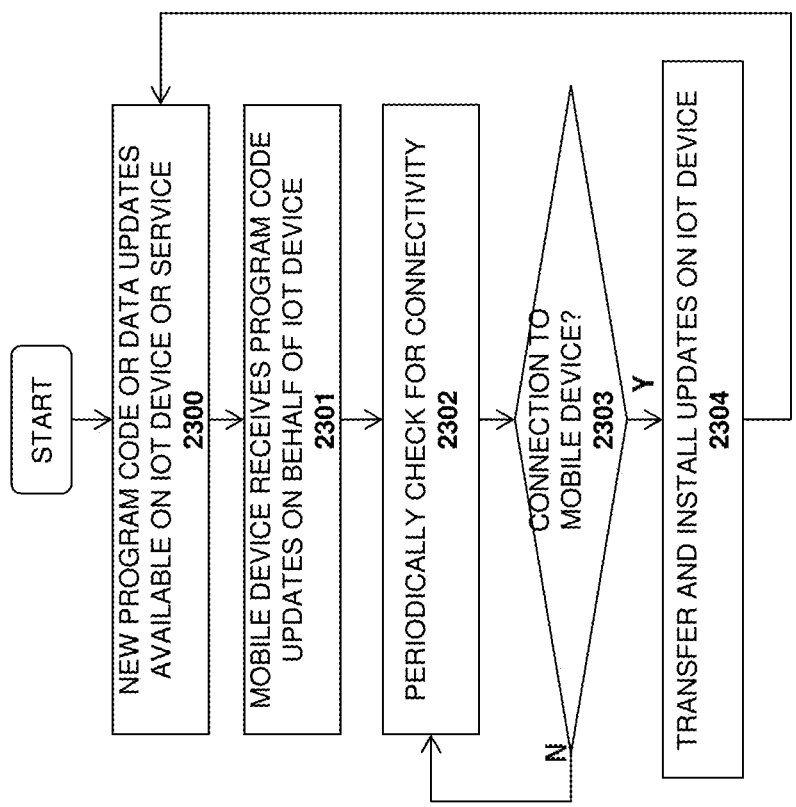
FIG. 23B illustrates an embodiment of a method in which program code and data updates are provided to the IoT device.

A method for updating an IoT device is shown in FIG. 23B. The method may be implemented within the context of the system architectures described above, but is not limited to any particular system architectures.

At 2300 new program code or data updates are made available on the IoT hub and/or an external service (e.g., coupled to the mobile device over the Internet). At 2301, the mobile device receives and stores the program code or data updates on behalf of the IoT device. The IoT device and/or mobile device periodically check to determine whether a connection has been established at 2302. If a connection is established, determined at 2303, then at 2304 the updates are transferred to the IoT device and installed.

Apparatus and Method for Establishing Secure
Communication Channels In an Internet of Things
(IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 24A and another embodiment which does not require an IoT hub is illustrated in FIG. 24B.

Figure 24A:
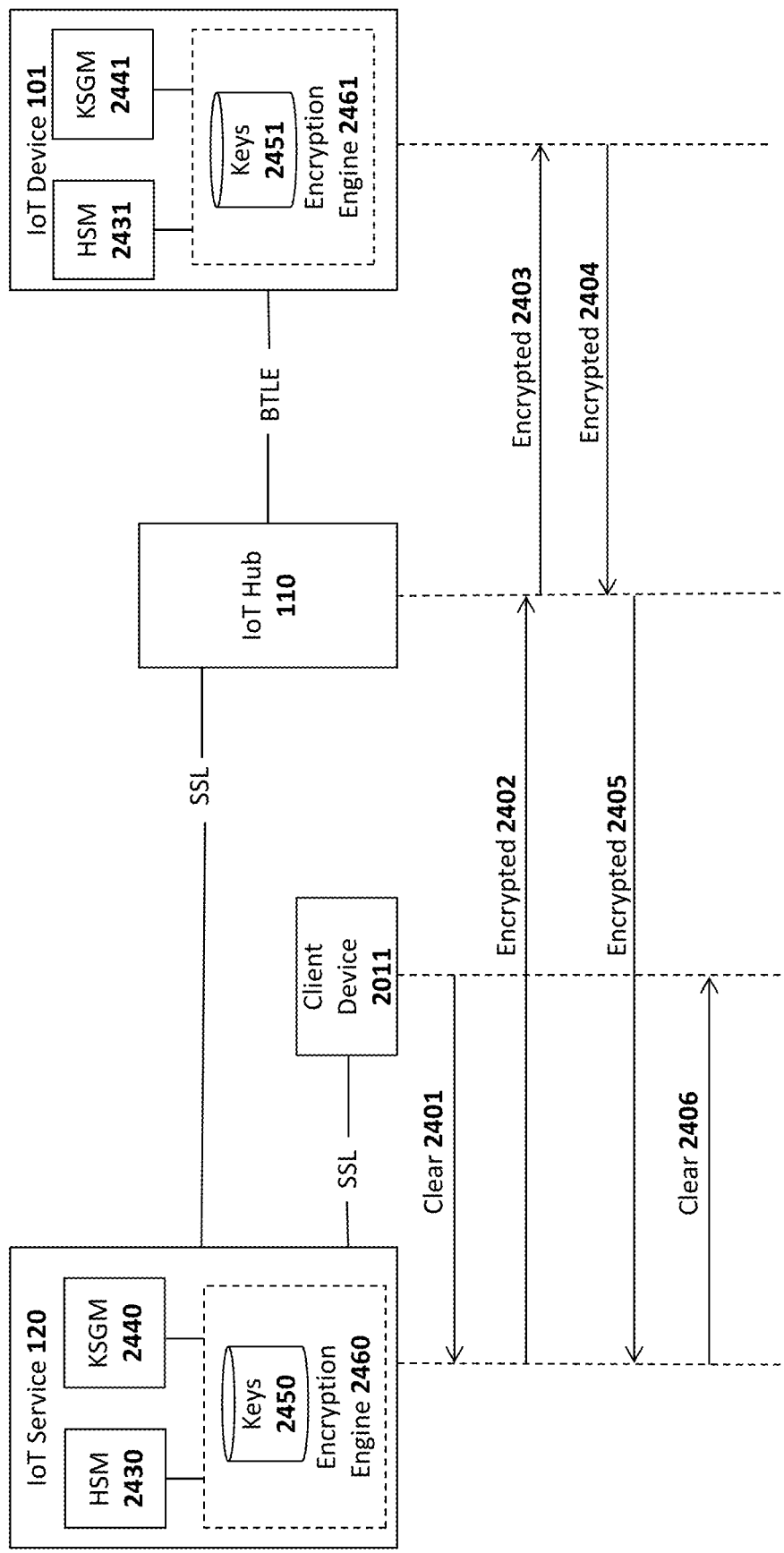
FIGS. 24A-B illustrate different embodiments of the invention for encrypting data between an IoT service and an IoT device.
Figure 24B:
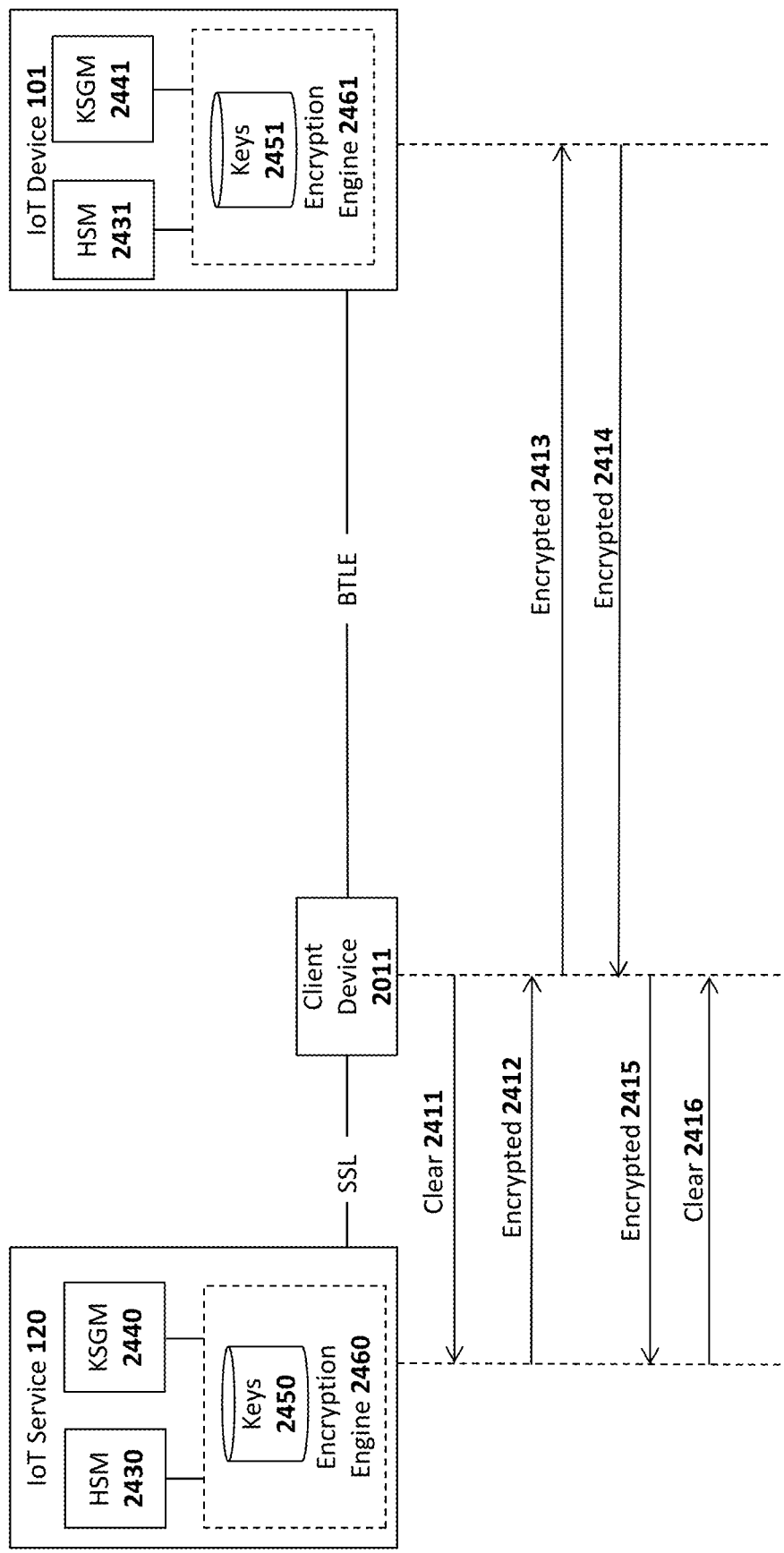

Turning first to FIG. 24A, the IoT service 120 includes an encryption engine 2460 which manages a set of "service session keys" 2450 and each IoT device 101 includes an encryption engine 2461 which manages a set of "device session keys" 2451 for encrypting/decrypting communication between the IoT device 101 and IoT service 120. The encryption engines may rely on different hardware modules when performing the security/encryption techniques described herein including a hardware security module 2430-2431 for (among other things) generating a session public/private key pair and preventing access to the private session key of the pair and a key stream generation module 2440-2441 for generating a key stream using a derived secret. In one embodiment, the service session keys 2450 and the device session keys 2451 comprise related public/private key pairs. For example, in one embodiment, the device session keys 2451 on the IoT device 101 include a public key of the IoT service 120 and a private key of the IoT device 101. As discussed in detail below, in one embodiment, to establish a secure communication session, the public/private session key pairs, 2450 and 2451, are used by each encryption engine, 2460 and 2461, respectively, to generate the same secret which is then used by the SKGMs 2440-2441 to generate a key stream to encrypt and decrypt communication between the IoT service 120 and the IoT device 101. Additional details associated with generation and use of the secret in accordance with one embodiment of the invention are provided below.

In FIG. 24A, once the secret has been generated using the keys 2450-2451, the client will always send messages to the IoT device 101 through the IoT service 120, as indicated by Clear transaction 2411. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 2460 on the IoT service 120 then encrypts the message using the generated secret and transmits the encrypted message to the IoT hub 110 at 2402. Rather than using the secret to encrypt the message directly, in one embodiment, the secret and a counter value are used to generate a key stream, which is used to encrypt each message packet. Details of this embodiment are described below with respect to FIG. 25.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 2403 (e.g., over a Bluetooth Low Energy (BTLE) communication channel). The encryption engine 2461 on the IoT device 101 may then decrypt the message using the secret and process the message contents. In an embodiment which uses the secret to generate a key stream, the encryption engine 2461 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 2461 on the IoT device 101 uses the secret or a derived key stream to encrypt the response and transmits the encrypted response to the IoT hub 110 at 2404, which forwards the response to the IoT service 120 at 2405. The encryption engine 2460 on the IoT service 120 then decrypts the response using the secret or a derived key stream and transmits the decrypted response to the client device 611 at 2406 (e.g., over the SSL or other secure communication channel).

FIG. 24B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 2411. The encryption engine 2460 encrypts the message using the secret or the derived key stream and transmits the encrypted message back to the client device 611 at 2412. The client device 611 then forwards the encrypted message to the IoT device 101 at 2413, and the encryption engine 2461 decrypts the message using the secret or the derived key stream. The IoT device 101 may then process the message as described herein. If a response is required, the encryption engine 2461 encrypts the response using the secret and transmits the encrypted response to the client device 611 at 2414, which forwards the encrypted response to the IoT service 120 at 2415. The encryption engine 2460 then decrypts the response and transmits the decrypted response to the client device 611 at 2416.

Figure 25:
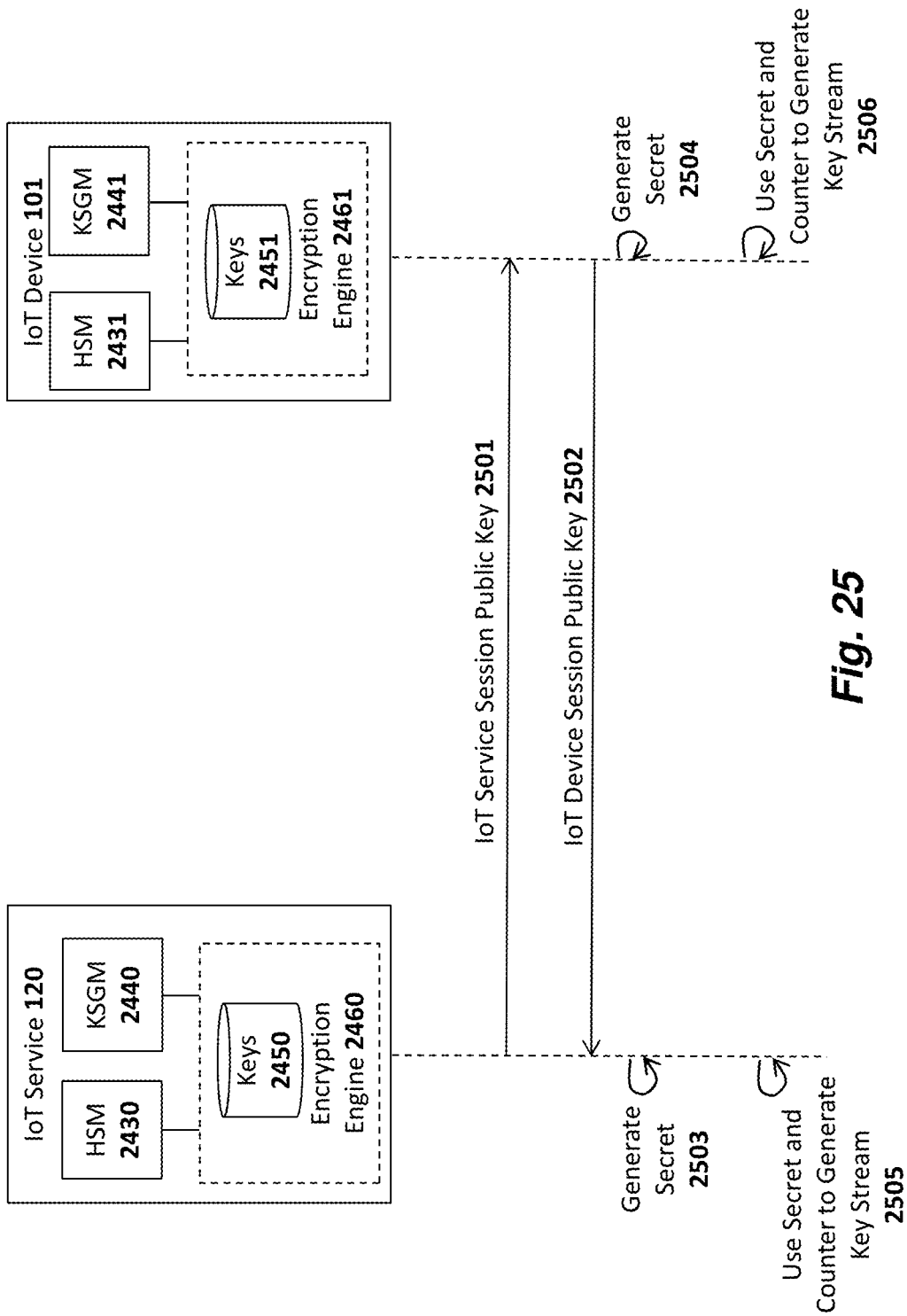
FIG. 25 illustrates embodiments of the invention for performing a secure key exchange, generating a common secret, and using the secret to generate a key stream.

FIG. 25 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 25 for simplicity, communication may occur through the IoT hub 110 and/or the client device 611.

In one embodiment, the encryption engine 2460 of the IoT service 120 sends a command to the HSM 2430 (e.g., which may be such as a CloudHSM offered by Amazon®) to generate a session public/private key pair. The HSM 2430 may subsequently prevent access to the private session key of the pair. Similarly, the encryption engine on the IoT device 101 may transmit a command to the HSM 2431 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 2430 to the IoT device 101 at 2501. The IoT device uses its HSM 2431 to generate its own session public/private key pair and, at 2502, transmits its public key of the pair to the IoT service 120. In one embodiment, the encryption engines 2460-2461 use an Elliptic curve Diffie-Hellman (ECDH) protocol, which is an anonymous key agreement that allows two parties with an elliptic curve public-private key pair, to establish a shared secret. In one embodiment, using these techniques, at 2503, the encryption engine 2460 of the IoT service 120 generates the secret using the IoT device session public key and its own session private key. Similarly, at 2504, the encryption engine 2461 of the IoT device 101 independently generates the same secret using the IoT service 120 session public key and its own session private key. More specifically, in one embodiment, the encryption engine 2460 on the IoT service 120 generates the secret according to the formula secret=IoT device session pub key*IoT service session private key, where '*' means that the IoT device session public key is point-multiplied by the IoT service session private key. The encryption engine 2461 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 2460-2461 rely on a hardware module such as the KSGMs 2440-2441 respectively to perform the above operations for generating the secret.

Once the secret has been determined, it may be used by the encryption engines 2460 and 2461 to encrypt and decrypt data directly. Alternatively, in one embodiment, the encryption engines 2460-2461 send commands to the KSGMs 2440-2441 to generate a new key stream using the secret to encrypt/decrypt each data packet (i.e., a new key stream data structure is generated for each packet). In particular, one embodiment of the key stream generation module 2440-2441 implements a Galois/Counter Mode (GCM) in which a counter value is incremented for each data packet and is used in combination with the secret to generate the key stream. Thus, to transmit a data packet to the IoT service 120, the encryption engine 2461 of the IoT device 101 uses the secret and the current counter value to cause the KSGMs 2440-2441 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 2460 on the IoT service then communicates with the KSGM 2440 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 2461 on the IoT device 101 then communicates with the KSGM 2441 which uses the counter value and the secret to generate the same key stream which is used to decrypt the data packet. Thus, in this embodiment, the encryption engines 2460-2461 use their own counter values to generate a key stream to encrypt data and use the counter values received with the encrypted data packets to generate a key stream to decrypt the data.

In one embodiment, each encryption engine 2460-2461 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 2460-2461 may disconnect from the communication channel and/or may generate a security alert.

Figure 26:
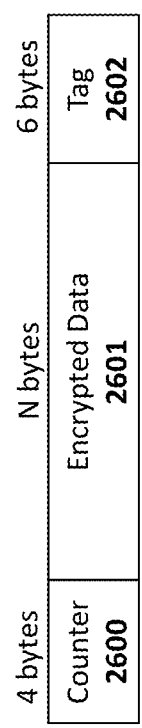
FIG. 26 illustrates a packet structure in accordance with one embodiment of the invention.

FIG. 26 illustrates an exemplary encrypted data packet employed in one embodiment of the invention comprising a 4-byte counter value 2600, a variable-sized encrypted data field 2601, and a 6-byte tag 2602. In one embodiment, the tag 2602 comprises a checksum value to validate the decrypted data (once it has been decrypted).

As mentioned, in one embodiment, the session public/private key pairs 2450-2451 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 24A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
  1. The IoT service's unique ID:
     The IoT service's serial number;
     a Timestamp;
     The ID of the factory key used to sign this unique ID;
     a Class of the unique ID (i.e., a service);
     IoT service's public key
     The signature over the unique ID.
  2. The Factory Certificate including:
     A timestamp
     The ID of the master key used to sign the certificate
     The factory public key
     The signature of the Factory Certificate
  3. IoT service session public key (as described above with respect to FIGS. 24A-B)
  4. IoT service session public key signature (e.g., signed with the IoT service's private key)

B. In one embodiment, the message is sent to the IoT device on the negotiation channel (described below). The IoT device parses the message and:
  1. Verifies the signature of the factory certificate (only if present in the message payload)
  2. Verifies the signature of the unique ID using the key identified by the unique ID
  3. Verifies the IoT service session public key signature using the IoT service's public key from the unique ID
  4. Saves the IoT service's public key as well as the IoT service's session public key
  5. Generates the IoT device session key pair C. The IoT device then generates a message containing the following:

1. IoT device's unique ID
   IoT device serial number
   Timestamp
   ID of factory key used to sign this unique ID
   Class of unique ID (i.e., IoT device)
   IoT device's public key
   Signature of unique ID
2. IoT device's session public key
3. Signature of (IoT device session public key+IoT service session public key) signed with IoT device's key D. This message is sent back to the IoT service. The IoT service parses the message and:
1. Verifies the signature of the unique ID using the factory public key
2. Verifies the signature of the session public keys using the IoT device's public key
3. Saves the IoT device's session public key E. The IoT service then generates a message containing a signature of (IoT device session public key+IoT service session public key) signed with the IoT service's key.

F. The IoT device parses the message and:
1. Verifies the signature of the session public keys using the IoT service's public key
2. Generates the key stream from the IoT device session private key and the IoT service's session public key
3. The IoT device then sends a "messaging available" message.

G. The IoT service then does the following:
1. Generates the key stream from the IoT service session private key and the IoT device's session public key
2. Creates a new message on the messaging channel which contains the following:
   Generates and stores a random 2 byte value
   Set attribute message with the boomerang attribute Id (discussed below) and the random value H. The IoT device receives the message and:
1. Attempts to decrypt the message
2. Emits an Update with the same value on the indicated attribute Id I. The IoT service recognizes the message payload contains a boomerang attribute update and:
1. Sets its paired state to true
2. Sends a pairing complete message on the negotiator channel J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands Without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 27:
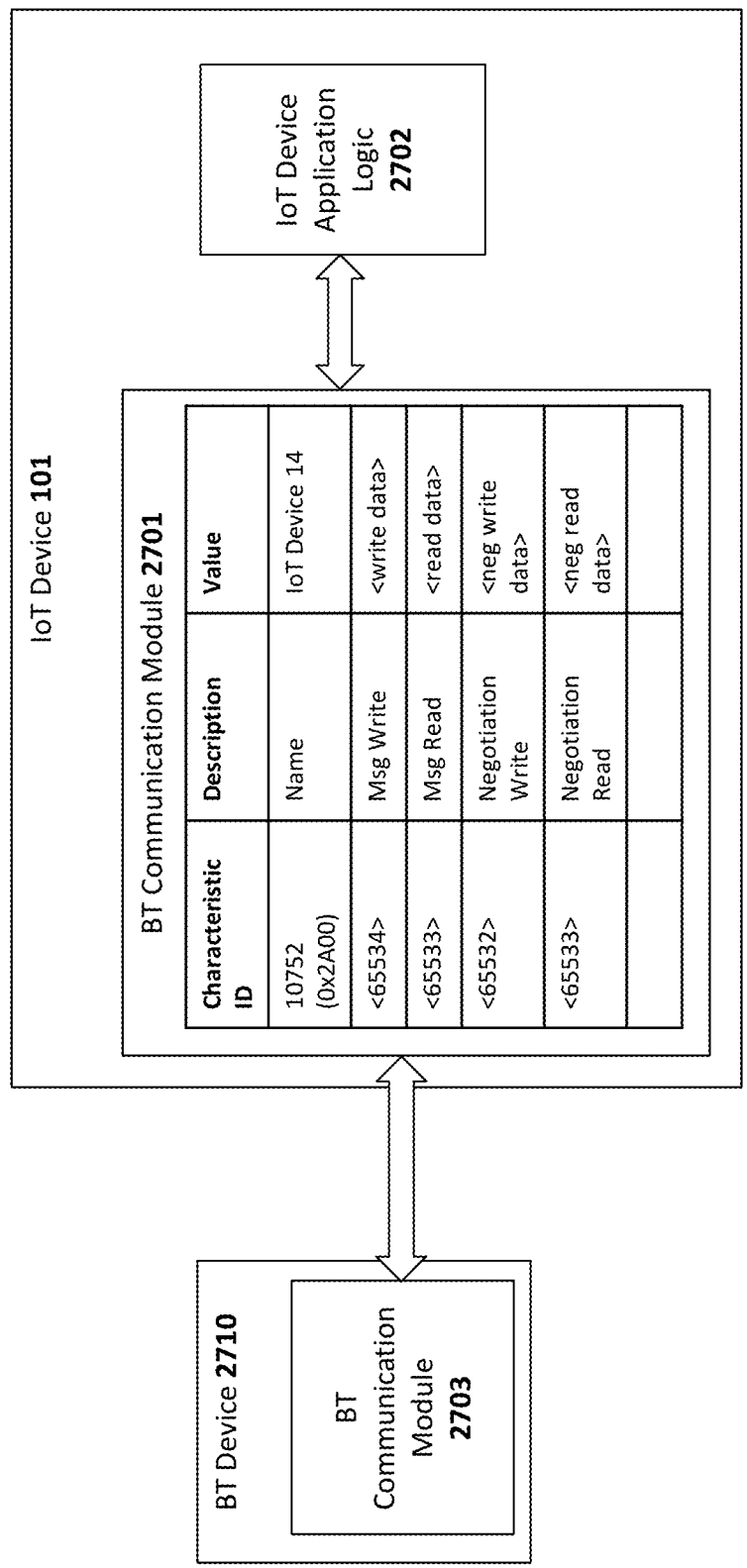
FIG. 27 illustrates techniques employed in one embodiment for writing and reading data to/from an IoT device without formally pairing with the IoT device.

FIG. 27 illustrates one particular embodiment in which a Bluetooth (BT) device 2710 establishes a network socket abstraction with a BT communication module 2701 of an IoT device 101 without formally establishing a paired BT connection. The BT device 2710 may be included in an IoT hub 110 and/or a client device 611 such as shown in FIG. 24A. As illustrated, the BT communication module 2701 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 27, the "Name" characteristic is a BT-defined characteristic which is assigned a specific value of "IoT Device 14." One embodiment of the invention specifies a first set of additional characteristics to be used for negotiating a secure communication channel with the BT device 2710 and a second set of additional characteristics to be used for encrypted communication with the BT device 2710. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 2710 and the BT communication module 2701 to establish a secure communication channel as described herein. By way of example, in FIG. 25, the IoT device 101 may receive the IoT service session public key 2501 via the "negotiation read" characteristic <65533>. The key 2501 may be transmitted from the IoT service 120 to a BTLE-enabled IoT hub 110 or client device 611 which may then use GATT to write the key 2501 to the negotiation read value buffer identified by characteristic ID <65533>. IoT device application logic 2702 may then read the key 2501 from the value buffer identified by characteristic ID <65533> and process it as described above (e.g., using it to generate a secret and using the secret to generate a key stream, etc).

If the key 2501 is greater than 20 bytes (the maximum buffer size in some current implementations), then it may be written in 20-byte portions. For example, the first 20 bytes may be written by the BT communication module 2703 to characteristic ID <65533> and read by the IoT device application logic 2702, which may then write an acknowledgement message to the negotiation write value buffer identified by characteristic ID <65532>. Using GATT, the BT communication module 2703 may read this acknowledgement from characteristic ID <65532> and responsively write the next 20 bytes of the key 2501 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 2703 has an encrypted data packet to transmit (e.g., such as encrypted message 2403 in FIG. 24A), it starts writing the encrypted data packet, 20 bytes at a time, using the message read value buffer identified by characteristic ID <65533>. The IoT device application logic 2702 will then read the encrypted data packet, 20 bytes at a time, from the read value buffer, sending acknowledgement messages to the BT communication module 2703 as needed via the write value buffer identified by characteristic ID <65532>.

In one embodiment, the commands of GET, SET, and UPDATE described below are used to exchange data and commands between the two BT communication modules 2701 and 2703. For example, the BT communication module 2703 may send a packet identifying characteristic ID <65533> and containing the SET command to write into the value field/buffer identified by characteristic ID <65533> which may then be read by the IoT device application logic 2702. To retrieve data from the IoT device 101, the BT communication module 2703 may transmit a GET command directed to the value field/buffer identified by characteristic ID <65534>. In response to the GET command, the BT communication module 2701 may transmit an UPDATE packet to the BT communication module 2703 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 28:
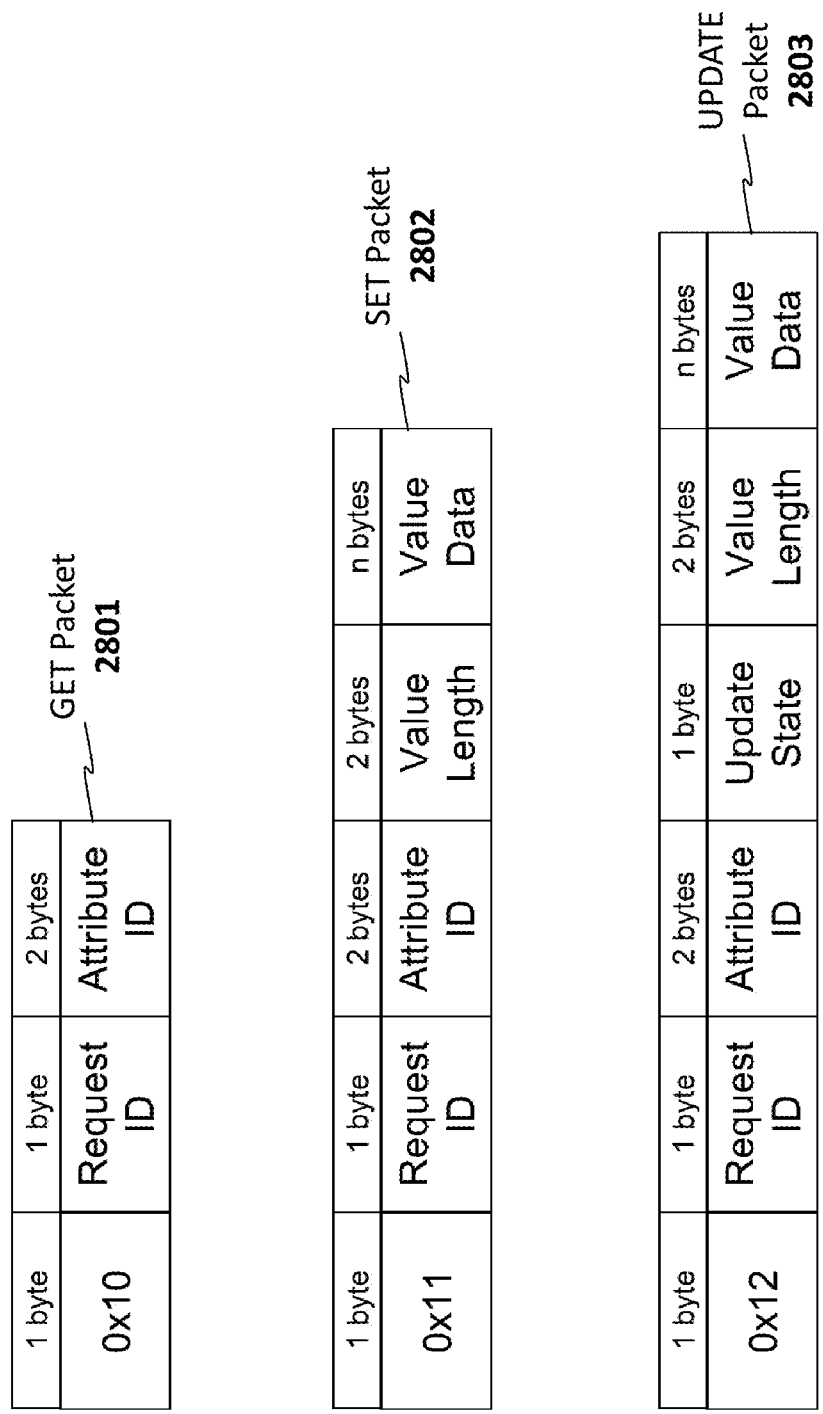
FIG. 28 illustrates an exemplary set of command packets employed in one embodiment of the invention.

FIG. 28 illustrates exemplary packet formats used for GET, SET, and UPDATE in accordance with one embodiment of the invention. In one embodiment, these packets are transmitted over the message write <65534> and message read <65533> channels following negotiation. In the GET packet 2801, a first 1-byte field includes a value (0X10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 27, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2802 and UPDATE packet 2803 illustrated in FIG. 28 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2803 may be transmitted to provide an update of the results of the SET command. The UPDATE packet 2803 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 29:
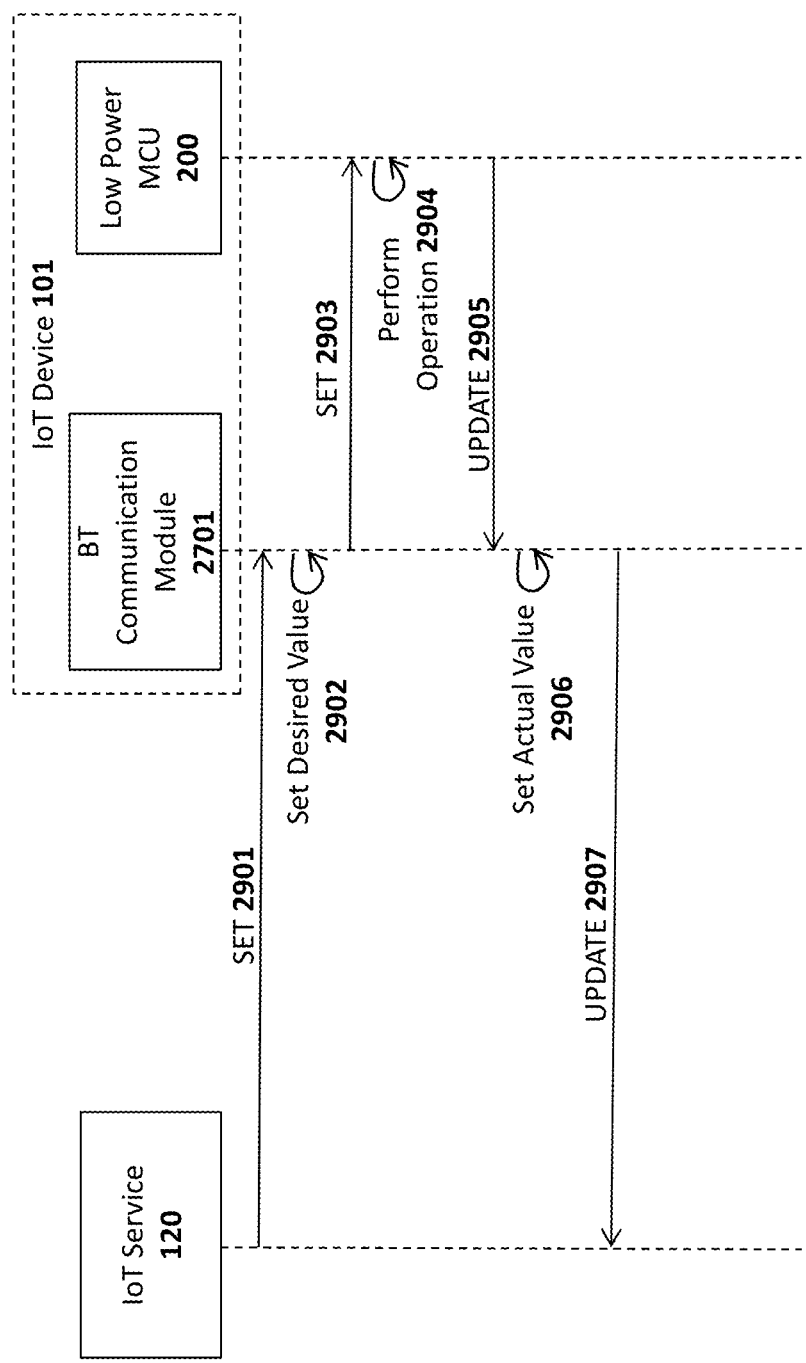
FIG. 29 illustrates an exemplary sequence of transactions using command packets.

FIG. 29 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2901, the SET command 2901 is transmitted form the IoT service to the IoT device 101 and received by the BT communication module 2701 which responsively updates the GATT value buffer identified by the characteristic ID at 2902. The SET command is read from the value buffer by the low power microcontroller (MCU) 200 at 2903 (or by program code being executed on the low power MCU such as IoT device application logic 2702 shown in FIG. 27). At 2904, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2904, the new value is set in the IoT device and an UPDATE command is returned at 2905 and the actual value is updated in a GATT value field at 2906. In some cases, the actual value will be equal to the desired value. In other cases, the updated value may be different (i.e., because it may take time for the IoT device 101 to update certain types of values). Finally, at 2907, the UPDATE command is transmitted back to the IoT service 120 containing the actual value from the GATT value field.

Figure 30:
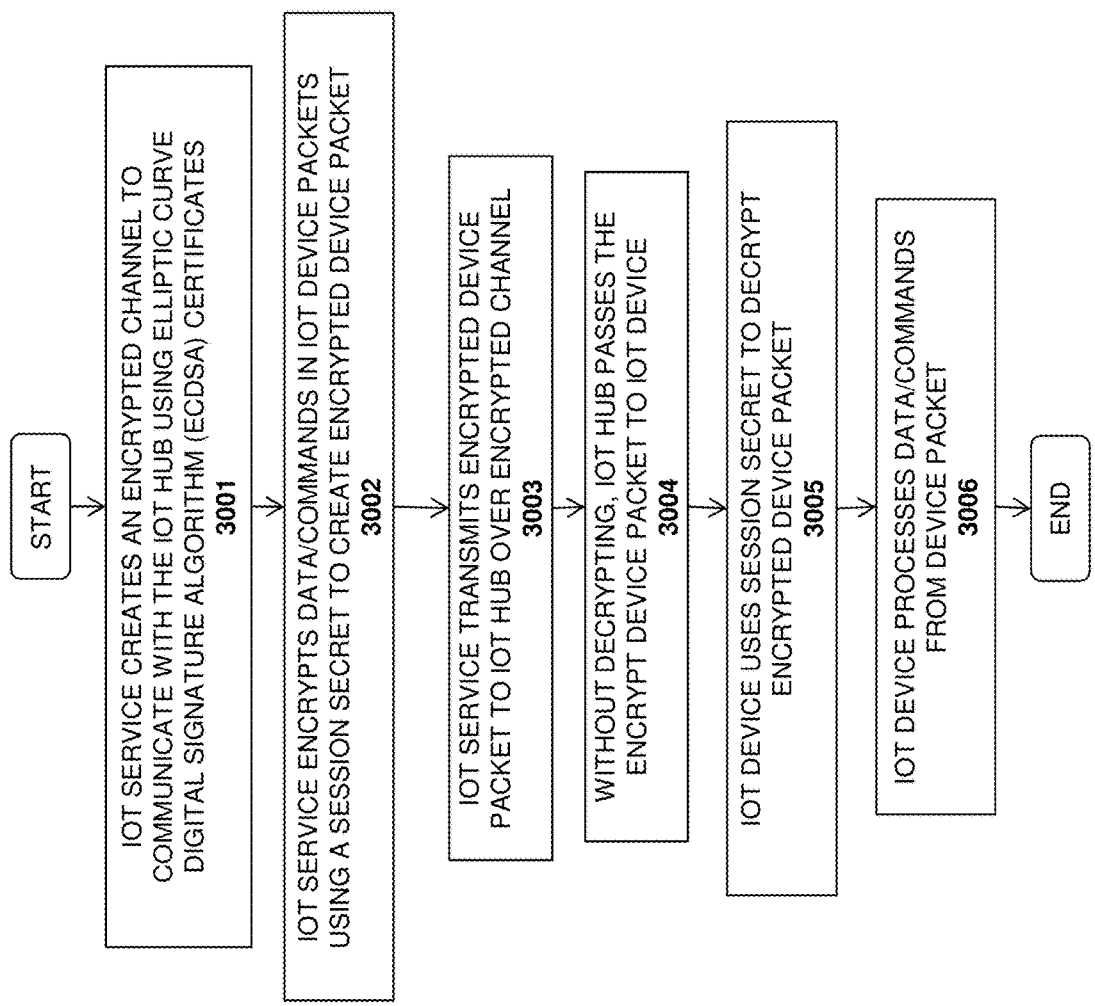
FIG. 30 illustrates a method in accordance with one embodiment of the invention.

FIG. 30 illustrates a method for implementing a secure communication channel between an IoT service and an IoT device in accordance with one embodiment of the invention. The method may be implemented within the context of the network architectures described above but is not limited to any specific architecture.

At 3001, the IoT service creates an encrypted channel to communicate with the IoT hub using elliptic curve digital signature algorithm (ECDSA) certificates. At 3002, the IoT service encrypts data/commands in IoT device packets using the a session secret to create an encrypted device packet. As mentioned above, the session secret may be independently generated by the IoT device and the IoT service. At 3003, the IoT service transmits the encrypted device packet to the IoT hub over the encrypted channel. At 3004, without decrypting, the IoT hub passes the encrypted device packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 3006, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 31A:
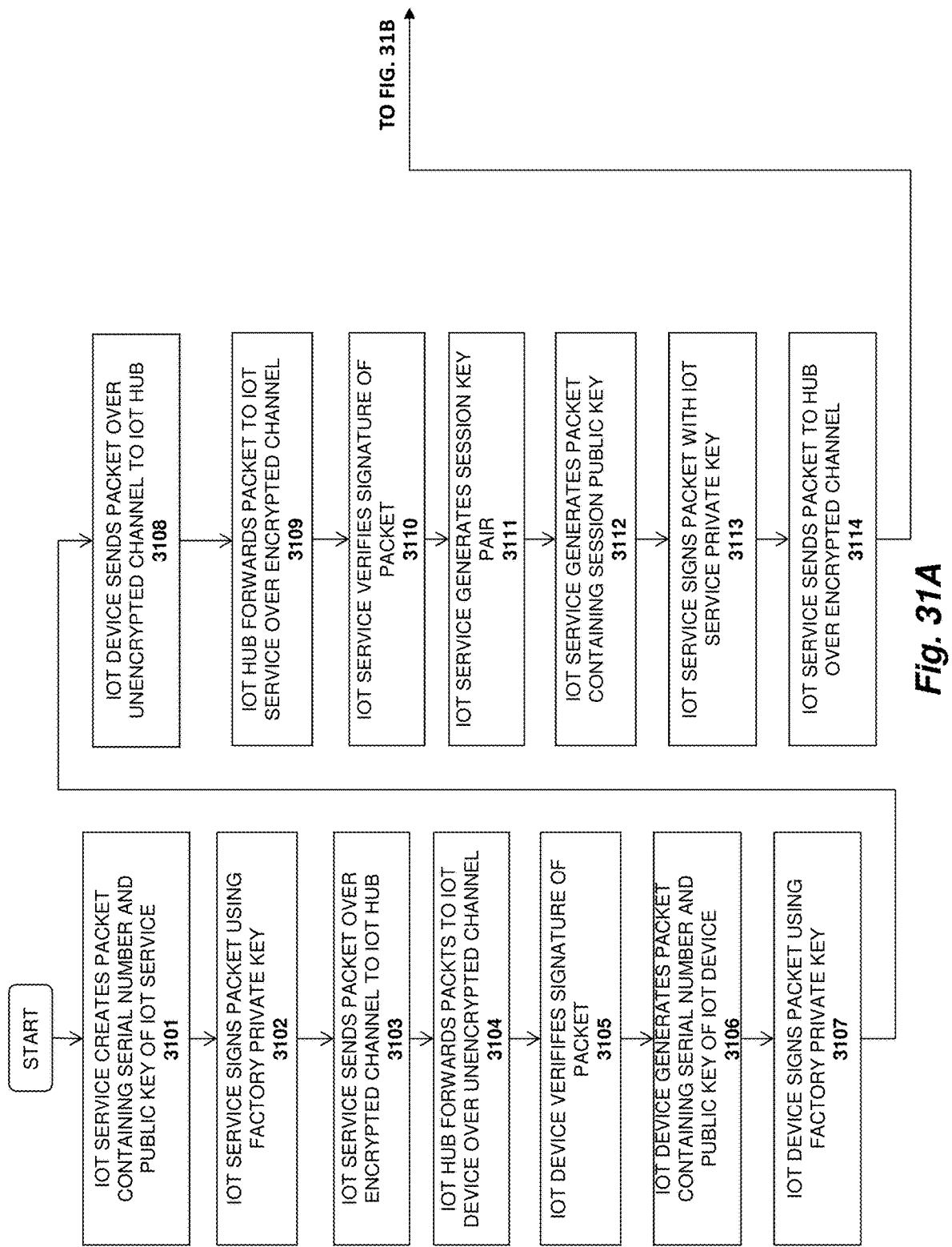
Figure 31B:
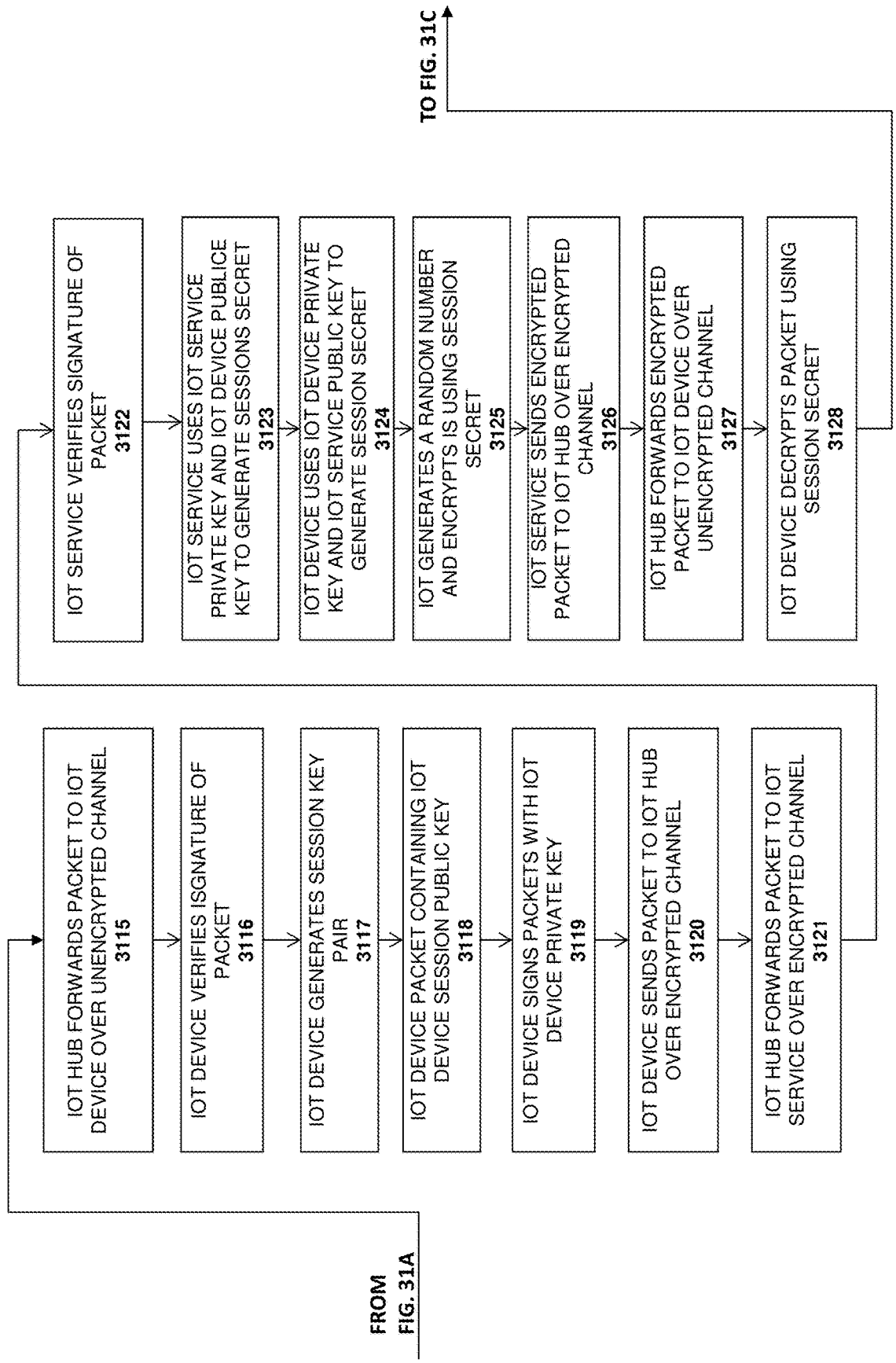

FIGS. 31A-C illustrate a detailed method for pairing devices in accordance with one embodiment of the invention. The method may be implemented within the context of the system architectures described above, but is not limited to any specific system architectures.

At 3101, the IoT Service creates a packet containing serial number and public key of the IoT Service. At 3102, the IoT Service signs the packet using the factory private key. At 3103, the IoT Service sends the packet over an encrypted channel to the IoT hub and at 3104 the IoT hub forwards the packet to IoT device over an unencrypted channel. At 3105, the IoT device verifies the signature of packet and, at 3106, the IoT device generates a packet containing the serial number and public key of the IoT Device. At 3107, the IoT device signs the packet using the factory private key and at 3108, the IoT device sends the packet over the unencrypted channel to the IoT hub.

At 3109, the IoT hub forwards the packet to the IoT service over an encrypted channel and at 3110, the IoT Service verifies the signature of the packet. At 3111, the IoT Service generates a session key pair, and at 3112 the IoT Service generates a packet containing the session public key. The IoT Service then signs the packet with IoT Service private key at 3113 and, at 3114, the IoT Service sends the packet to the IoT hub over the encrypted channel.

Turning to FIG. 31B, the IoT hub forwards the packet to the IoT device over the unencrypted channel at 3115 and, at 3116, the IoT device verifies the signature of packet. At 3117 the IoT device generates session key pair (e.g., using the techniques described above), and, at 3118, an IoT device packet is generated containing the IoT device session public key. At 3119, the IoT device signs the IoT device packet with IoT device private key. At 3120, the IoT device sends the packet to the IoT hub over the unencrypted channel and, at 3121, the IoT hub forwards the packet to the IoT service over an encrypted channel.

At 3122, the IoT service verifies the signature of the packet (e.g., using the IoT device public key) and, at 3123, the IoT service uses the IoT service private key and the IoT device public key to generate the session secret (as described in detail above). At 3124, the IoT device uses the IoT device private key and IoT service public key to generate the session secret (again, as described above) and, at 3125, the IoT device generates a random number and encrypts it using the session secret. At 3126, the IoT service sends the encrypted packet to IoT hub over the encrypted channel. At 3127, the IoT hub forwards the encrypted packet to the IoT device over the unencrypted channel. At 3128, the IoT device decrypts the packet using the session secret.

Turning to FIG. 31C, the IoT device re-encrypts the packet using the session secret at 3129 and, at 3130, the IoT device sends the encrypted packet to the IoT hub over the unencrypted channel. At 3131, the IoT hub forwards the encrypted packet to the IoT service over the encrypted channel. The IoT service decrypts the packet using the session secret at 3132. At 3133 the IoT service verifies that the random number matches the random number it sent. The IoT service then sends a packet indicating that pairing is complete at 3134 and all subsequent messages are encrypted using the session secret at 3135.

Apparatus and Method for Securely Tracking Event Attendees Using IoT Devices

Bluetooth Low Energy (BTLE) "beacons" have been developed with small battery-powered BTLE transmitters that transmit an identifier when interrogated by a mobile device such a smartphone or tablet. A common use case is to alert a mobile device's user to nearby stores, services, products, and/or hazards. In some cases, the mobile device picks up the beacon's identifier and then uses it to look up additional information online (e.g., information related to the store, service, product, etc, in the vicinity of the beacon).

One embodiment of the invention uses IoT devices as "reverse beacons" (sometimes referred to herein as a "meacon" using the portmanteau of "me" and "beacon") which communicate with IoT hubs using the advanced security techniques described herein to securely identify and track a user as the user moves around an event such as a trade show or concert. In particular, in contrast to a typical beacon which provides identification data to a user's mobile device (which may then retrieve relevant information related to the identifying data), a meacon transmits data over a local BTLE channel uniquely identifying the event attendee to whom it has been assigned. As the user moves around the event, the meacon connects to different IoT hubs in different locations. The identity of both the attendee/meacon and each IoT hub to which the meacon connects may then be transmitted to an IoT service, which compiles the data collected from different IoT hubs to determine the portions of the event visited by the user. This information may then be used to transmit targeted content to the user, either during or after the event (e.g., content related to the booths visited by the user during a trade show).

FIG. 32A illustrates an exemplary system architecture in which meacons are implemented as IoT devices 101-106 each equipped with a secure Bluetooth (BT) module 3201-3206, respectively. In one embodiment, the secure BT modules 3201-3206 connect to the IoT service 120 through the IoT hubs 3210-3211 using the various secure communication techniques described above (see, e.g., FIGS. 32A to 31C and associated text) to ensure that the data exchanged with the IoT service 120 is protected. In the example shown in FIG. 32A, users of IoT devices 104-106 at a first event location 3200A are communicatively coupled to IoT hub 3210 and users of IoT devices 101-103 at a second event location 3200B are communicatively coupled to IoT hub 3211. As in prior embodiments, each IoT hub 3210-3211 includes a BT module 3220-3221 for establishing the local BT connection with the secure BT modules 3201-3206 of each of the IoT devices 101-106. In addition, each IoT hub includes at least one additional communication interface such as a WiFi interface and/or cellular interface (e.g., an LTE interface) for establishing a connection to the IoT service 120 over the Internet.

In one embodiment, each IoT hub 3210-3211 is associated with a particular location within the event. For example, IoT hub 3210 may be associated with a first booth or set of booths at a trade show and IoT hub 3211 may be associated with a second booth or set of booths. By way of another example, at a concert, each IoT hub 3210-3211 may be associated with a different stage. Each IoT device 101-106 uses the techniques described above to communicate its current connection status to an event transaction module 3230 on the IoT service 120 which stores the current connection status in a database 3235. In one embodiment, the event transaction module 3230 includes or utilizes the various security components shown in FIG. 32A-FIG. 25 such as the encryption engine 3260, HSM 3230, and KSGM 3240 to support secure connections with the IoT devices 101-106, each of which includes an encryption engine 3261, HSM 3231, and KSGM 3241 to implement the security techniques described above when communicating with the IoT service 120.

In one embodiment, when an IoT device 101 connects to an IoT hub 3210 it transmits a data packet to the event transaction module 3230 on the IoT service 120 indicating that is has a connection to the IoT hub 3210. The IoT device 101 may periodically transmit such data packets to indicate its connection status to the event transaction module 3230 (e.g., every 1 minute, 5 minutes, 10 minutes, etc) which may then store the connection data within a database 3235 to compile a history of the locations visited by each user during the course of the event (e.g., the booths visited at the trade show).

Note that "connecting to" an IoT hub as used herein does not necessarily mean formally pairing with the IoT hub as might be done for a standard BTLE connection. Rather, "connecting to" the IoT hub can simply mean detecting a signal from the IoT hub which, as discussed above, may include the IoT hub's name (i.e., identified by BTLE characteristic ID 10752 (0x2A00)). In one embodiment, the connection to an IoT hub may utilize the message read/write and negotiation read/write socket abstractions illustrated in FIG. 27, which may be accomplished without using formal BTLE pairing. For example, the IoT device may use the negotiation read/write socket abstractions to form a secure channel, and may then use the message read/write socket abstractions to communicate the Name attribute of the IoT hub to the IoT service 120.

In some embodiments, each IoT device may concurrently connect to multiple IoT hubs 3210-3211 and report this data back to the event transaction module 3230. In FIG. 32A, for example, IoT device 103 is shown connecting to both IoT hub 3210 and IoT hub 3210. In one embodiment, the IoT device 103 may take signal strength measurements from two or more IoT hubs and this data may be used to determine the actual position of the IoT device 103 at the event with greater accuracy (e.g., using a received signal strength indicator (RSSI)). For example, if a concurrent connection is made to two IoT hubs 3210-3211 as illustrated in FIG. 32A, then the signal strength measurements may indicate the relative position of IoT device 103 between IoT hub 3210 and IoT hub 3211. If an IoT device connects to three or more IoT hubs, then triangulation techniques may be performed using the RSSI values to arrive at an even more precise calculation of the user's location (e.g., by triangulating the user's position with RSSI measurements). By way of example, if each booth at a trade show is equipped with an IoT hub, then each IoT device may connect to three or more IoT hubs at a given time, providing precise location measurements. In one embodiment, the location detection system may be calibrated prior to the event, by moving an IoT device into different known locations at the event venue and collecting RSSI measurements at those locations. A table of RSSI values may then be compiled on the IoT service and stored in the database 3235 to uniquely associated each location with a different set of RSSI values measured between the IoT device and the various IoT hubs. Additional techniques which may be employed for determining a user's location with signal strength values are described in the co-pending application entitled "System and Method for Accurately Sensing User Location in an IoT System," Ser. No. 14/673,551, Filed Mar. 20, 2015, which is assigned to the assignee of the present application and which is incorporated herein by reference.

As mentioned, in one embodiment, the locations visited by the user are stored within a database 3235 by the event transaction module 3230. In one embodiment, this data may be used to target content to the attendee, either during or after the event. For example, if it has been determined that the attendee spent a significant amount of time at a particular booth at a trade show, or watched a particular presentation given at a particular time, then targeted communications from the company operating the booth or giving the presentation may be sent to the user. The targeted content may be generated by one of more external services 3240 (e.g., such as an advertising service and/or the company running the booth).

Figure 32B:
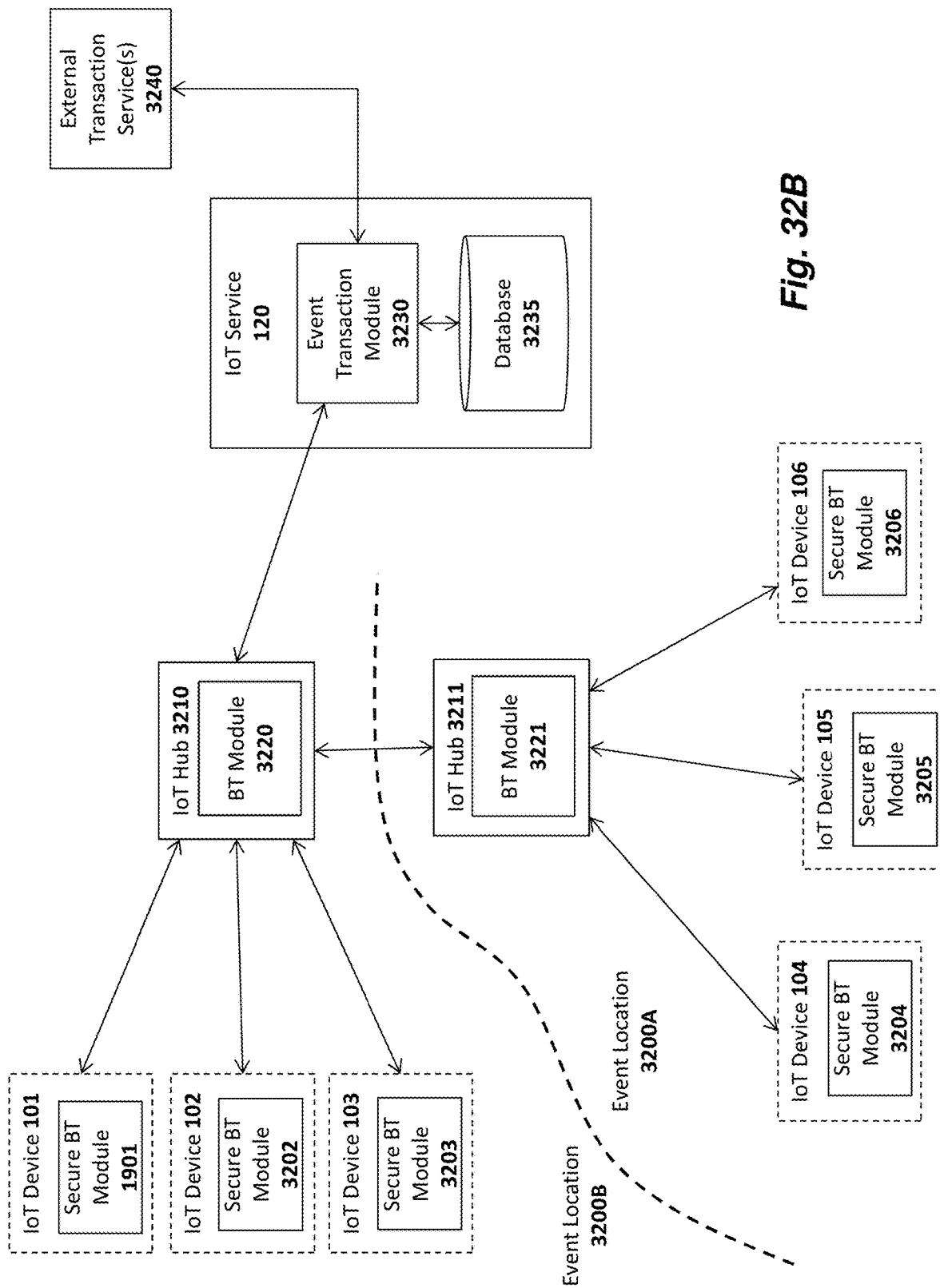

FIG. 32B illustrates an embodiment in which a single IoT hub 3210 provides connectivity to the IoT service 120 and all other IoT hubs 3211 communicate to the IoT service 120 via this IoT hub 3210. In this example, the IoT hub 3211 establishes a local wireless connection with IoT hub 3210 which provides the WAN connection to the Internet. This configuration may be particularly suitable for events of a smaller scale in which the communication channel shared by the IoT hub 3219 is sufficient to support all of the data communication to the IoT service 120.

Figure 32C:
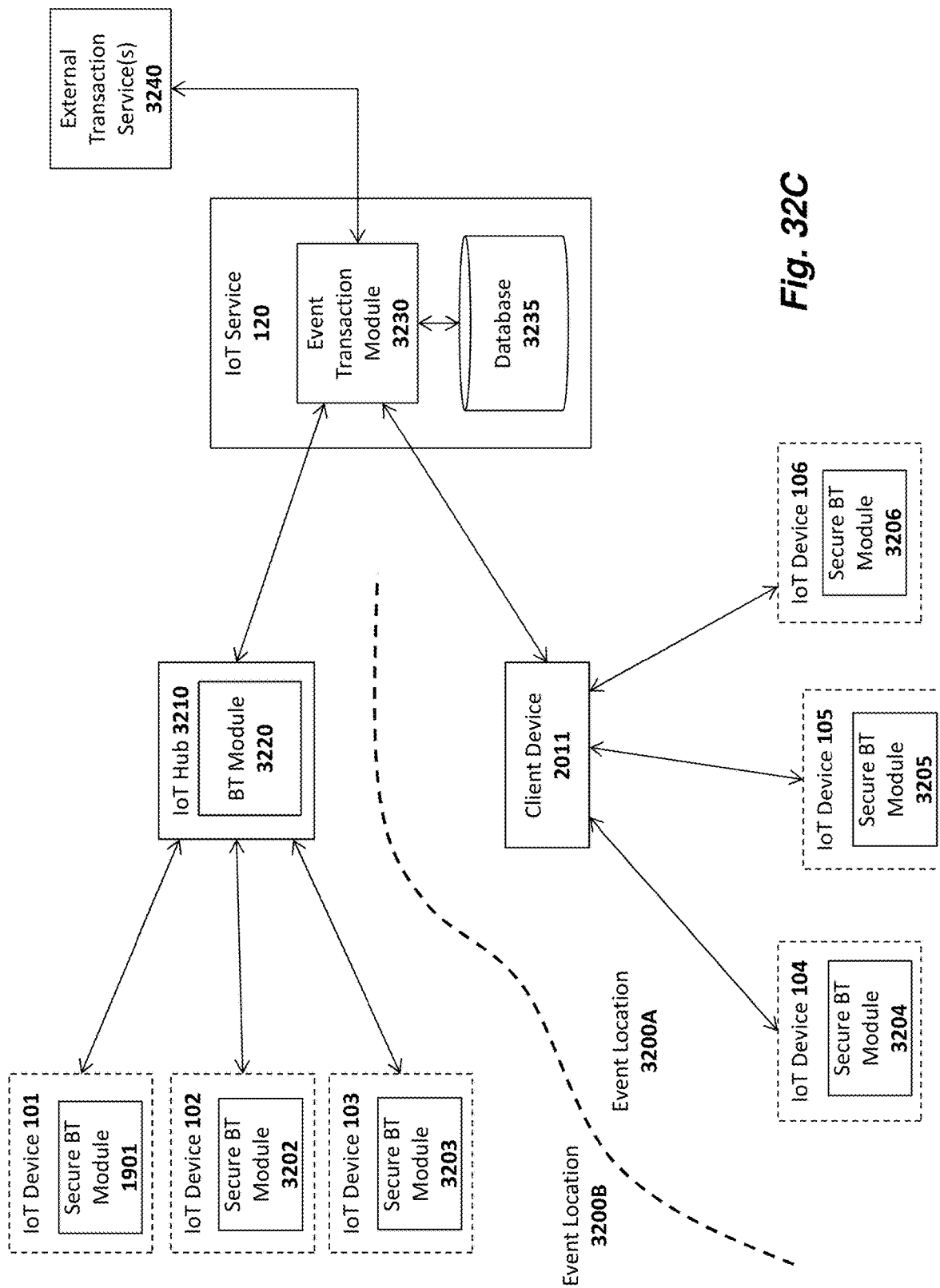

FIG. 32C illustrates yet another embodiment in which client devices 611 of users attending the event provide IoT device connectivity to the IoT service 120. The client devices 611 of this embodiment establish a connection to the IoT service 120 via a WiFi or cellular data connection and connect to the IoT devices 104-106 via Bluetooth (e.g., utilizing the secure communication techniques described above with respect to FIG. 32B). An app or browser-based program code executed on the client device 611 provides the network connectivity to the IoT devices 104-106. In this embodiment, the location of the client device 611 may be determined from the client device's GPS chip or using other location detection techniques implemented on the client device 611. As in prior embodiments, this location may be provided to the IoT service 120, compiled in the database 3235 and used to determine the locations within the event venue visited by the users of IoT devices 104-106 (i.e., based on the connectivity of those devices to the client device 611 and the location of the client device 611 when connected). In one embodiment, the client devices 611 which connect the IoT devices 101-106 to the IoT service 120 are client devices of participants in the event such as the employees working booths at the tradeshow or individuals working for the event promoter. The client devices 611 may be configured to perform this roll by installing an app or browser-based code on the client devices 611 of all event participants/employees.

While only two event locations 3200A-B are illustrated in FIGS. 32A-C for the purpose of explanation, many more IoT hubs 3210-3211 may be set up in many more different event locations. For example, hundreds or even thousands of IoT hubs and/or client devices may be set up to collect data from each IoT device.

One embodiment of the invention allows an event attendee to pay for goods and services using the IoT device assigned to that attendee. In particular, when an event-configured IoT device is registered with the attendee (e.g., when the attendee initially arrives at the venue) various information related to the user may be collected and associated with the IoT device including the user's name, phone number, email address, and credit card information or other financial account information for making purchases. The IoT device itself may be identified using a unique IoT device identification code (e.g., a public key, serial number, etc, associated with the IoT device). In one embodiment, a record is created in the database 3235 associating the IoT device identification code with the attendee's data, including attendee's credit card information (or other financial account data such as the attendee's Paypal® account information). Subsequently, when the user arrives at a booth or other location within the event where payment is required, the user may simply provide his/her IoT device for payment. In response, the IoT device will transmit an encrypted/signed message to the IoT service (e.g., using the security techniques discussed above) which includes the purchase amount and other information related to the purchase (e.g., the item/service purchased). The event transaction module 3230 on the IoT service 120 may then access an external service 3240 such as a credit card service to complete the transaction. If the transaction is approved, an indication may be transmitted back from the event transaction module 3230 to the IoT hub 3210, client device 611 and/or the IoT device itself to confirm the transaction.

Figure 33:
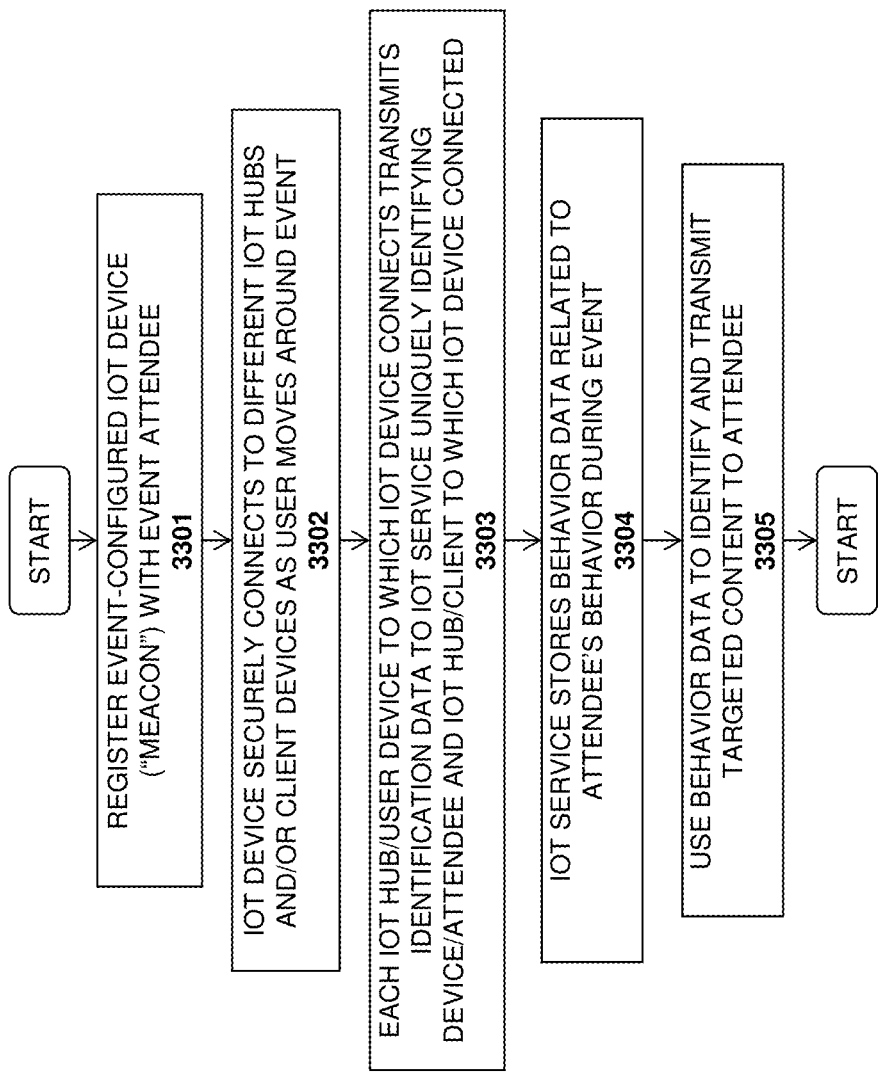
FIG. 33 illustrates a method in accordance with one embodiment of the invention.

A method in accordance with one embodiment of the invention is illustrated in FIG. 33. The method may be implemented within the context of the architectures described above but is not limited to any particular system architecture.

At 3301, an event-configured IoT device is registered with an event attendee. An "event-configured" IoT device is one which has the appropriate hardware and software installed thereon to form connections with IoT hubs and/or user devices to communicate with the IoT service (as described above). In one embodiment, registration of the IoT device includes recording the user's name, phone number, email address, and/or any other pertinent information and associating this data with an IoT device identification code (e.g., a public key, serial number, etc, associated with the IoT device). In one embodiment, a record is created in the database 3235 associating the IoT device identification data with the attendee.

At 3302, the IoT device securely connects to different IoT hubs and/or user devices as the user moves around the event and, at 3303, each IoT hub to which the IoT device connects transmits identification data to the IoT service uniquely identifying the IoT device and the IoT hub. As mentioned, this data may be used to identify the location of the user (potentially in combination with other data sent from other IoT hubs such as RSSI data). At 3304 the IoT service stores user behavior data related to the attendee's behavior at the event (e.g., in a database). In its simplest form, the behavior data comprises the various IoT hubs to which the IoT device connects during the event. However, as described above, various other data may be collected such as purchases made with the IoT device and the amount of time spent at each location within the event (as measured via IoT hub connections).

At 3305, the user behavior data is used to identify and transmit targeted content to the attendee. For example, if the behavior data indicates that the user spent most of his/her time at a particular set of booths during a tradeshow, then targeted content related to the companies demonstrating products at those booths may be sent to the attendee (e.g., promotional offers, links to additional product content, etc). Similarly, if the event is a concert with multiple stages, then the behavior data may indicate the performances viewed by the attendee. In this case, the targeted content may include offers or additional information related to the performers (e.g., free music tracks, discounts on upcoming shows, etc). The targeted content may be transmitted to the attendee in various ways including via text, email, and/or social network communications.

Internet of Things (IoT) Automotive Device,
System, and Method

One embodiment of the invention comprises an Internet of Things (IoT) automotive device integrated within an IoT system to collect signal strength data from the user's mobile device and/or the IoT hub, analyze the signal strength data, and take specified actions (e.g., notifying the user of detected conditions). These embodiments of the invention may be configured to, for example, detect when a user has left a mobile device at home, and responsively notify the user and to safely detect when a car has been stolen.

Figure 34:
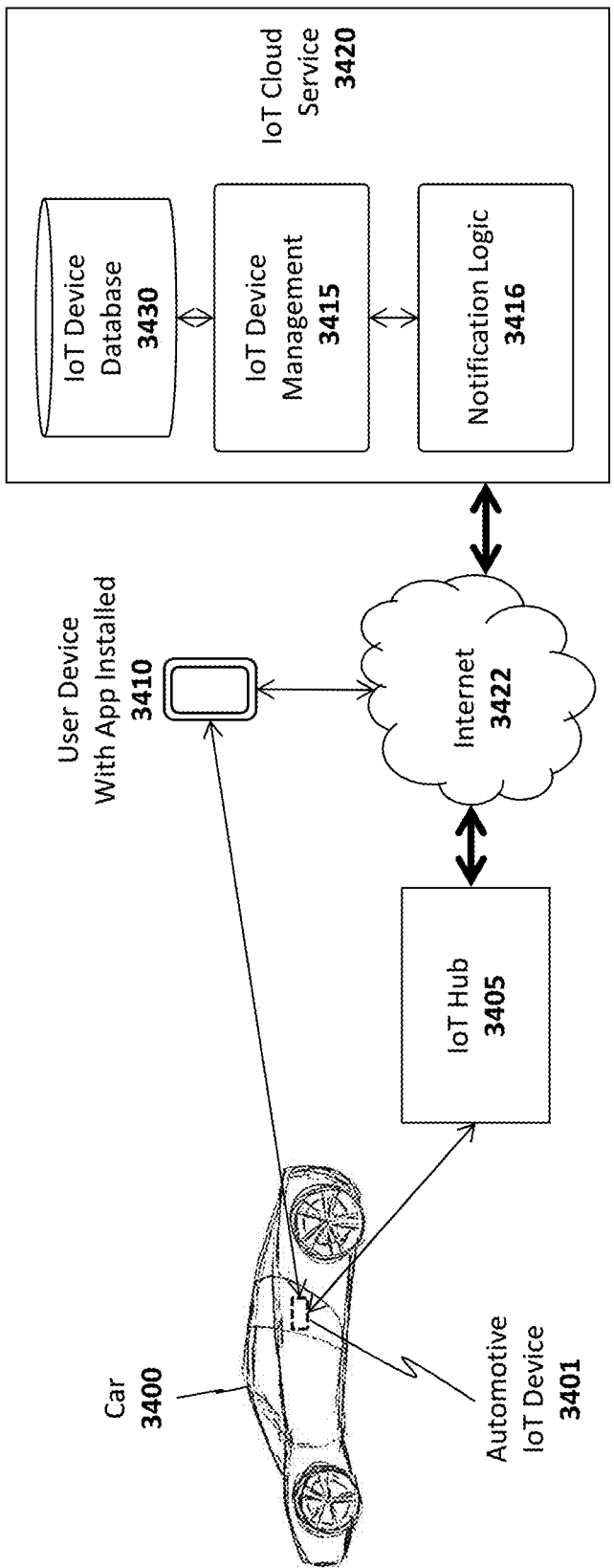
FIG. 34 illustrates a system architecture in accordance with one embodiment of the invention.

FIG. 34 illustrates one embodiment of a system architecture in which a car 3400 has been equipped with an automotive IoT device 3401 which is configured to connect to and/or take signal strength measurements between itself and the IoT Hub 3405 and the user's mobile device 3410. In one embodiment, the wireless connection between the automotive IoT device 3401 and the IoT hub 3405 and user device 3410 is a Bluetooth Low Energy (BTLE) connection and/or a WiFi connection. However, the underlying principles of the invention are not limited to any particular wireless protocols. Moreover, while not shown in FIG. 34, in one embodiment, the automotive IoT device 3401 may also include a cellular data radio for establishing a data connection with a cell service (e.g., a 4G LTE connection).

The interaction between the various system components shown in FIG. 34 may occur largely as described above. For example, the IoT hub 3405 communicatively couples its IoT devices (such as automotive IoT device 3401) to an IoT cloud service 3420 over the Internet 3422. The user may then access data and control the various IoT devices by connecting to the IoT cloud service 3420 via a user device 3410 with an IoT management app installed. In addition, the user may access and control the IoT devices via a browser or application installed on a desktop or laptop computer.

An IoT device database 3430 managed by the IoT cloud service 3420 includes database records for each of the IoT devices and IoT hubs configured in the system (which may include a plurality of IoT hubs and devices not shown in FIG. 34). IoT device management logic 3415 creates the database records for new IoT devices and updates the IoT device records in response to data transmitted by each of the IoT devices, including the automotive IoT device 3401. The IoT device management logic 3415 may also implement the various security/encryption functions described above to add new devices to the system (e.g., using QR codes/barcodes) and use keys to encrypt communications and/or generate digital signatures when communicating with the IoT devices such as automotive IoT device 3401.

In one embodiment, control signals transmitted from the app or application on the user device 3410 are passed to the IoT cloud service 3420 over the Internet 3422, then forwarded from the IoT cloud service 3420 to the IoT hub 3405 and from the IoT hub 3405 to one or more of the IoT devices, such as the automotive IoT device 3401. Of course, the underlying principles of the invention are not limited to any particular manner in which the user accesses/controls the various IoT devices.

Notification logic 3416 is included on the IoT cloud service 3420 to generate notifications to users and/or other cloud services in response to certain specified events (e.g., such as the user's car being stolen in one embodiment).

Figure 35A:
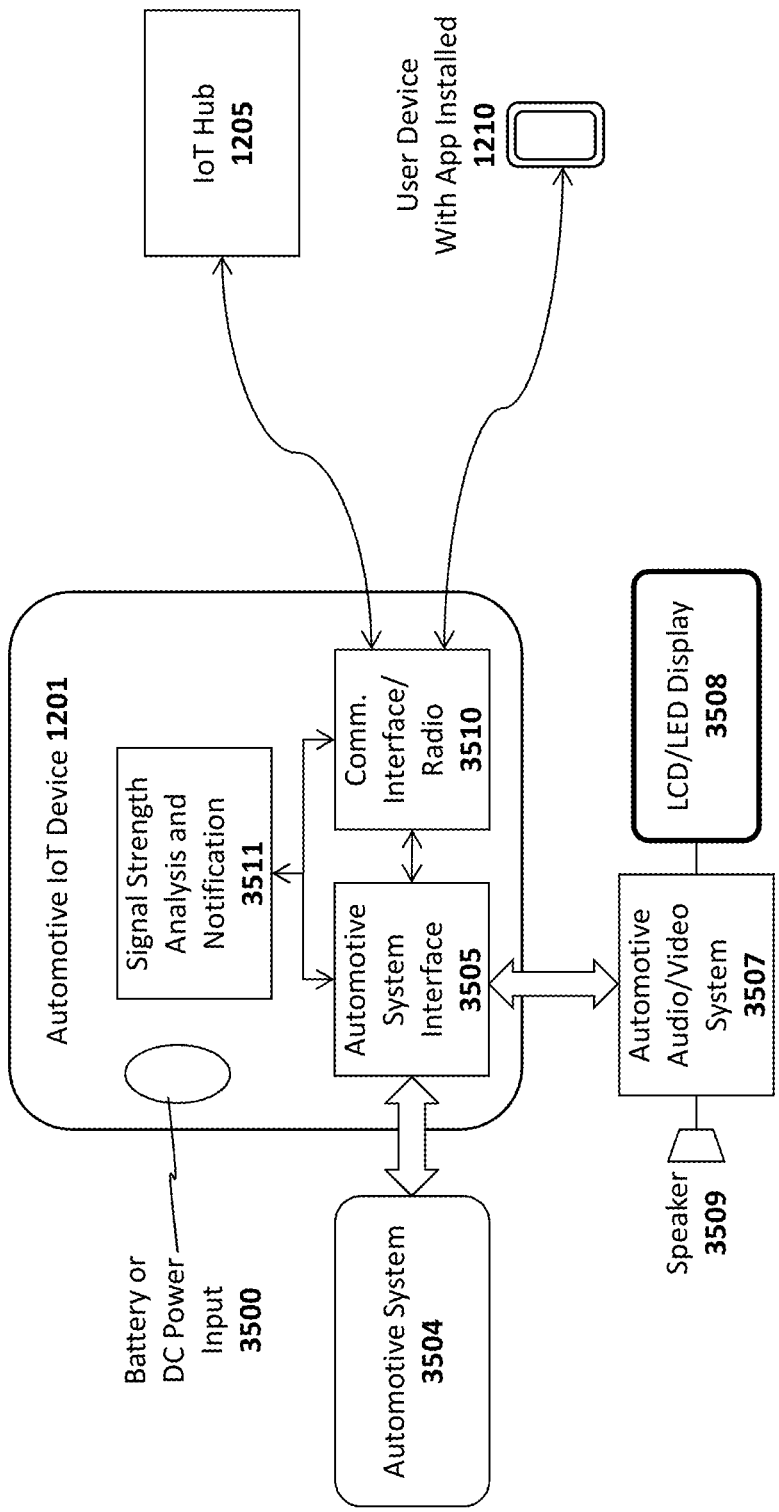
FIGS. 35A-B illustrate an automotive IoT device in accordance with embodiments of the invention.
Figure 35B:
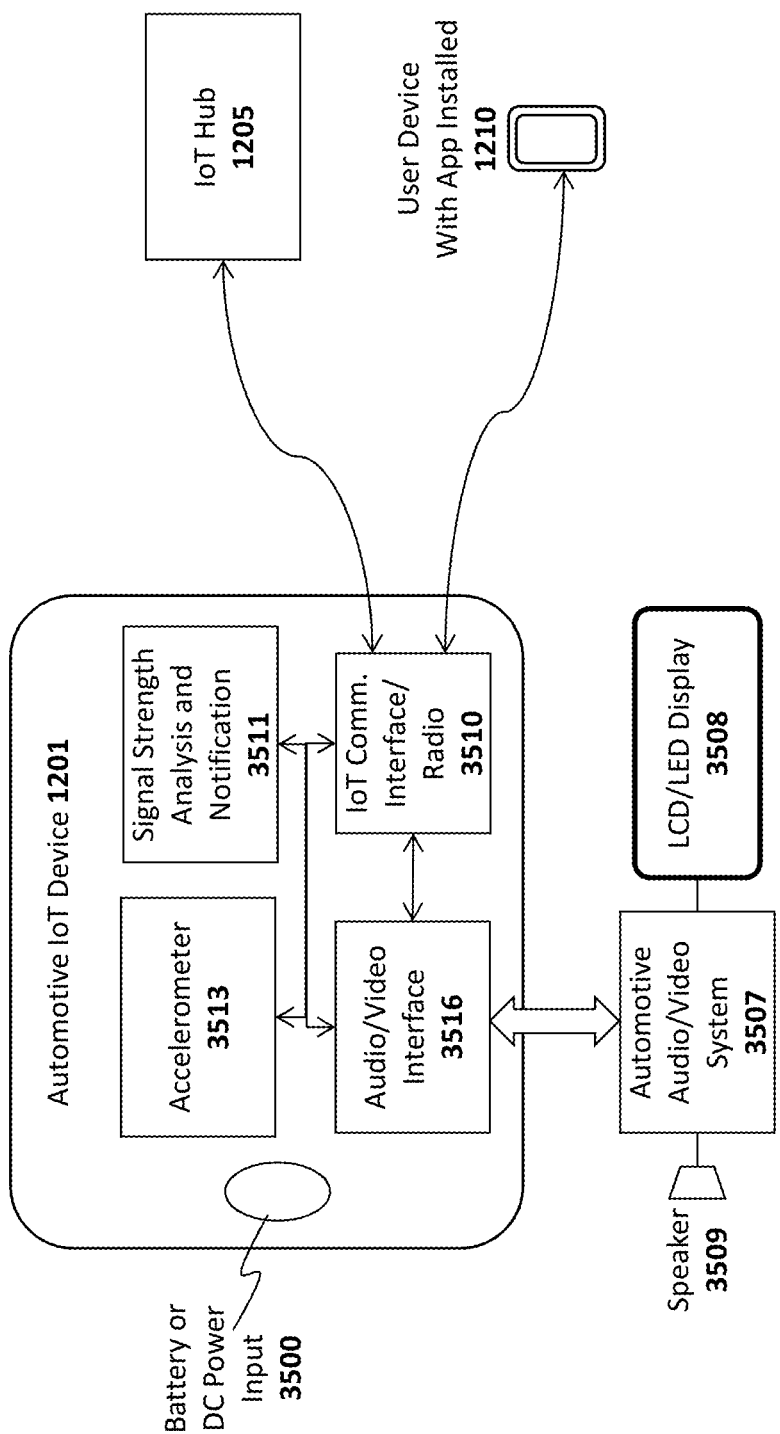

FIGS. 35A and 35B provide additional details of different embodiments of the automotive IoT device 3401. Turning first to FIG. 35A, one embodiment includes a communication interface/radio 3510 for establishing communication channels and/or collecting signal strength measurements (e.g., RSSI measurements) between the automotive IoT device 3401 and the IoT hub 3405 and/or the user device 3410. This embodiment also includes a signal strength analysis and notification module 3511 which analyzes and signal strength values, renders decisions based on the analysis, and generates notifications when appropriate. In addition, the illustrated embodiment includes an automotive system interface 3505 for establishing a connection with the car's audio/video system 3507 and/or collecting automotive data from the automotive system 3504 (e.g., such as whether the car is currently running, the current velocity, acceleration, etc). For example, many current automobiles include built-in data collection and management systems which continually monitor and collect data related to the use of the car. In one embodiment, the automotive system interface 3505 includes interface logic for connecting to these systems 3504 to determine the current velocity, acceleration, and/or other information related to the current state of the car. In some of the embodiments described above, the automotive IoT device 3401 may also transmit commands to the automotive system 3504 (e.g., to disable the car in the event the car is stolen).

FIG. 35B illustrates an alternate embodiment which includes a built in accelerometer 3513 (or other type of sensor) for detecting the current velocity and/or acceleration of the car. Consequently, this embodiment does not require interface logic to connect to the car's built in data collection system. However, this embodiment may still include an audio/video interface 3516 to couple the automotive IoT device 3401 to the car's audio/video system 3507 which may include a speaker 3509 for generating audible notifications and an LCD/LED display (or individual LEDs) for generating visible notifications in response to current detected conditions.

Regardless of how the automotive IoT device 3401 is configured within the car, in one embodiment, the signal strength analysis and notification module 3511 is configured to take signal strength measurements from the IoT hub 3405 (or other device known to be located at the user's home), and the user's mobile device 3410 to make decisions and generate notifications. For example, in one embodiment, the automotive IoT device 3401 will initially scan for both the user device 3410 and the IoT hub 3405 at the same time. If the signal strength (e.g., RSSI) for both the user device 3410 and the IoT hub 3405 can be measured, then the signals strength analysis and notification module 3511 will determine that the user is at home (and also that the car is close to the user's home). If the user device signal strength was detected, but no signal measured from the IoT hub 3405, then the signal strength analysis and notification module 3511 determines that the user is away from home.

In one embodiment, the various components 3510, 3511, 3513, 3516 of the automotive IoT device 3401 are put into a low power state when the car is idle. When the car is turned on and/or when an acceleration/velocity are detected from the accelerometer 3513 or automotive data 3504 provided via the interface 3505, the IoT communication interface/radio 3510 and signal strength analysis and notification module 3511 are powered on and begin taking signal strength measurements of the user device 3410 and IoT hub 3405. In one embodiment, the RSSI is measured over time. If the RSSI of the IoT hub 3405 is dropping during this time, the signal strength analysis and notification module 3511 may determine that the car is moving away from the user's home. If the RSSI of the user device 3410 is dropping, the signal strength analysis and notification module 3511 may determine that the car is moving away from the location of the phone/user. If the RSSI of the user device 3410 is constant or increasing during this time, the signal strength analysis and notification module 3511 may determine that the phone and user are inside the car.

Using this information, the signal strength analysis and notification module 3511 may generate notifications and/or alerts. For example, if the signal strength analysis and notification module 3511 detects that the car is moving away from the phone, this may mean that the user has forgotten his/her user device 3410. As such, in one embodiment, the signal strength analysis and notification module 3511 responsively communicates with the automotive audio/video system (e.g., via the system interface 3505 or A/V interface 3516) to generate an audible alert via the car speakers 3509 and/or generate a visual alert via the LCD/LED display 3508 (or other type of visual notification device such as a simple LED). If an LCD/LED display 3508 is available, specific details of the condition may be reported to the user such as text telling the user of the potential problem condition (e.g., "Did you remember your mobile device?" or, more generally, "Problem Condition 1").

Similarly, if the signal strength analysis and notification module 3511 detects that the car is driving away from the phone, this may also represent that the car is being car jacked. As such, in one embodiment, the user device 3410 may detect the change in RSSI and itself generate an alarm indicating the movement of the car. Alternatively, the signal strength analysis and notification module 3511 may transmit a notification to the phone which will then display the alarm condition. In either case, if the car is equipped with GPS or other location tracking capabilities, the signal strength analysis and notification module 3511 may collect the current location readings for the car and report them back to the user device 3410 and/or the IoT service 3420. As mentioned, the automotive IoT device 3401 (or the car itself) may include a cellular data connection. In such a case, the GPS data may be reported to the IoT service 3420 and/or the user device 3410 via this connection (i.e., if the car has moved out of range of both the user device 3410 and the IoT hub 3405).

In one embodiment, if the car has been stolen, the app on the user device 3410 will provide the user with an option to activate a special process which may be integrated within the signal strength analysis and notification module 3511 on the automotive IoT device 3401. In particular, once the user has indicated that the process should be initiated, in one embodiment, the car will function normally until the RSSI between the car and the user devices 3410 drops sufficiently low (or disappears completely) to represent the car is sufficiently far away from the user. In one embodiment, the automotive IoT device 3401 then transmits a "disable" signal via the automotive system interface 3505 to shut down the car and/or sound the car alarm. In this manner, the user will be provided with a sufficient amount of time to get away from the carjacker and the car will be rendered safe and non-functional.

In one embodiment, if the signal strength analysis and notification module 3511 detects that the user deice 3410 is moving closer to the car, this may represent that the user is walking toward the car. In one embodiment, the presence of the user device 3410 may be sufficient for the signal strength analysis and notification module 3511 to unlock the car doors and/or disable car security via the automotive system 3504. In another embodiment, the app on the user device 3410 may request user authentication (e.g., a user ID or biometric reading such as a fingerprint) to unlock the car doors.

Figure 36:
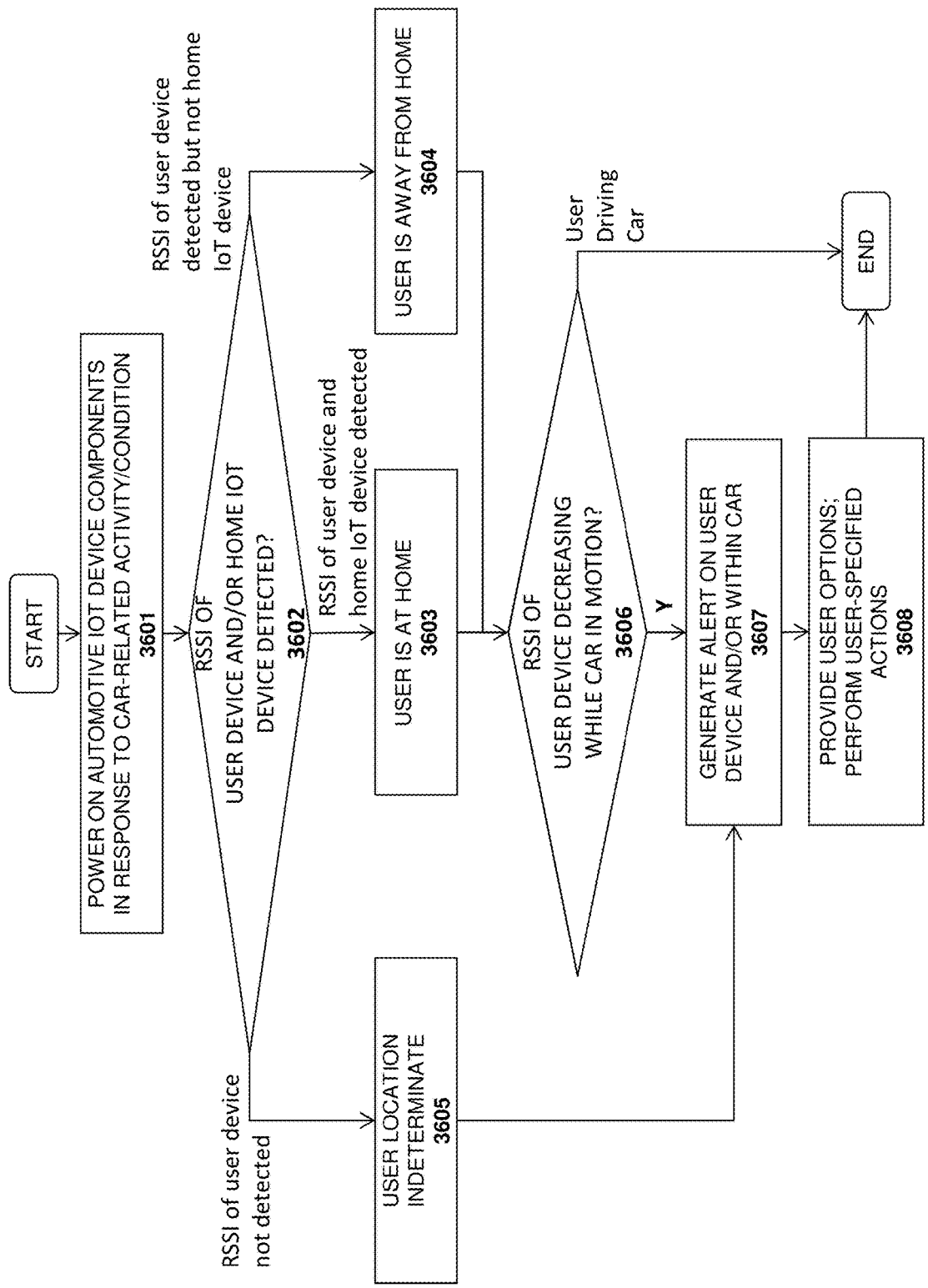
FIG. 36 illustrates a method in accordance with one embodiment of the invention.

A method in accordance with one embodiment of the invention is illustrated in FIG. 36. The method may be implemented within the context of the system and device architectures described above (e.g., by the signal strength analysis and notification module 3511) but is not limited to any particular system or device architecture.

At 3601, the components of the automotive IoT device are powered on or awakened from a sleep state in response to car-related activity or conditions. This may include, for example, the car being started and/or the automotive IoT device detecting the car moving (e.g., detected via an accelerometer or by reading data from the automotive interface as described above). At 3602, a determination is made as to whether the RSSI of the user device and/or a home IoT device (such as the IoT hub) is detected. If the RSSI of the user device and the home IoT device is detected, then a determination is made that the user and car are at the user's home at 3603. If the RSSI of the user device is detected but the RSSI of the home IoT device is not detected, then the user is determined to be with the car but away from home at 3604. In either of these cases, at 3606, a determination is made as to whether the RSSI of the user device is decreasing while the car is in motion. If so, then this could mean that the user has forgotten his/her device at home or another location or it could mean that the car is being stolen. As such, at 3607, an alert may be generated on the user device and/or within the dashboard display of the car. As mentioned above, the user may be provided with options on the user device to, for example, disable the car. At 3608, upon receiving the user's selections, one or more specified user actions may be performed (e.g., disabling the car when it is sufficiently far away from the mobile device).

If the RSSI of the user device is not detected at 3602, then the user's location is indeterminate at 3605. Because the car is being moved without the user, an alert may be generated on the user device and/or within the car at 3607. At 3608, the user may be provided with options as described above (e.g., to disable the car).

System and Method for an Internet of Things (IoT) Gas Pump or Charging Station

Figure 37:
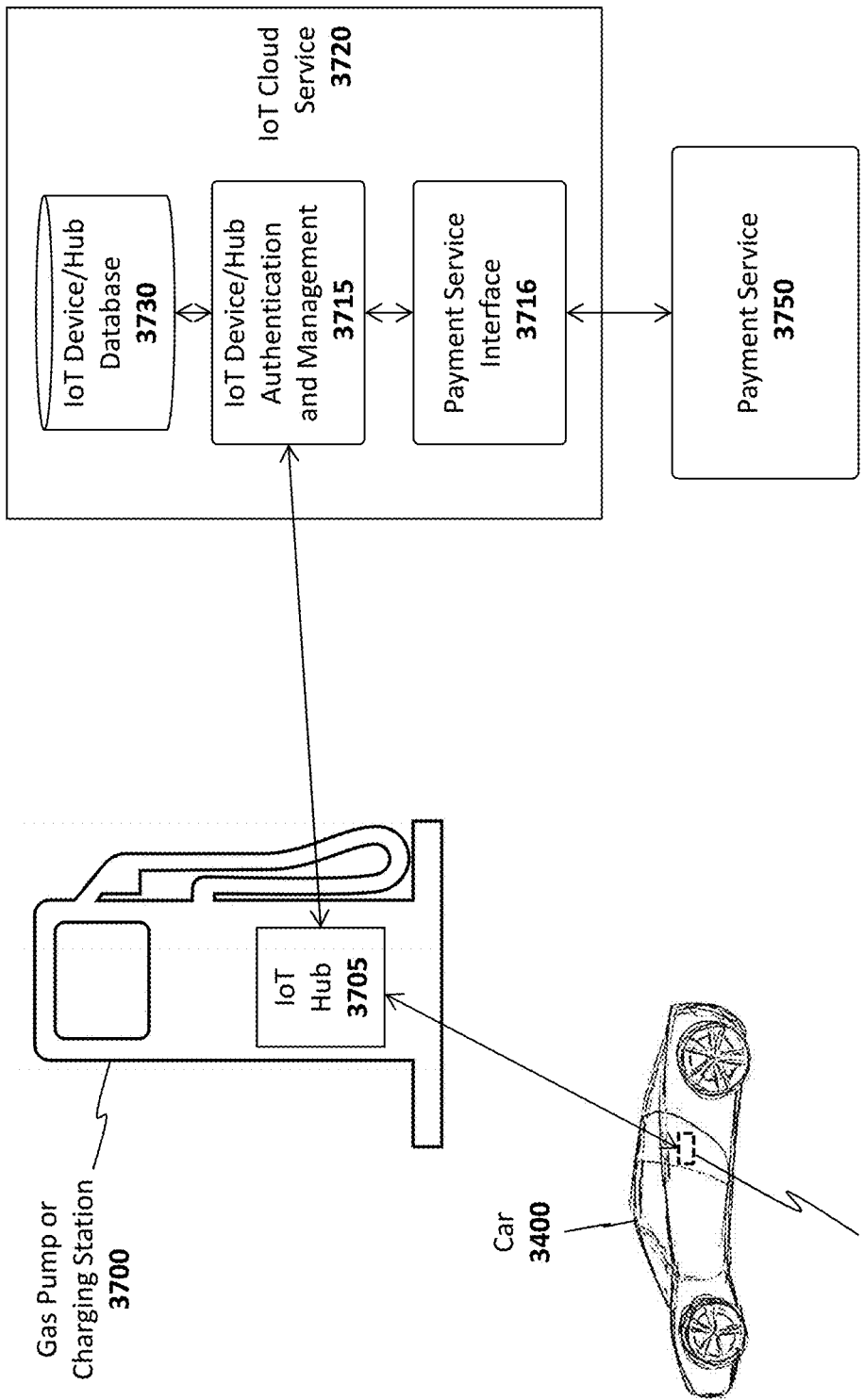
FIG. 37 illustrates one embodiment in which an IoT hub is integrated within a gas pump or charging station.

In one embodiment of the invention, the IoT enabled car 3400 may be used to automatically authenticate for payment at a gas station or charging station for battery powered vehicles. FIG. 37 illustrates one particular embodiment in which the automotive IoT device 3401 connects to an IoT hub 3705 communicatively coupled to a gas pump or charging station 3700. The IoT hub 3705 may be configured to connect to an IoT cloud service 3720 as described above (e.g., via the Internet) and to connect to the automotive IoT device 3401 over a local wireless connection (e.g., via BTLE). Once connected to the IoT hub 3705, the automotive IoT device 3401 may then form a secure connection with the IoT cloud service 3720 using the techniques described herein (see, e.g., FIG. 24A-31C and associated text). The automotive IoT device 3401 may transmit its unique identification code identifying itself to the IoT cloud service 3720. An IoT device/hub authentication and management module 3715 on the IoT cloud service 3720 then queries its IoT device/hub database 3730 to identify/authenticate the automotive IoT device 3401 and the associated user account.

Once the automotive IoT device 3401 is identified, a payment service interface 3716 on the IoT cloud service 3720 initiates a payment transaction with an external payment service 3750 such as Paypal, a credit card company, or the user's bank account. Once the payment transaction is authorized by the payment service 3750, the IoT device/hub authentication and management module 3715 transmits a command to the IoT hub 3705 to authorize the user to pump gas from the gas pump or charging station 3700. The IoT hub 3705 at the gas pump or charging station 3700 will transmit the cost of the gas to the IoT cloud service 3720 which will forward a message to the payment service 3750 to complete the transaction and pay for the gas/electricity. For example, if the payment service 3750 comprises a Paypal account, then the amount may be applied against the user's account. If the payment service 3750 is a bank account, then the amount will be deducted from the user's account.

Figure 38:
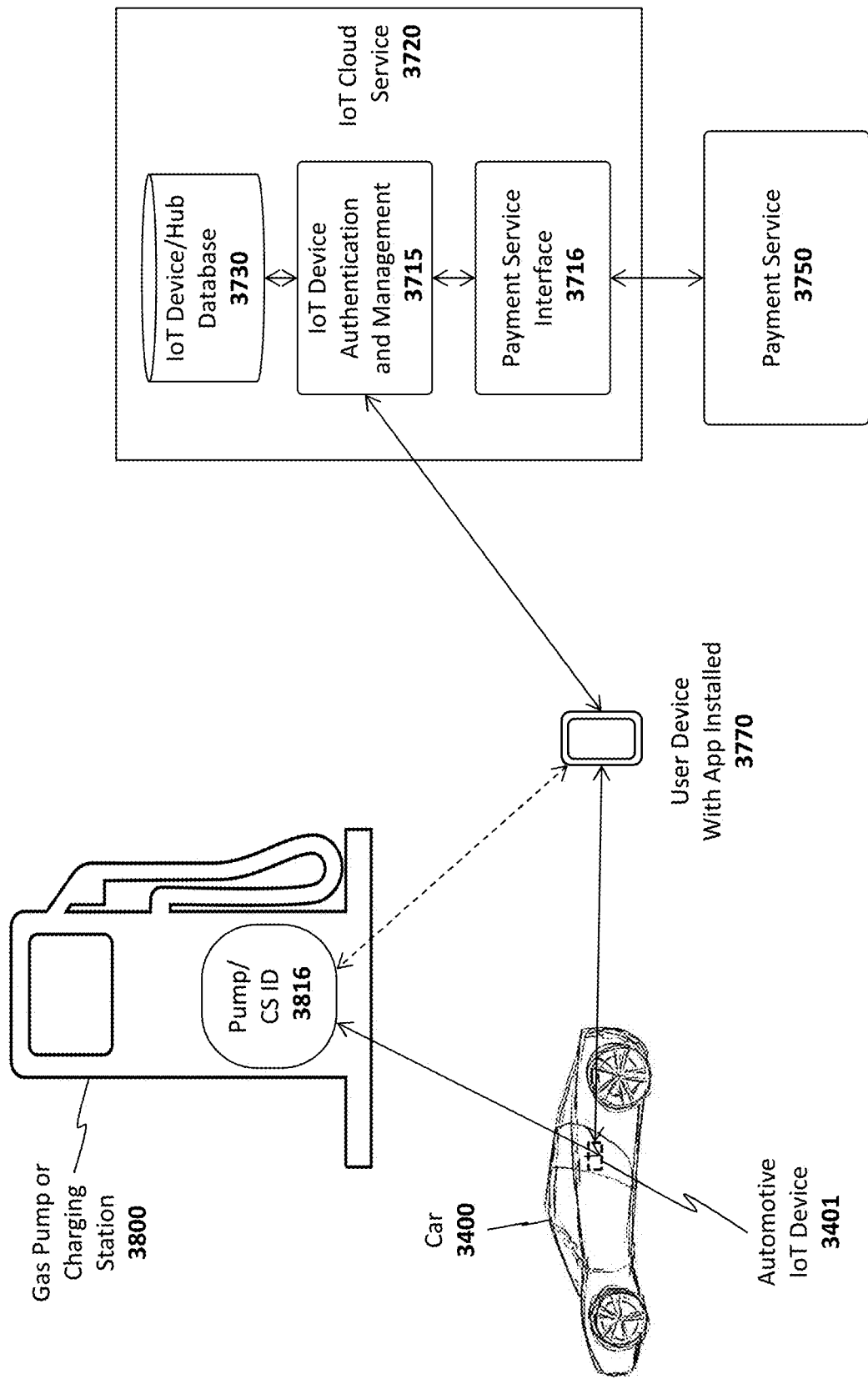
FIG. 38 illustrates another embodiment in which the IoT system is used to pay for gas and/or electricity.

FIG. 38 illustrates another embodiment which may be implemented alone or in combination with the embodiment shown in FIG. 37. This embodiment does not require the gas pump or charging station 3800 to have an IoT hub with a direct connection to the IoT cloud service 3720. Rather, in this embodiment, pump/charging station identification data 3816 uniquely identifying the gas pump or charging station is provided to the automotive IoT device 3401 which establishes a secure connection with the IoT cloud service 3720 via the user device with an IoT app installed 3770 (e.g., using the techniques described above). For example, the gas pump or charging station 3800 may include a local wireless communication module to provide its pump/CS ID 3816 to the automotive IoT device 3401 (e.g., via a BTLE or WiFi channel), which will then forward the gas pump or charging station ID 3816 to the IoT device authentication and management module 3715. After the transaction is authorized by the payment service 3750, the IoT device authentication and management module 3715 will transmit a command to the automotive IoT device 3410, which will then forward the command wirelessly to the gas pump or charging station 3800 to authorize the transaction. In this embodiment, the local wireless communication module in the gas pump or charging station may comprise an IoT device capable of communicating with the automotive IoT device 3401 in the car 3400 and/or with the user device 3770.

In another embodiment, the identity of the gas pump or charging station 3800 may be captured from a QR code or barcode printed on the gas pump or charging station 3800. The user may capture the QR code or barcode with the user device 3770 which then forwards the identification data to the IoT cloud service 3720, along with the identification data for the automotive IoT device 3401. The command authorizing the use of the gas pump or charging station may then be transmitted from the IoT cloud service 3720 to the automotive IoT device 3401 which will provide the authorization command to the local wireless communication module (e.g., the IoT device) in the gas pump or charging station 3800.

In one embodiment, the IoT device within the gas pump or charging station 3800 may have a connection to the IoT service 3720 (e.g., over the Internet). As such, once the QR code or barcode is captured and sent from the user device 3770, the command to authorize use of the pump may be transmitted directly from the IoT cloud service 3720 to the gas pump or charging station 3800.

A method in accordance with one embodiment of the invention is illustrated in FIG. 39. The method may be implemented within the context of the system architectures described above but is not limited to any particular system architecture.

At 3901, a user drives into a gas station and parks in front of a gas pump or charging station that has an integrated IoT hub (or other wireless communication device). At 3902, the automotive IoT device connects to the IoT hub and provides identification data to the IoT hub. At 3903, the automotive IoT device establishes a secure communication channel with the IoT service and authenticates with the IoT service through the IoT hub. At 3904, the IoT service connects to a payment service to authorize the transaction and, once authorized, at 3905, the IoT service transmits a command to the IoT hub to authorize use of the gas pump or charging station. At 3906, the IoT hub of the gas pump or charging station transmits an indication of the cost of the gas pumped or electrical power used to the IoT service, which forwards the amount to the payment service (which may then debit the user's account by the designated amount).

In one embodiment, the car 3400 does not include an IoT device, but the user authorizes use of the pump or charging station 3800 with the user device 3770 with the app installed. For example, in one embodiment, the user device 3770 may wirelessly connect to the gas pump/charging station 3800 and authenticate the user. In another embodiment, the user device may communicate directly to the IoT cloud service 3720 over the Internet to authenticate the user. In this embodiment, the user's location may be determined using GPS or other location technology. Moreover, the user may be asked to enter data via the user device app 3770 identifying the gas pump or charging station 3800 (e.g., entering the pump/CS ID 3816).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
an automotive Internet of Things (IoT) device to be integrated within a vehicle of a user;
a gas pump or charging station in communication with the automotive IoT device;
an IoT service comprising IoT device authentication and management logic to authenticate the identity of the automotive IoT device to be integrated within the vehicle;
a client device in communication with the automotive IoT device, the client device to obtain identification data associated with the gas pump or charging station and to establish a secure communication channel with the IoT service, the client device of the user providing the identification data associated with the gas pump or charging station and second identification information associated with the automotive IoT device to the IoT service;
the IoT service to authenticate the automotive IoT device based on the second identification information and responsively establish a second communication channel with the automotive IoT device to transmit a command to the automotive IoT device through the second communication channel, the automotive IoT device to establish a third communication channel with the gas pump or charging station and to forward the command to the gas pump or charging station through the third communication channel authorizing use of the gas pump or charging station by the user;

a first encryption engine on the IoT service comprising key generation logic to generate a service public key and a service private key, wherein the key generation logic comprises a hardware security module (HSM);

a second encryption engine on the automotive IoT device comprising key generation logic to generate a device public key and a device private key;

the first encryption engine to transmit the service public key to the second encryption engine and the second encryption engine to transmit the device public key to the first encryption engine;

the first encryption engine to use the device public key and the service private key to generate a secret;

the second encryption engine to use the service public key and the device private key to generate the same secret; and wherein once the secret is generated, the first encryption engine and the second encryption engine encrypt and decrypt data packets transmitted between the first encryption engine and the second encryption engine using the secret or using data structures derived from the secret.

2. The system as in claim 1 wherein the IoT device authentication and management logic is to query an IoT device/hub database to authenticate the automotive IoT device, the query to identify a user account.

3. The system as in claim 2 wherein the IoT service further comprises a payment service interface to establish a communication channel with a payment service to pay for the gas at the pump or electricity at the charging station, wherein data associated with the user account is to be used to authenticate with the payment service.

4. The system as in claim 3 wherein upon completion of use of the gas pump or charging station, the gas pump or charging station is to transmit a cost indication to the IoT service, the IoT service to responsively provide the cost to the payment service via the payment service interface.

5. The system as in claim 4 wherein communication between the gas pump or charging station and the IoT service is to occur through the client device of the user.

6. The system as in claim 4 wherein the cost indication is transmitted from the gas pump or charging station to the automotive IoT device through the third communication channel and from the automotive IoT device to IoT service through the second communication channel.

7. The system as in claim 1 wherein the secure communication channel comprises a Bluetooth Low Energy (BTLE) communication channel.

8. The system as in claim 1 wherein the data structures derived from the secret comprise a first key stream generated by the first encryption engine and a second key stream generated by the second encryption engine.

9. The system as in claim 1 further comprising a first counter associated with the first encryption engine and a second counter associated with the second encryption engine, the first encryption engine incrementing the first counter responsive to each data packet transmitted to the second encryption engine and the second encryption engine incrementing the second counter responsive to each data packet transmitted to the first encryption engine.

10. The system as in claim 9 wherein the first encryption engine generates the first key stream using a current counter value of the first counter and the secret and the second encryption engine generates the second key stream using a current counter value of the second counter and the secret.

11. The system as in claim 10 wherein the first encryption engine comprises an elliptic curve method (ECM) module to generate the first key stream using the first counter value and the secret and the second encryption engine comprises an ECM module to generate the second key stream using the first counter value and the first secret.

12. The system as in claim 1 wherein the automotive IoT device comprises a communication interface/radio to collect signal strength measurements between the automotive IoT device and the client device.

* * * * *